US008037356B2

(12) United States Patent
Rasmussen et al.

(10) Patent No.: US 8,037,356 B2
(45) Date of Patent: Oct. 11, 2011

(54) SYSTEM AND METHOD FOR VALIDATING CHANNEL TRANSMISSION

(75) Inventors: David C. Rasmussen, Placentia, CA (US); John G. Gabler, Irvine, CA (US)

(73) Assignee: Invensys Systems, Inc.

( * ) Notice: Subject to any disclaimer, the term of this patent is extended or adjusted under 35 U.S.C. 154(b) by 452 days.

(21) Appl. No.: 11/923,534

(22) Filed: Oct. 24, 2007

(65) Prior Publication Data

US 2008/0109677 A1 May 8, 2008

Related U.S. Application Data

(63) Continuation of application No. 11/242,401, filed on Oct. 3, 2005, now abandoned, which is a continuation of application No. 10/848,542, filed on May 17, 2004, now Pat. No. 6,988,221, which is a continuation of application No. 10/226,454, filed on Aug. 22, 2002, now Pat. No. 6,754,846, which is a continuation of application No. 09/467,669, filed on Dec. 18, 1999, now Pat. No. 6,449,732.

(60) Provisional application No. 60/112,832, filed on Dec. 18, 1998.

(51) Int. Cl.
*G06F 11/00* (2006.01)

(52) U.S. Cl. ............................ 714/31; 714/716; 370/249

(58) Field of Classification Search ........................ None
See application file for complete search history.

(56) References Cited

U.S. PATENT DOCUMENTS

| | | | |
|---|---|---|---|
| 3,281,833 A | 10/1966 | Seidel | |
| 3,930,209 A * | 12/1975 | Popick et al. | .................. 333/23 |
| 4,006,320 A | 2/1977 | Markl | |
| 4,271,513 A | 6/1981 | Maejima et al. | |
| 4,453,215 A | 6/1984 | Reid | |
| 4,611,320 A | 9/1986 | Southard | |
| 4,616,312 A | 10/1986 | Uebel | |
| 4,627,055 A | 12/1986 | Mori et al. | |
| 4,631,719 A | 12/1986 | Huffman et al. | |
| 4,845,609 A | 7/1989 | Lighthart et al. | |
| 4,967,347 A | 10/1990 | Smith et al. | |
| 5,010,544 A | 4/1991 | Chang et al. | |
| 5,023,869 A | 6/1991 | Grover et al. | |

(Continued)

OTHER PUBLICATIONS

Doyle, J K et al. "The Starserver FT Computer Satisfies Customer Fault Tolerant Computer Needs" AT&T Technology, American Telephone & Telegraph Co., Short Hills, New Jersey, US, vol. 5, No. 4, Jan. 1, 1990, pp. 30-35, XP000220358.

Weiss R: "Fehlertolerante Rechnersysteme Funktionsprinzipien Und Realisterungsformen" Regulungs-Technische Praxis, R. Oldenbourg Verlag GMBH, Munchen, DE, vol. 25, No. 10, Oct. 1, 1983 pp. 408-416.

(Continued)

*Primary Examiner* — Gabriel Chu
(74) *Attorney, Agent, or Firm* — Conley Rose, P.C.

(57) ABSTRACT

A system for validating communications between a plurality of processors is disclosed. The system includes a plurality of loop back paths, and each of the loop back paths is coupled to a corresponding one of the plurality of processors. In addition, each loop back path is configured to attenuate one of a plurality of signals transmitted from each of the corresponding ones of the plurality of processors so as to generate a plurality of loop back signals. A plurality of signal transmission paths are configured to carry a corresponding one of the plurality of signals from one of the plurality of processors to another of the plurality of processors, and a plurality of comparators compare the plurality of loop back signals to the plurality of transmission signals so as to enable the validity of each of the plurality of signals to be assessed.

20 Claims, 33 Drawing Sheets

U.S. PATENT DOCUMENTS

| | | | |
|---|---|---|---|
| 5,117,442 A | | 5/1992 | Hall |
| 5,173,896 A | * | 12/1992 | Dariano ................... 370/249 |
| 5,199,025 A | | 3/1993 | Miwa |
| 5,204,952 A | | 4/1993 | Ayers et al. |
| 5,239,641 A | | 8/1993 | Horst |
| 5,455,914 A | | 10/1995 | Hashemi et al. |
| 5,519,755 A | * | 5/1996 | Meyer ................... 379/29.02 |
| 5,574,981 A | | 11/1996 | Ahonen |
| 5,600,784 A | | 2/1997 | Bissett et al. |
| 5,610,493 A | | 3/1997 | Wieloch |
| 5,613,127 A | | 3/1997 | Schultz |
| 5,630,046 A | | 5/1997 | Loise |
| 5,704,030 A | | 12/1997 | Kanzaki |
| 5,742,589 A | | 4/1998 | Murata |
| 5,790,294 A | | 8/1998 | Horiuchi et al. |
| 5,838,899 A | * | 11/1998 | Leavitt et al. .................. 714/56 |
| 5,903,717 A | | 5/1999 | Wardrop |
| 5,918,040 A | | 6/1999 | Jarvis |
| 5,999,528 A | * | 12/1999 | Chow et al. ................... 370/365 |
| 6,038,685 A | | 3/2000 | Bissett et al. |
| 6,058,120 A | | 5/2000 | Sabzevari |
| 6,073,251 A | | 6/2000 | Jewett et al. |
| 6,175,747 B1 | | 1/2001 | Tanishima et al. |
| 6,373,923 B1 | | 4/2002 | Williamson et al. |
| 6,449,732 B1 | | 9/2002 | Rasmussen et al. |
| 6,751,761 B1 | | 6/2004 | Tendo |
| 6,754,846 B2 | | 6/2004 | Rasmussen et al. |
| 7,496,042 B2 | * | 2/2009 | Johnson et al. ............... 370/241 |

OTHER PUBLICATIONS

European Search Report for Application No. EP99967467.4 dated May 18, 2009.
European Application EP99967467.4 Office Action mailed Oct. 19, 2009.
European Application EP99967467.4 Office Action mailed Jun. 24, 2010.
Microsoft Press Computer Dictionary Third Edition "distributed processing" Microsoft Press, 1997, p. 154.
Microsoft Press Computer Dictionary Third Edition "attenuation" Microsoft Press, 1997, 2 pages.
PCT/US99/30407 International Search Report mailed Aug. 15, 2000.
PCT/US99/30407 International Preliminary Examination Report.
U.S. Appl. No. 09/467,669 Non-Final Rejection mailed Sep. 27, 2001.
U.S. Appl. No. 09/467,669 Notice of Allowance mailed Apr. 16, 2002.
U.S. Appl. No. 10/226,454 Non-Final Rejection mailed Jul. 17, 2003.
U.S. Appl. No. 10/226,454 Notice of Allowance mailed Feb. 10, 2004.
U.S. Appl. No. 10/848,542 Non-Final Rejection mailed Feb. 9, 2005.
U.S. Appl. No. 11/242,401 Non-Final Rejection mailed Sep. 6, 2006.
U.S. Appl. No. 11/242,401 Final Rejection mailed Apr. 24, 2007.
TriStation 1131 Training Manual.

* cited by examiner

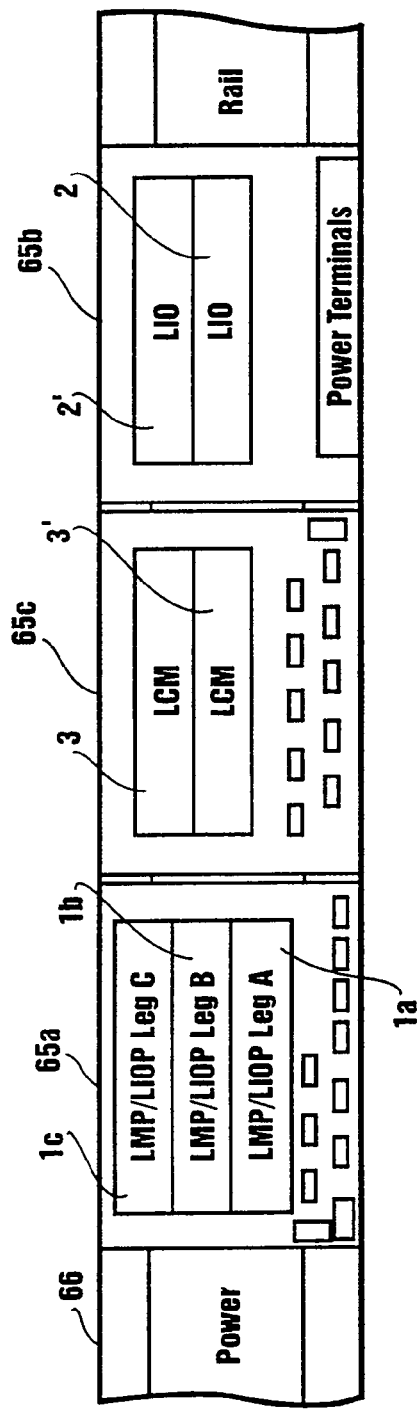
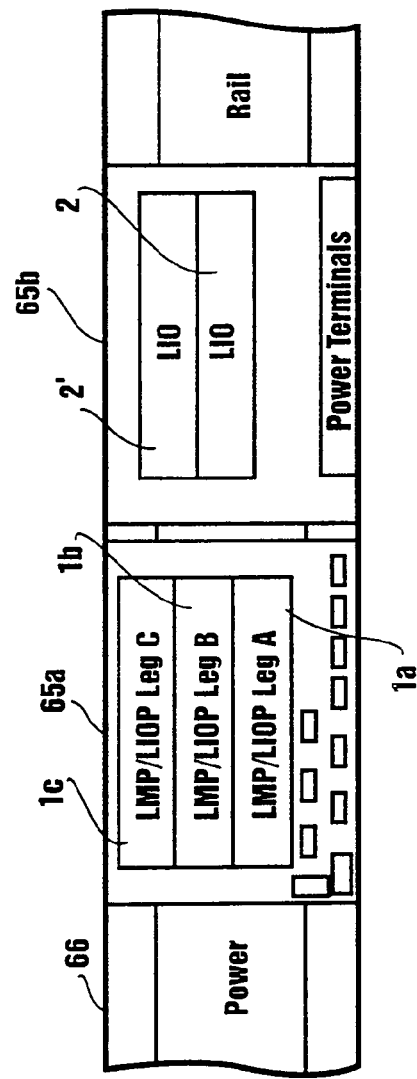
Figure 5B
Figure 5A

SYSTEM AND METHOD FOR VALIDATING CHANNEL TRANSMISSION

RELATED APPLICATIONS

This application is a continuation application of application Ser. No. 11/242,401 filed Oct. 3, 2005 now abandoned, which is a continuation application of application Ser. No. 10/848,542 filed May 17, 2004 now U.S. Pat. No. 6,988,221, which is a continuation of Ser. No. 10/226,454, filed Aug. 22, 2002 now U.S. Pat. No. 6,754,846, which is a continuation application of application Ser. No. 09/467,669 filed on Dec. 18, 1999 now U.S. Pat. No. 6,449,732, which application claimed benefit of prior filed provisional Application No. 60/112,832 filed on Dec. 18, 1998. The entire contents of each of these applications is hereby incorporated by reference herein for all purposes.

BACKGROUND OF THE INVENTION

1. Field of the Invention

The field of this invention related to computerized control systems for gathering sensor data from field units and triggering alarms or taking other actions based on the sensor data with respect to such control elements. More particularly this invention relates to multiple processor control units which are synchronized and evaluate sensor data for valid data.

2. Related Art

Many multiple processor control systems are available in the related art. These include systems as typified by U.S. Pat. No. 5,455,914 to Hashemi, et al. includes a multiple module processor which is controlled from a central computer station.

U.S. Pat. No. 4,616,312 to Uebel, describes a two-out-of-three selecting facility in a three-computer system for a Triple Redundant Computer System which is especially suitable for use with microprocessors having a large number of outputs. The computers of the three computer system handle the same processor information in parallel, but exchange their results in an asynchronous manner and compares them.

U.S. Pat. No. 4,627,055 to Mori, et al. describes a decentralized processing method and system having a plurality of subsystems of the same type which are connected to one another. Each subsystem has a diagnostic mean for diagnosis of failure in the other subsystems and functions to take suitable counter-measures.

U.S. Pat. No. 5,239,641 to Horst, for a method and a apparatus for synchronizing a plurality of processors. Each processor runs off its own independent clock, indicates the occurrence of a predescribed processor event on one line and receives signals on another line for initiating a processor wait state.

However, the I/O architecture of the present invention is fundamentally different from prior systems, in that the prior systems rely on intelligent I/O modules, with one microprocessor per leg per module, while the present invention relies on centralized I/O logic, with one microprocessor per leg, controlling all the I/O modules. A degree of local intelligence on each I/O module is implemented through gate array logic, acting primarily as a slave to the main processor. This architecture reduces the component cost and eliminates the significant size of such system which are usually housed in a central location. A unique synchronization system keeps the local clocks in synchronization.

The present invention provides a system which is intended to operate adjacent the equipment being controlled.

SUMMARY OF THE INVENTION

The control system of the present invention comprises a fault tolerant controller, control system platform or computer system having a triple modular redundant (TMR) architecture. The controller consist of three identical channels, except for the power modules which are dual-redundant. Each channel independently executes the application program in parallel with the other two channels. A voting system with voting mechanisms which qualify and verify all digital inputs and outputs from the field; analog inputs are subject to a mid-value selection process.

Each channel is isolated from the others, no single-point failure in any channel can pass to another. If a hardware failure occurs in one channel, the faulty channel is overridden by the other channels. Repair consists of removing and replacing the failed module in the faulty channel while the controller is online and without process interruption.

The controller of the present invention features triplicated main processor modules (MP), input/output modules (I/O) and optionally one or two Local Communications modules (LCM). Each I/O module houses the circuitry for three independent channels. Each channel on the input modules reads the process data and passes that information to its respective MP. The three MP communicate with each other using a high-speed bus called Channel 11

The system is a scan based system and once per scan, the MP module synchronizes and communicate with the neighboring MPs over the Channel 11. The Channel 11 forwards copies of all analog and digital input data to each MP, and compares output-data from each MP. The MPs vote the input data, execute the application program and send outputs generated by the application program to the output modules. In addition, the controller votes the output data on the output modules as close to the field as possible to detect and compensate for any errors that could occur between the Channel 11 voting and the final output driven to the field. For each I/O module, the controller can support an option hot-spare module. If present, the hot-spare takes control if a fault is detected on the primary module during operation. The hot-spare position is also used for the online-hot repair of a faulty I/O module.

The MP modules each control a separate channel and operates in parallel with the other two MPs. A dedicated I/O control processor on each MP manages the data exchanged between the MP and the I/O modules. A triplicated I/O bus, located on the base plates, extends from one column of I/O modules to another column of I/O modules using I/O bus cables. In this way the system can be expanded. Each MP poles the appropriate channel of the I/O bus and the I/O bus transmits new input data to the MP on the polling channel. The input data is assembled into a table in the MP and is stored in memory for use in the voting process.

Each input table in each M is transferred to its neighboring MP over the Channel 11. After this transfer, voting takes place. The Channel 11 uses a programmable device with a direct memory access to synchronize, transmit, and compare data among the three MPs.

If a disagreement occurs, the signal value found in two of three tables prevails, and the third table is corrected accordingly. Each WP maintains data about necessary correction in local memory. Any disparity is flagged and used at the end of the scan by built-in fault analyzer routines to determine whether a fault exists on a particular module.

The MPs send corrected data to the application program and then executes the application program in parallel with the neighboring MP and generates a table of output values that are based on the table of input values according to user-defined rules. The I/O control processor on each MP manages the transmission of output data to the output modules by means of the I/O bus.

Using the table out output values, the I/O control processor generates smaller tables, each corresponding to an individual output module. Each small table is transmitted to the appropriate channel of the corresponding output module over the I/O bus. For example, MP A transmits the appropriate table to channel A of each output module over the I/O bus A. The transmittal of output data has priority over the routine scanning of all I/O modules.

Each MP provides a 16-megabyte DRAM for the user-written application program, sequence-of-events (SOE) tracking, and I/O data, diagnostics and communication buffers. The application program is stored in flash EPROM and loaded into DRAM for execution. The MPs receive power from redundant 24 VDC power sources. In the event of an external power failure, all critical retentive data is stored in NVRAM. A failure of one power source does not affect controller performance. If the controller loses power, the application program and all critical data are retained.

In addition, each MP can provide direct development and monitoring computer support and Modbus communication Each MP provides one (IEEE 802.3 Ethernet) Development System computer port for downloading the application program to the Trident controller and uploading diagnostic information, one Modbus RE-232/RS485 serial port which acts as a slave while an external host computer is the master. Typically, a distributed control system (DCS) monitors and optionally updates the controller data directly through an MP.

The triplicated I/O bus is carried baseplate-to-baseplate using Interconnect Assemblies, extender modules, and I/O bus cables. The redundant logic power distribution system is carried using Interconnect Assemblies and Extender modules.

The Channel 11, which is local to the MP baseplate, consists of three independent, serial links operating at 25 Mbaud. It synchronizes the MPs at the beginning of a scan. Then each MP sends its data to its upstream and downstream neighbors. The Channel 11 takes the following actions: transfers input, diagnostic and communication data, compares data and flags disagreements for the previous scan's output data and application program memory. A single transmitter is used to send data to both the upstream and downstream MPs. This ensures that the same data is received by the upstream processor and the downstream processor.

Field signal distribution is local to each I/O baseplate. Each I/O module transfers signals to or from the field through its associated baseplate assembly. The two I/O module slots on the baseplate tie together as one logical slot. A first position holds the active I/O module and the second position holds the hot-spare I/O module. Each field connection on the baseplate extends to both active and hot-spare I/O modules. Therefore, both the active module and the hot-spare module receive the same information from the field termination wiring.

The 2 Mbaud triplicated I/O bus transfers data between the I/O modules and the MP. The I/O bus is carried along the DIN mounting rail and can be extended to multiple DIN rails. Each channel of the I/O bus runs between one MP and the corresponding channel on the I/O module. The I/O bus extends between DIN rails using a set of three I/O bus cables.

Logic power for the module on each DIN mounting rail draws power from the power rails through redundant DC-DC power converters. Each channel is powered independently from these redundant power sources.

The controller of the present invention incorporates integral online diagnostics. These diagnostics and specialized fault monitoring circuitry are able to detect and alarm all single fault and most multiple fault conditions. The circuitry includes but is not necessarily limited to I/O loop-back, watch-dog timers, and loss-of power sensors. Using the alarm information, the user is able to tailor the response of the system to the specific fault sequence and operating priorities of the application.

Each module can activate the system integrity alarm, which consists of normally closed (NC) relay contacts on each MP Module. Any failure condition, including loss or brown-out of system power, activates the alarm to summon plant maintenance personnel.

The front panel of each module provides light-emitting-diode (LED) indicators that show the status of the module or the external systems to which it may be connected, PASS, FAULT, and ACTIVE are common indicators. Other indicators are module—specific. A common module housing structure which accepts all circuit boards for the various modules Normal maintenance consists of replacing plug-in modules. A lighted FAULT indicator shows that the module has detected a fault and must be replaced.

All internal diagnostic and alarm status data is available for remote logging and report generation. Reporting is done through a local or remote host computer.

Additional special features include fault testing of channels through a loop-back through the base plate to ensure that the transmitting module is accurately transmitting data, and status information.

The MP modules running in parallel rendezvous each scan to vote, and run the application program. At each rendezvous the modules are time synchronized by the adjustment of their time clocks by a specific amount. Dependent on the disparity between time clocks either a positive or a negative adjustment is made to those clocks out of synchronization.

A System Executive runs the application program developed by a control engineer for a specific industrial site which is downloaded from a development PC. A System Input/Output Executive facilitates communication with the input/output modules and the System Executive. Both the System Executive and the System Input/Output Executive are resident on each MP processor modules.

Each processor module MP consists of two semi-independent designs, the processor section and the input/output section. The processor section is dedicated to the System Executive and associated firmware, the input/output section is dedicated to System Input/Output Executive and associated firmware. There are three processor modules in a system.

The three processor modules communicate with each other via an inter-processor bus called the Channel 11. The Channel 11 is a high speed fault tolerant communication path between the processors and is used primarily used for voting data. The three processor modules are time synchronized with each other by a fault tolerant subsystem called the synchronization system. Each processor module contains two ports that can be used for interface with a development computer system or as a slave interface. Each processor module also contains one optional port for System Executive development or LAN support. The System Executive for each processor module communicates with its companion Input/Output section for that processor via a shared memory interface. Each Input/Output section communicates with at least one Input/Output module via a triplicated communications bus. Each processor module also communicates with at least one communications module via a triplicated communications bus. The communication module provides TCP/IP networking connections to the development PC and DCS hosts. The communication module also provides development and slave interface ports.

Several interconnect legs couple each of the processor modules together to form the System Controller. Each leg of the System controller is controlled by separate processor modules and each processor module operates in parallel with the other two processor modules, as a member of a triad. The input/output executive scans each input/output module via the input/output bus. As each input/output module is scanned, the new input data is transmitted by the input/output module to processor module via shared memory located on the printed circuit board supporting the processor module and the input/output module.

The processor module stores the input data into an input table in its memory for evaluation by the application program.

Prior to the application program evaluation, the input table in each processor module is compared with the input tables on the other processor modules via the Channel 11. The Channel 11 is a three channel parallel to serial/serial to parallel communications interface with DMA controller, hardware loopback fault detection, CRC checking and processor module to processor module electrical isolation.

The complete input data in the table for each MP/IOP module 1 is transferred to the other MP/IOP module 1 in the system and then "voted" by the System Executive firmware SX 15'. After the Channel 11 transfer and input data voting has corrected the input values, the values are evaluated by the application program. The application program is executed in parallel on each processor module by the MPC860 microprocessor which forms the processor module. The application program generates a set of output values based upon the input values, according to the rules built in to the program by the Control Engineer. The processor section transmits the output values to the Input/Output section via a shared memory. The processor section also votes the output values via Channel 11 access to detect faults, i.e. non-compliant component. The input/output module separates the output data corresponding to individual Input/Output modules in the system. Output data for each input/output module is transmitted via an Input/Output bus to the Input/Output modules for application to field units.

DESCRIPTION OF THE SPECIFIC EMBODIMENT

Figure 1:
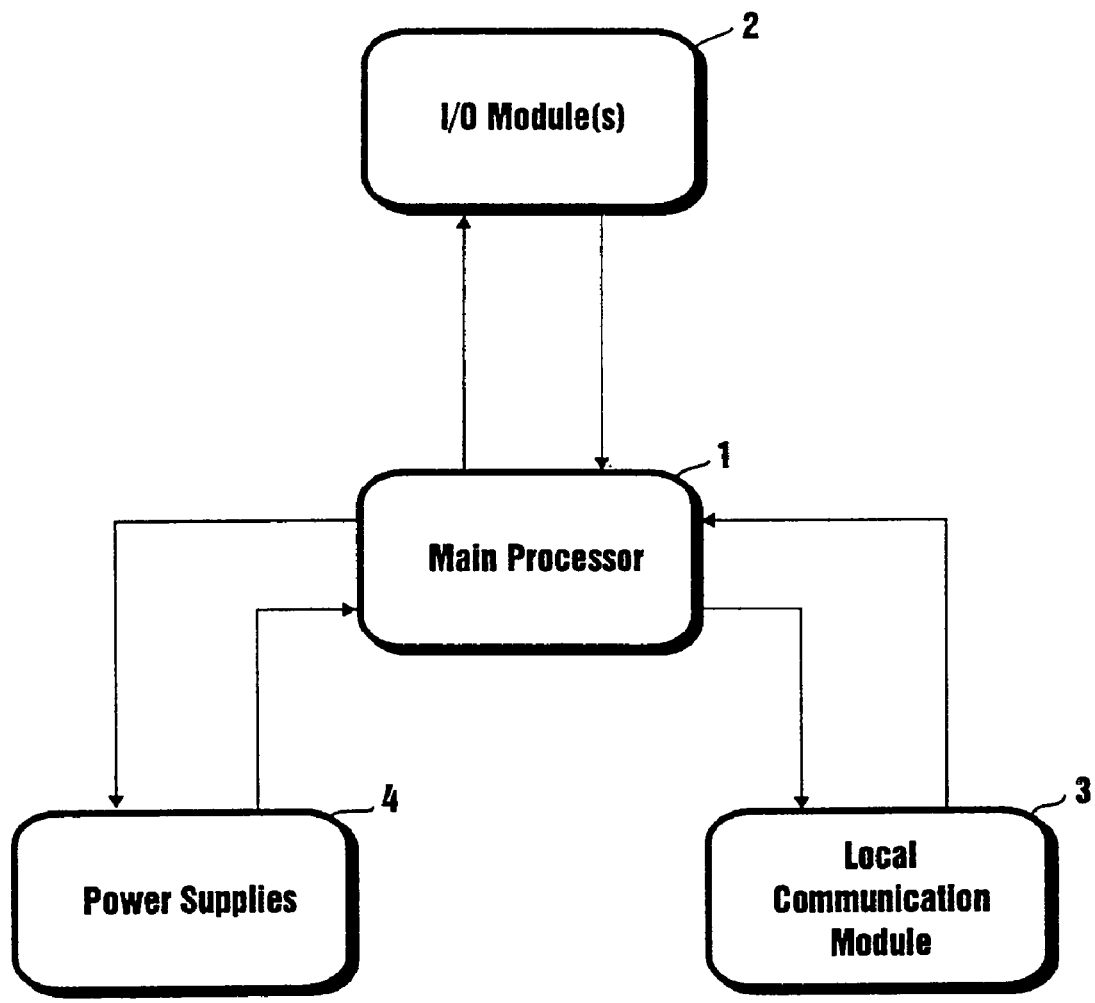
FIG. 1 Control system overall block diagram
FIG. 2 Detailed overall block diagram
FIG. 3 I/O Module block diagram
FIG. 4 Main processor module block diagram
FIGS. 5A-5B Rail mount
FIG. 6 Interface block diagram
FIG. 7 MP/IOP board block diagram
FIGS. 8A-8B Flow of program support for application program
FIGS. 9A-9B FPGA block diagram
FIG. 10A Minimum system block diagram
FIG. 10B Large system block diagram
FIGS. 11A-11B Communication paths for data capture and time synchronization
FIG. 12 Communication modules block diagram
FIG. 13 Enclosure diagram including heat dissipation pads and jackscrew
FIG. 14 Main processor board block diagram with dual power source
FIG. 15 Power board block diagram
FIG. 16 Dual board mounting structure and arrangement
FIG. 17 Profile of enclosure and interlock mechanism
FIG. 18 Faceplate covers
FIGS. 19A-19B Main processor
FIGS. 20A-20B Baseplate digital In base plate and connectors
FIGS. 21A-21B Baseplate digital out base plate and connectors
FIGS. 22A-22B Baseplate analog in base plate and connectors
FIGS. 23A-23B Baseplate registers out base plate and connectors
FIG. 24 FPGA register structure
FIG. 25 Time synchronization diagram

FIG. 1 is an overall block diagram of the control system which includes a Main processor 1, I/O modules 2, communication modules 3 and dual redundant power supplies 4.

Overview

Figure 2:
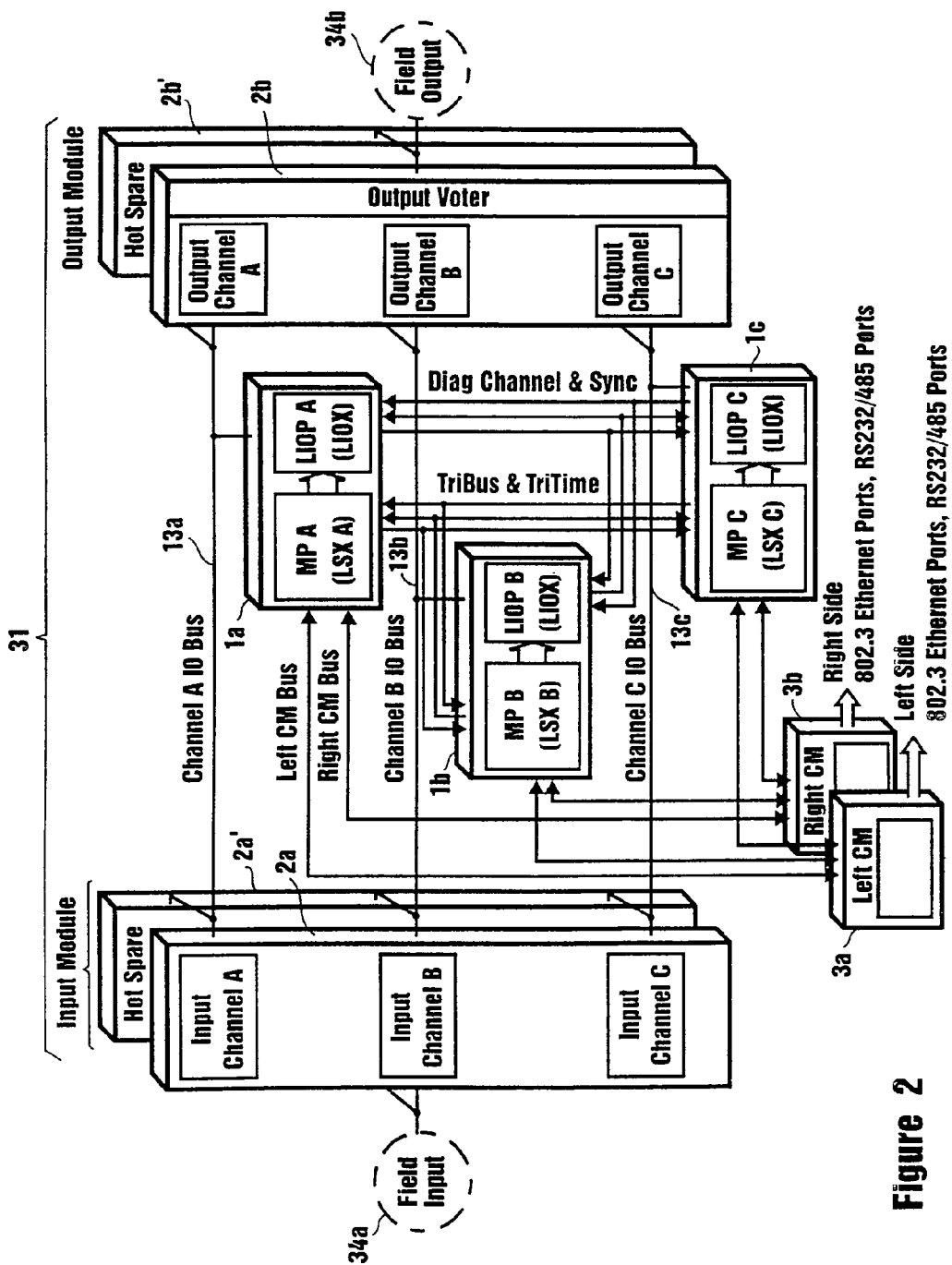

FIG. 2, shows a typical system configuration in more detail, which includes triple MP/IOP modules 1 (Sometimes referred to interchangeably as LMP/LIOP in the specification and drawings) having an MP(A) 1a, an MP(B) 1b and an MP(C) 1c assembly and may include up to six I/O assemblies of various types of I/O modules. Two I/O modules 2a and 2b are illustrated. Assemblies are configured into a system on a mounting base plate as shown in FIGS. 5A and 5B using interconnect assemblies, extenders, I/O bus cables (used to join I/O columns), and I/O bus terminators, I/O modules communicate with the MPs by means of a triplicated, RS485 bi-directions communication bus, called the I/O bus 13.

As noted above the present invention comprises a fault tolerant controller 31 comprising a triple modular redundant (TMR) architecture. The controller includes three identical channels, Channel A, 13a, Channel B, 13b, and Channel C 13c except for the power modules which are dual-redundant. Each MP, MP(A), 1a, MP(B), 1b, MP(C), 1c on the channel independently executes the application program in parallel with the other two MPs. Voting mechanisms qualify and verify all digital inputs and outputs from the field 34; analog inputs are subject to a mid-value selection process.

Each channel 13 is isolated from the others, no single-point failure in any channel 13 can pass to another. If a hardware failure occurs in one channel 13, the faultily channel 13 is overridden by the other channels. Repair consists of removing and replacing the failed module in the faulty channel while the controller is online and without process interruption.

Figure 3:
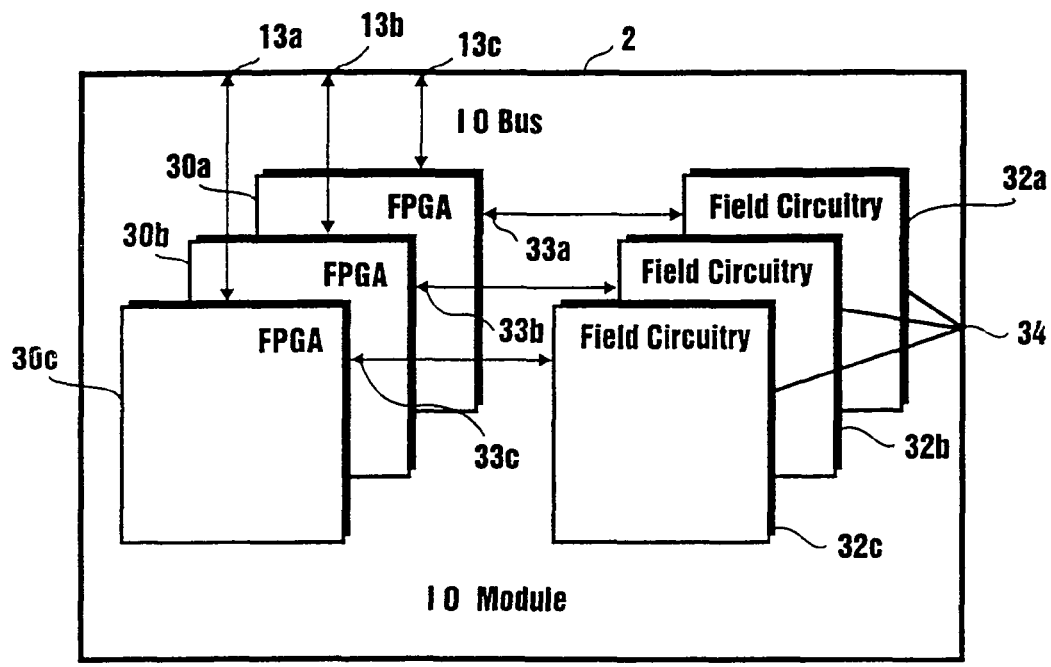

As shown in FIG. 2, each I/O module houses the circuitry for the three independent channels 13a, 13b, and 13c each channel serviced by an FPGA 30a, 30b, 30c, as shown in FIG. 3. Each FPGA 30 on the channels on the input modules reads the process data from the field circuitry 32a, 32b, and 32c and passes that information to the respective MP module 1.

The three MP/IOP modules 1 communicate with each other using a high-speed bus inter-MP bus called a channel 11. The system is a scan based system and once per scan, the MP modules 1 synchronize and communicate with the neighboring MP modules 1 over the Channel 11. The Channel 11 forwards copies of all analog and discrete input data to each MP module 1. Each MP module 1 compares its input table data with the input table data for all other MP modules 1. The MP modules 1 vote the input data, execute the application program and send outputs generated by the application program to the output modules 2a, 2b and 2b'. In addition, the controller 31 votes the output data at the FPGAs 30a, 30b and 30c on the output modules as close to the field as possible to detect and compensate for any errors that could occur between the Channel 11 voting and the final output driven to the field 34. For each I/O module 2, the controller 31 can support an optional hot-spare module 2' as shown in FIG. 2. If present, the hot-spare takes control if a fault is detected on the primary module during operation. The hot-spare position is also used for the online-hot repair of a faulty I/O modules.

Figure 4:
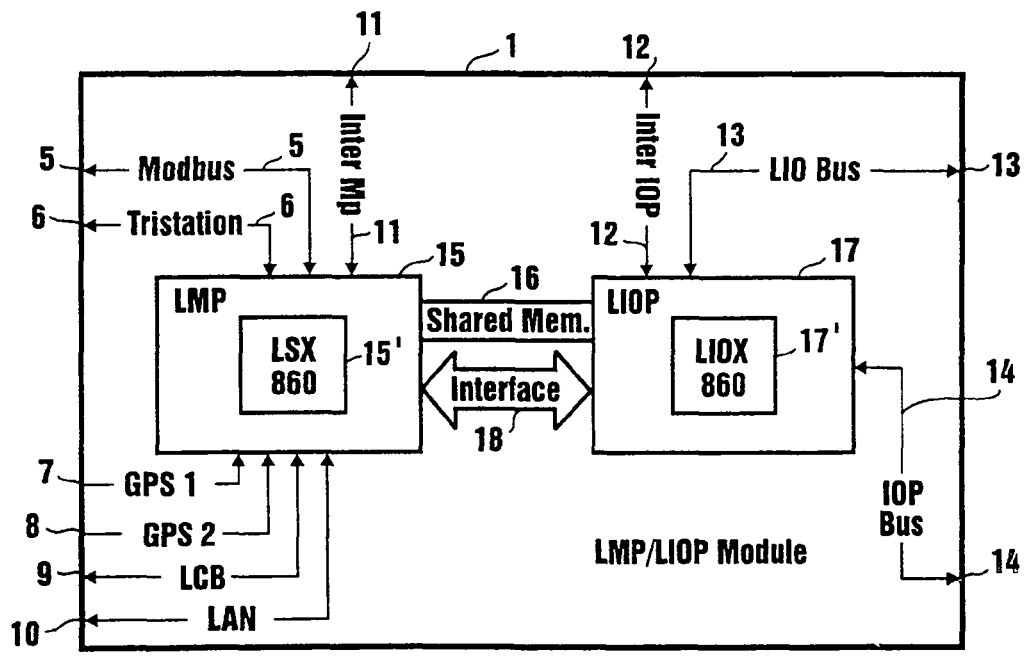

The MP modules 1 each control a separate channel and operate in parallel with the other two MPs. A dedicated I/O control processor IOX 17' on each MP/IOP module 1 as shown in FIG. 4 manages the data exchanged between the MP/IOP module 1 and the I/O modules 2. A triplicated I/O bus 13, located on the base plates may be extended from one column of I/O modules 2 to another column of I/O modules 2 using IO bus cables. In this way the system can be expanded. Each MP module 1 poles the appropriate channel 13 of the I/O bus 13 and the I/O bus transmits new input data to the MP module 1 on polling the channel. The input data is assembled into an input table in the MP module 1 and is stored in memory for use in the voting process.

Referring to FIG. 2, each input table in each MP module 1 is transferred to its neighboring MP module 1 over the Channel 11. After this transfer, voting takes place. The Channel 11 uses a programmable device with a direct memory access to synchronize, transmit, and compare data among the three MP modules 1a, 1b and 1c.

If a disagreement occurs, the signal value found in two of three tables prevails, and the third table is corrected accordingly. Each MP module 1 maintains data about necessary corrections in local memory. Any disparity is flagged and used at the end of the scan by built-in fault analyzer routines to determine whether a fault exists on a particular module.

Each of the MP modules 1 sends corrected data to the application program and then executes the application program in parallel with the neighboring MP modules 1. The application generates a table of output values that result from the table of input values according to user-defined rules. The I/O control processor IOP 17 on each MP module 1 manages the transmission of output data to the output modules 2a by means of the I/O bus 13. Using the table of output values, the I/O control processor 17 generates smaller tables, each corresponding to an individual output module 2a where there are multiple output modules 2a. Each small table is transmitted to the appropriate channel of the corresponding output module 2a over the I/O bus 13. For example, MP module (A) 1a transmits the appropriate table to channel A of each output module 2b and 2b' I/O bus(A) 13a. The transmittal of output data has priority over the routine scanning of all I/O modules 2.

Each MP module 1 provides a 16-megabyte DRAM for the user-written application program, sequence-of-events (SOE) tracking, and I/O data and data tables, diagnostics and communication buffers. The application program is stored in flash EPROM and loaded into DRAM for execution. The MP modules 1 receive power from redundant 24 VDC power sources. In the event of an external power failure, all critical retentive data is stored in NVRAM. A failure of one power source does not affect controller performance. If the controller loses power, the application-program and all critical data are retained.

In addition each MP module 1 can provide direct development and monitoring computer 6 support (Development System) and Modbus 5 communications. Each MP module 1 provides one (IEEE 802.3 Ethernet) Development System computer port for downloading the application program to the controller and uploading diagnostic information. One Modbus RE-232/RS485 serial port which acts as a slave while an external host computer is the master. Typically, a distributed control system (DCS) monitors and optionally updates the controller 31 data directly through an MP module 1 connection.

The triplicated I/O bus 13 is carried baseplate-to-baseplate using interconnect assemblies, extender modules, and I/O bus cables and the like mounted on a rail 66 as shown in FIGS. 5A & 5B. The redundant logic power distribution system is carried using interconnect assemblies and extender modules on the rail thus permitting expansion on the rail or to multiple rails.

The Channel 11, which is local to the MP module baseplate, consists of three independent, serial links operating at 25 Mbaud. The TriBus channel is used to synchronize the MP modules 1 at the beginning of a scan. Then each MP module 1 sends its data to its upstream and downstream neighboring MP modules 1. The Channel 11 transfers input, diagnostic and communication data, compares data and disagreements are flagged by the MP modules 1 for the previous scan's output data and application program memory. A single transmitter is used to send data to both the upstream and downstream MP modules 1 by a transmitting MP module 1. This facilitates reception of the same data by the upstream processor and the downstream processor.

Field 34 signal distribution is local to each I/O baseplate. Each I/O module transfers signals to (in the case of an output module 2) or from the field (in the case of an input module 2) through its associated baseplate assembly. There are two I/O module slots on the baseplate tie together as one logical slot as shown in FIGS. 5A and 5B; a first position holds the active I/O module 2a and 2b and the second position holds the hot-spare I/O module 2a' and 2b'. Each field 34 connection on the baseplate extends to both active and hot-spare I/O modules 2a' and 2b'. Therefore, both the active module 2a and the hot-spare module 2a' receive the same information from the field 34 termination wiring in the case of Input and in the case of output module 2b and the hot spare module 2b' are sent the same information in the case of output.

The triplicated I/O bus 13 transfers data between the I/O modules 2 and the MP modules 1. The I/O 13 bus is carried on a DIN mounting rail 66, as shown in FIGS. 5A and 5B and can be extended to multiple DIN rails 66. Each channel 13 of the I/O bus 2 runs between one MP module 1 and the corresponding channel on the I/O module 2.

Logic power for the modules on each DIN mounting rail 66 draws power from the rails through redundant DC-DC power converters. Each channel is powered independently from these redundant power sources.

The MP/IOP module 1 monitors each of the three input channels 13a, 13b and 13c measures the input signals from each point on the baseplate asynchronously, determines the respective states of the input signals, and places the values into input tables A, B and C respectively. Each input table in each MP module 1 is interrogated at regular intervals over the I/O bus 13 by the IOP processor 17 located on the corresponding MP/IOP module 1, for example, MP module A (1a) would interrogate Input Table A 1 over I/O Bus A (13a).

Figure 6:
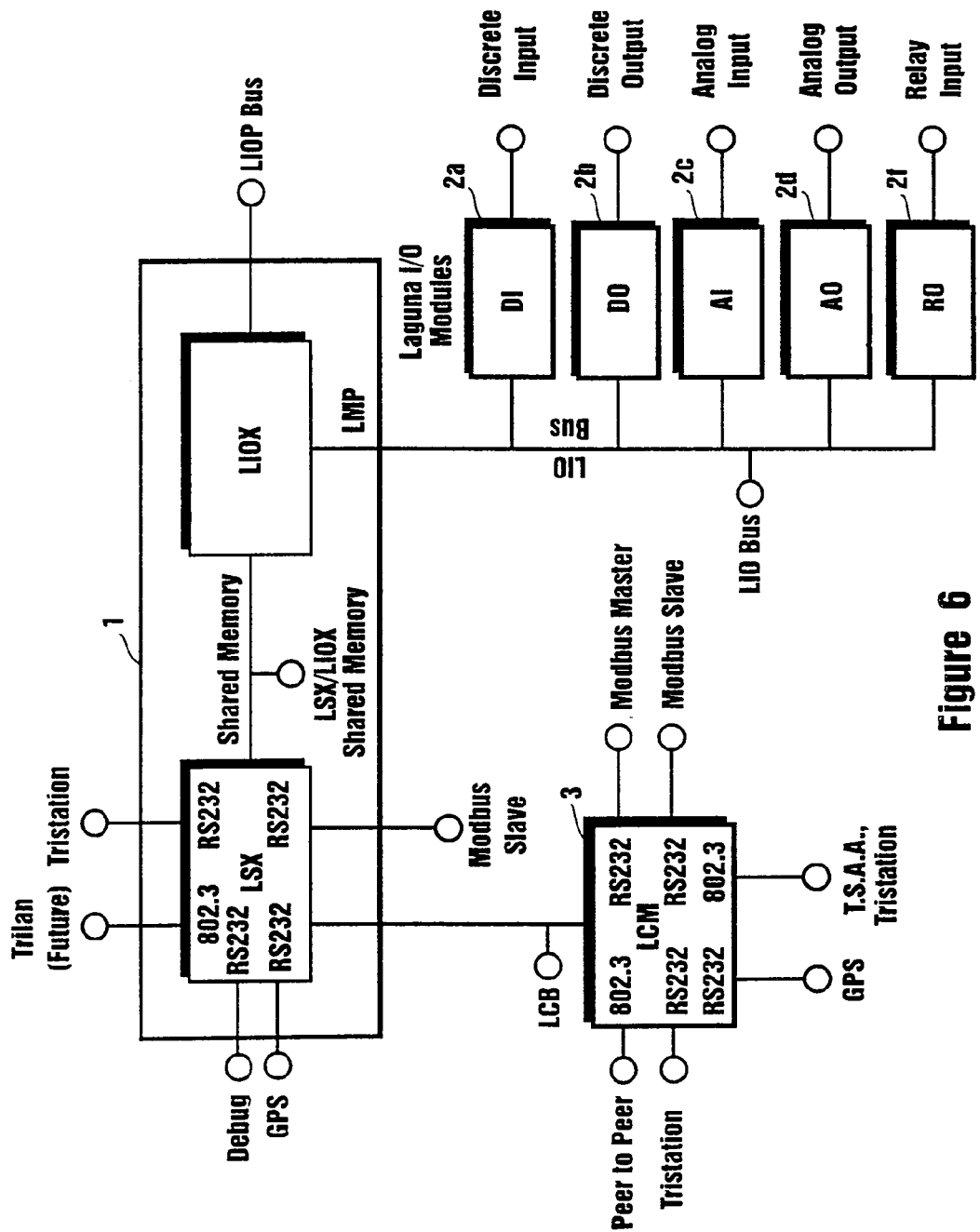
Figure 7:
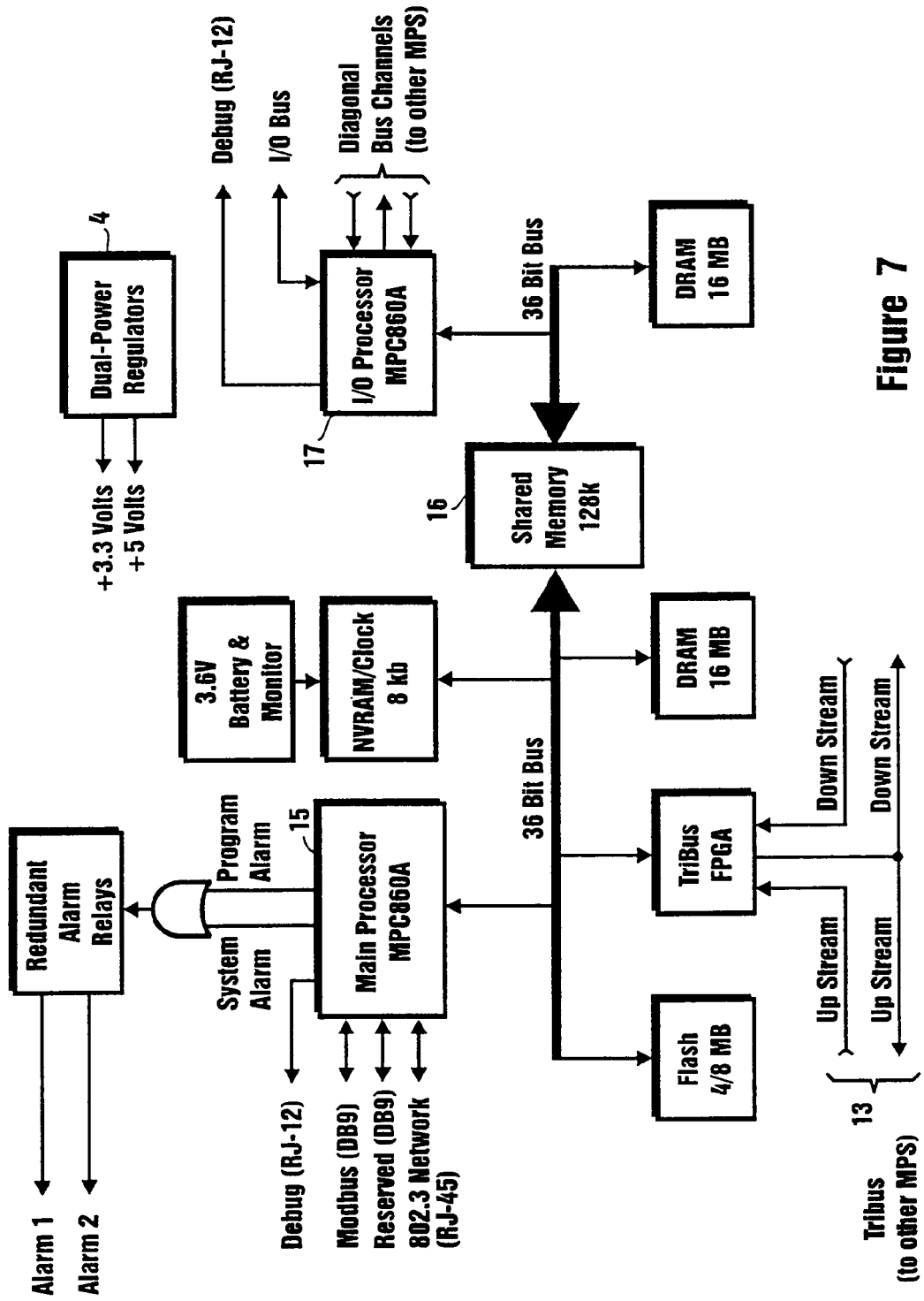

The I/O modules are specific in application or function and functionality may be expanded as required by the addition of additional functional modules. Referring to FIG. 6, the interfaces for the controller 31 are shown to include I/O modules 2 configured as a Digital Input Module 2a (DI), a Digital Output module, 2b (DO) an Analog Input module 2c (AI) an Analog Output module 2d (AO), a Relay Output module 2e (RO) and a Relay Input Module 2f (RI).

The Digital (Discrete) Input Module 2a contains the circuitry for three identical channels 13 as shown in FIG. 3 as 13a, 13b and 13c (A, B, and C). Although the channels reside on the same module 2, they are completely isolated from each other and operate independently. Each channel 13 contains an application-specific integrated circuit (ASIC) which handles communication with its corresponding MP module 1, and supports run-time diagnostics. Each of the three input channels measures the input signals from each point on the baseplate asynchronously, determines the respective states of the input signals, and places the values into input tables A, B and C respectively. Each input table is interrogated at regular intervals over the I/O bus by the I/O communication processor located on the corresponding MP, for example, MP A interrogates Input Table A over I/O Bus A as shown in FIG. 2. A redundant or hot spare is illustrated as 26'.

Special self-test circuitry is provided to detect and alarm all stuck-at and accuracy fault conditions in less than 500 milliseconds and allows unrestricted operation under a variety of multiple fault scenarios.

The input diagnostics are specifically designed to monitor devices which hold points in one state for long periods of time. The diagnostics ensure complete fault coverage of each input circuit even if the actual state of the input points never changes.

The DO (Digital Output module) module 2b also contains the circuitry for three identical, isolated channels 13, Each channel and includes an ASIC which receives its output table from the I/O communication processor 17 on its corresponding main processor MP module 1. All DO modules 2b use special quad output circuitry to vote on the individual output signals just before they are applied to the load. This voter circuitry is based on parallel-series paths which pass power if the drivers for channels A and B or channels B and C, or channels A and C command them to close. In other words, 2 out of 3 drivers are voted "on". The quad output circuitry provides multiple redundancy for all critical signal paths, guaranteeing safety and maximum availability.

A DO module executes an output voter diagnostic (OVD) routine at a predetermined time on each point. OVD detects and alarms two different types of faults. The first is "points"—all stuck-on and stuck-off points are detected in less than 500 milliseconds. The second is "switches"—all stuck on or stuck-off switches or their associated drive circuitry are detected. During OVD execution, the commanded state of each point is momentarily reversed on one of the output drivers, one after another. Loop-back on the module allows each ASIC to read the output value for the point to determine whether a latent fault exists within the output circuit. The output signal transition is less than 2 millisecond and is transparent to most field devices. OVD is designed to check outputs which typically remain in one state for long periods of time. The OVD strategy for a DO Module ensures full fault coverage of the output circuitry even if the commanded state of the points never changes.

On an AI Module 2c, as shown in FIG. 6, each I/O FPGA 30 on channel 13 measures the input signals asynchronously and places the results into an input table of values. Each input table is passed to the associated MP module 1 using the corresponding I/O bus 13. The input table in each MP module 1 is also transferred to its neighbors across the Channel 11. A middle value is selected by each MP module 1, and the input table in each other MP module 1 is corrected accordingly. In TMR mode, the mid-value data is used by the application program; in duplex mode, an average is used. An analog output (AO) module may also be included for analog adjustment of an analog driven parameter.

The Relay Output (RO) and Relay Input (RI) Module is a non-triplicated module for use on non-critical points which are not compatible with high-side, solid-state output switches; for example, interfacing with enunciator panels. The RO Module receives output signals from the MPs on each of three channels. The three sets of signals are then voted, and the voted data is used to drive the 32 individual relays. Each output has a loop-back circuit which verifies the operation of each relay switch independently of the presence of a load. Ongoing diagnostics test the operational status of the RO Module.

Special self-test circuitry is provided to detect and alarm all stuck-at and accuracy fault conditions in less than 500 milliseconds.

DETAILED DESCRIPTION

Figure 14:
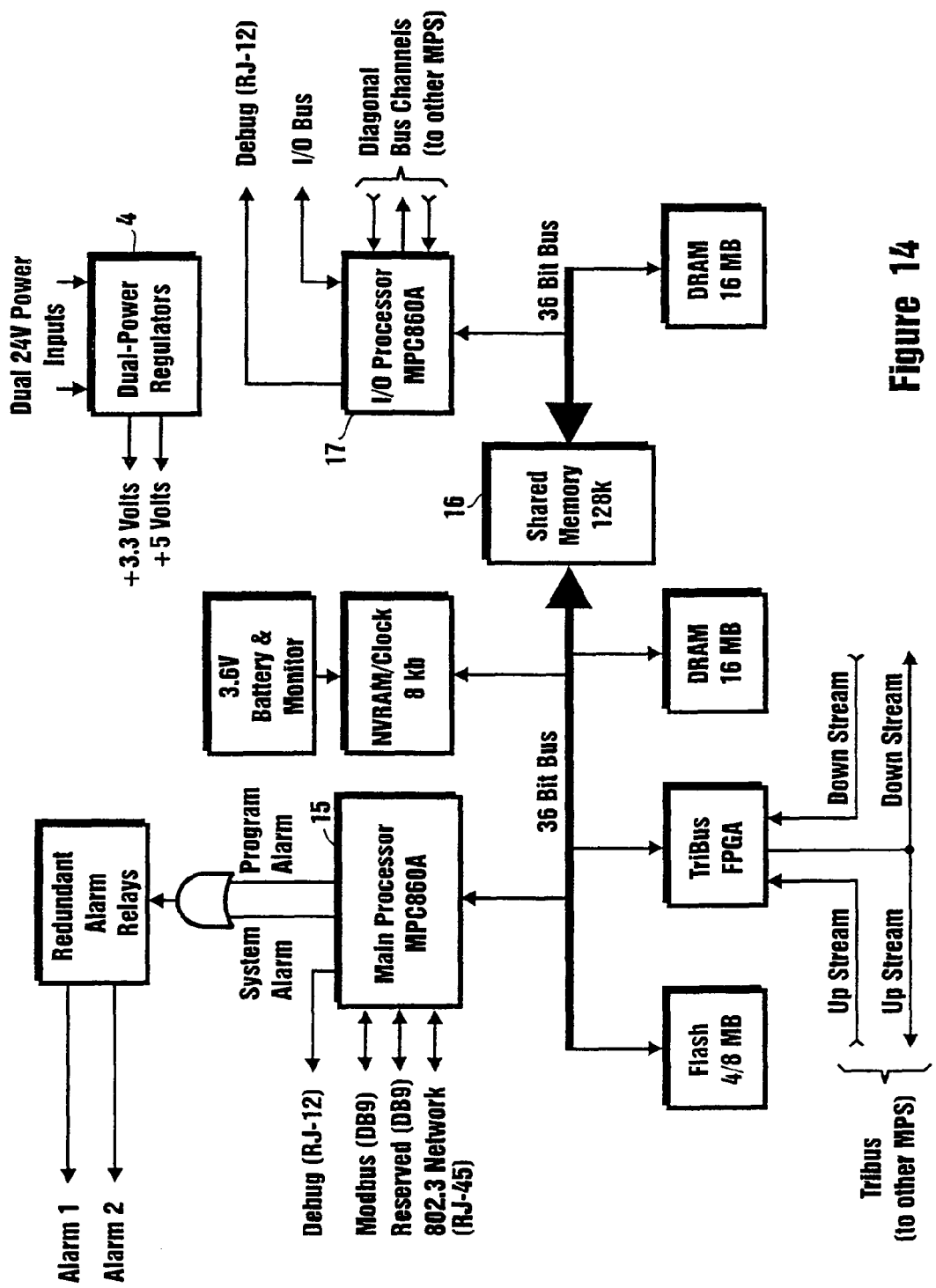

Each I/O module 2 is designed to operate directly from redundant 24 VDS power sources as shown in FIG. 14. Logic power is carried baseplate-to-baseplate, allowing a signal logic power connection per column. The power conditions circuitry is protected against over-voltage, over-temperature, and over-load conditions. Integral diagnostic circuitry checks for out-of-range voltages and over-temperature conditions. A short on a channel 13 disables the power regulator rather than affecting the power sources.

The controller 31 of the present invention incorporates integral online diagnostics. These diagnostics and specialized fault monitoring circuitry are able to detect and alarm all single fault and most multiple fault conditions. The circuitry includes but is not necessarily limited to I/O loop-back, watch-dog timers, and loss-of power sensors. Using the alarm information, the user is able to tailor the response of the system to the specific fault sequence and operating priorities of the application.

Each module can activate the system integrity alarm, which consists of normally closed (NC) relay contacts on each MP/IOP module 1. Any failure condition, including loss or brown-out of system power, activates the alarm to summon plant maintenance personnel.

Figure 16:
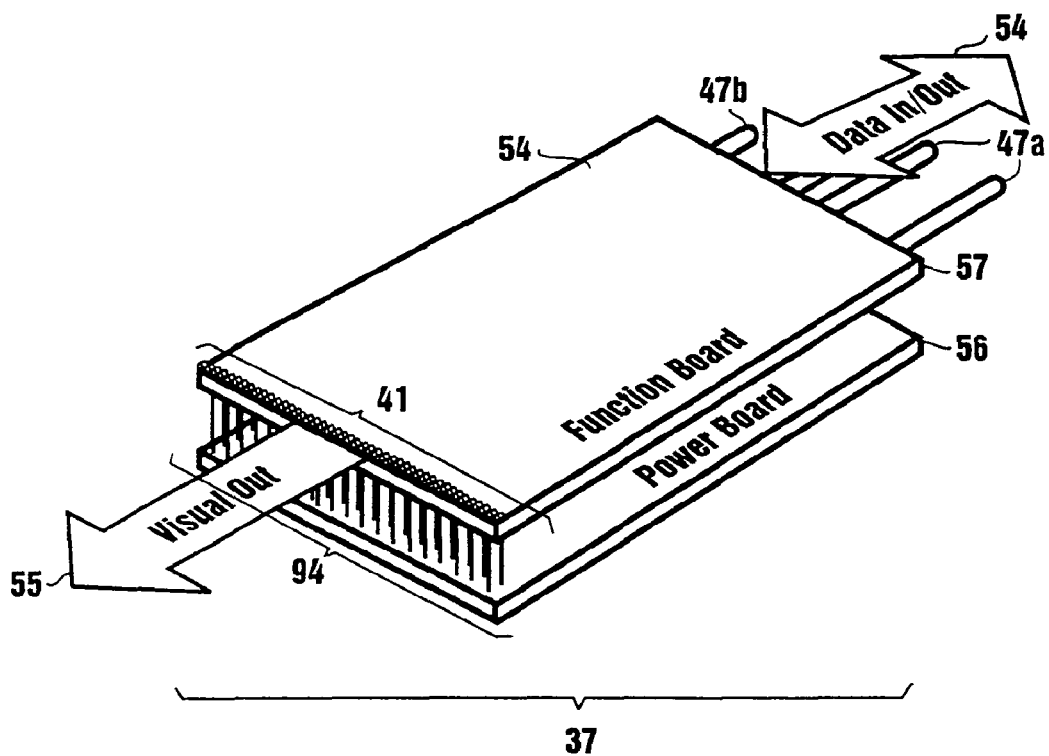

The front panel of each module provides light-emitting-diodes (LED) 41 indicators as shown on FIG. 16 that show the status of the module or the external systems to which it may be connected, PASS, FAULT, and ACTIVE are common indicators. Other indicators are module—specific.

Normal maintenance consists of replacing plug-in modules. A lighted FAULT indicator shows that the module has detected a fault and must be replaced.

All internal diagnostic and alarm status data is available for remote logging and report generation. Reporting is done through a local or remote host computer.

Additional special features include fault testing of channels through a loop-back through the base plate to ensure that the transmitting module is accurately transmitting data, and status information.

The MP/IOP modules 1 running in parallel rendezvous each scan to vote, and run the application program. At each rendezvous the MP/IOP modules 1 are time synchronized by the adjustment of their time clocks by an amount required to bring them into synchronization. Dependent on the disparity between time clocks either a positive or a negative adjustment is made to those clocks out of synchronization.

Referring again to FIG. 4, the preferred main processor (MP, 15) CPU is a Motorola MPC860 operating at 50 MHz with PLL enabled. The oscillator tolerance is 25 ppm. The MP 15 uses the following components of the MPC860, RISC CPU, 4 Kbyte data cache, 4 Kbyte instruction cache, MMU, Memory controller, Time base used for a real time clock, Interrupt controller used for all serial and DMA channels, Channel 11, and synchronization system interrupts, the PC 860, Parallel port is used for LEDs and miscellaneous I/O, Communications Processor and other communicators.

The Main Processor, MP/IOP module 1 comprises at least two semi-independent sections, the MP 15 (main processor) and the IOP 17 (Input/Output Processor). Also provided are a Modbus port 5 which is a Modicon protocol port. The system supports acting as a slave to the port 5 communication link. A development system port 6 is also provided through which the application program developed may be downloaded from a development PC or other computer and the controller 31 monitored. Communications between the main processor MP 15 sections and other main processor sections of other MP/IOP modules 1 takes place over the Channel 11. Communication between the Input/Output, IOP sections 17, with other processor IOP sections 17 takes place over the IOP bus 14. Communications between the MP/IOP module 1 and communications CM module 3 take place over the LCB bus 9.

Each MP/IOP module 1 is capable of operating in SINGLE, DUAL and TMR (Triple Modular Redundant) modes. Each MP/IOP module 1 may control up to 56 I/O base-plate assemblies (LIO modules 2). The number of I/O base-plate assemblies varies based upon system options and requirements for a given industrial or other installation.

The IOP 17 uses the following components of the MPC860: a RISC CPU, 4 Kbyte data cache, 4 Kbyte instruction cache, Memory Management Unit, Memory controller, a Time base, use for IOX 17' real time clock, Interrupt controller used for all serial and DMA channels. Parallel port used for IOP 17 leg synchronization, and LEDs and miscellaneous I/O, a Communications Processor, BDM Port, SCCI used for remote/expansion IOP bus, SCC2 used for the LIO bus, SCC3 used for upstream IOP communications, SCC4 used for downstream 10P 17 communications, SCM2 used for very low level hardware and IOX 17' debug & development. The IOP 17 clock is derived from the MP 15 50 MHz clock.

As shown in FIG. 4 the MP 15 is dedicated to SX 15' (the system executive) and associated firmware, the IOP 17 is dedicated to IOX 17' (the input output executive) and associated firmware. Each MP 15 section also includes one optional 802.3 port 10 for SX 15' development or LAN support. Each MP 15 communicates with its associated IOP 17 via a shared memory interface 18 to memory unit 16.

Figure 8A:
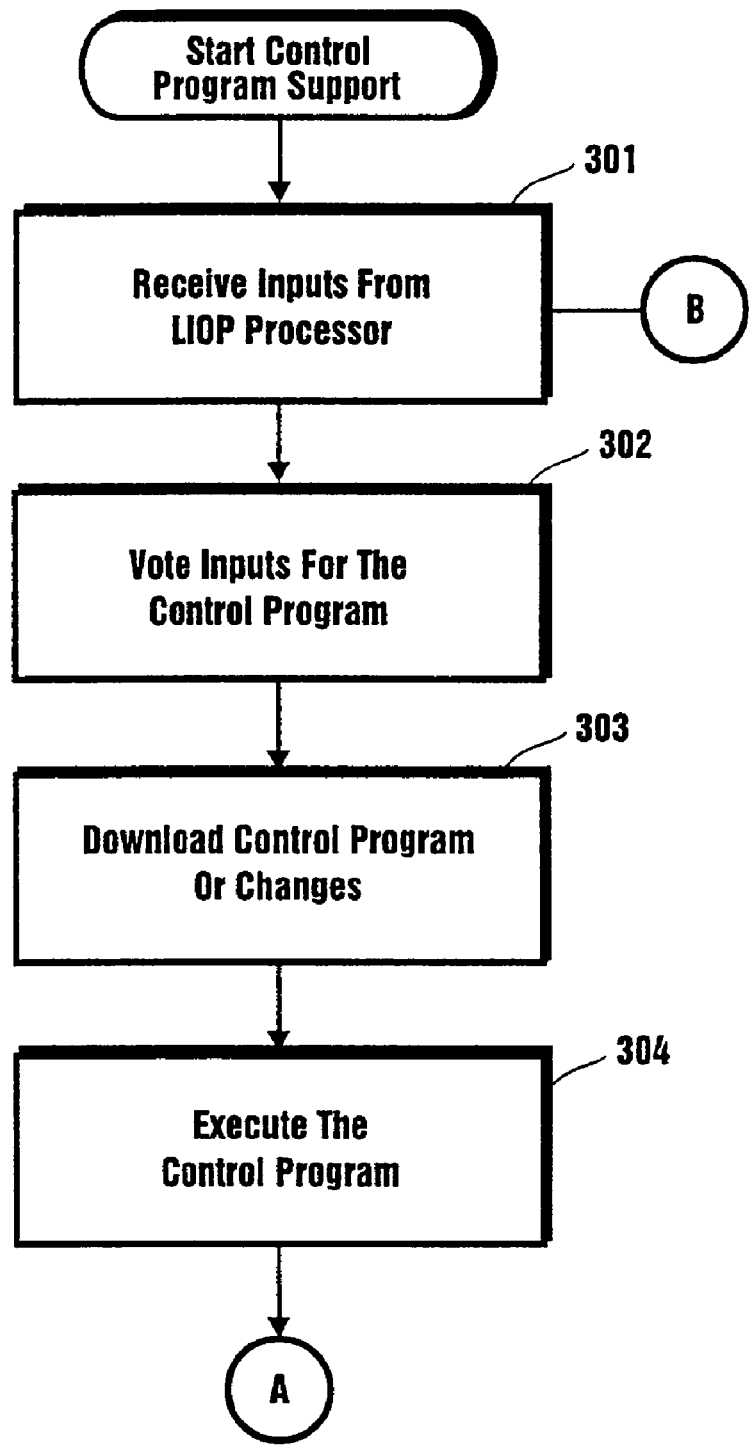
Figure 8B:
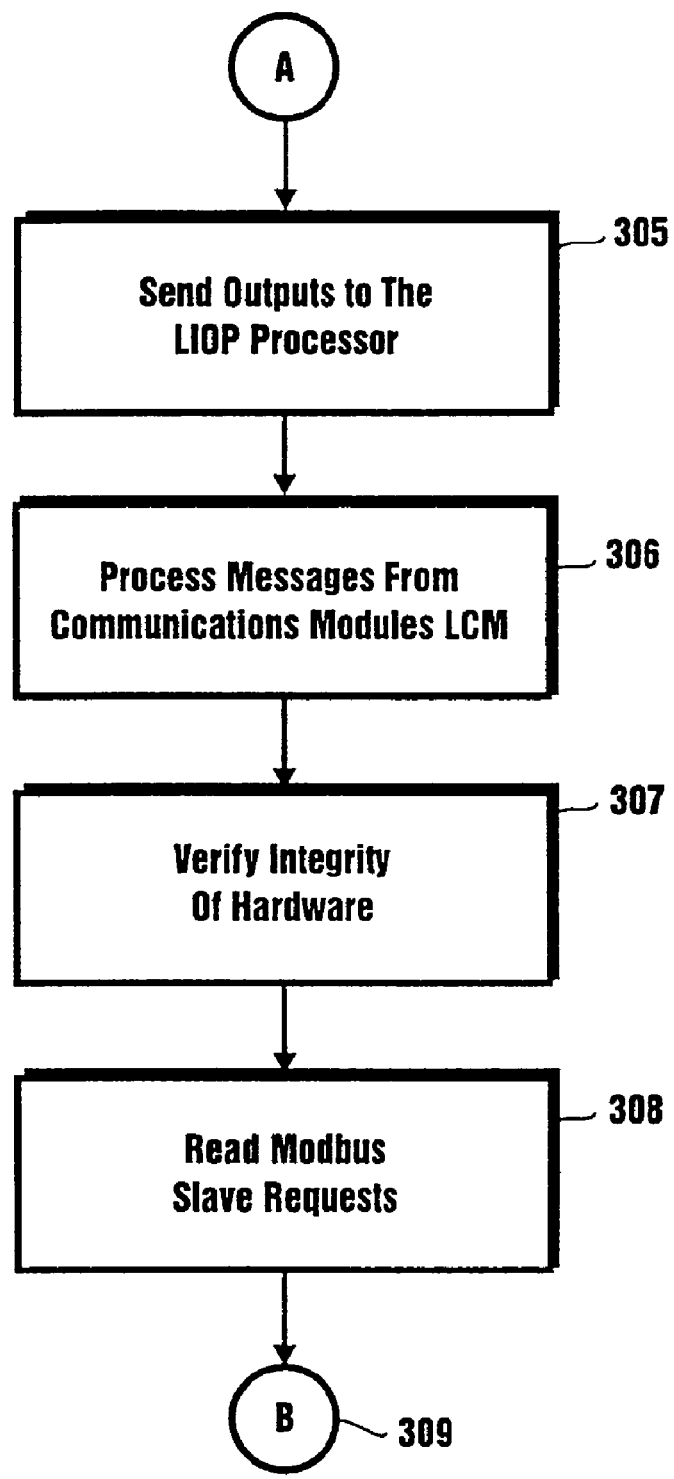

The primary function of SX 15' is to provide an execution environment for a application program developed by a Control Engineer for a particular industrial control system. To provide this environment, the SX 15' is engaged in performing the following steps as shown in FIGS. 8A and 8B:

1. Receiving Inputs from the IOP 17, step 301;
2. Voting Inputs for the application program, step 302;
3. Downloading application programs (All and Changes), step 303;
4. Executing application programs, step 304;
5. Sending outputs to the IOP 17, step 305;
6. Sending Configuration Information to the IOP 17, step 306;
7. Processing messages from Communications Modules LCM, step 307;
8. Verifying the integrity of the hardware, step 308;
9. Reading Modbus Slave Requests, step 309; and
10. Return for more inputs, step 310.

Figure 10A:
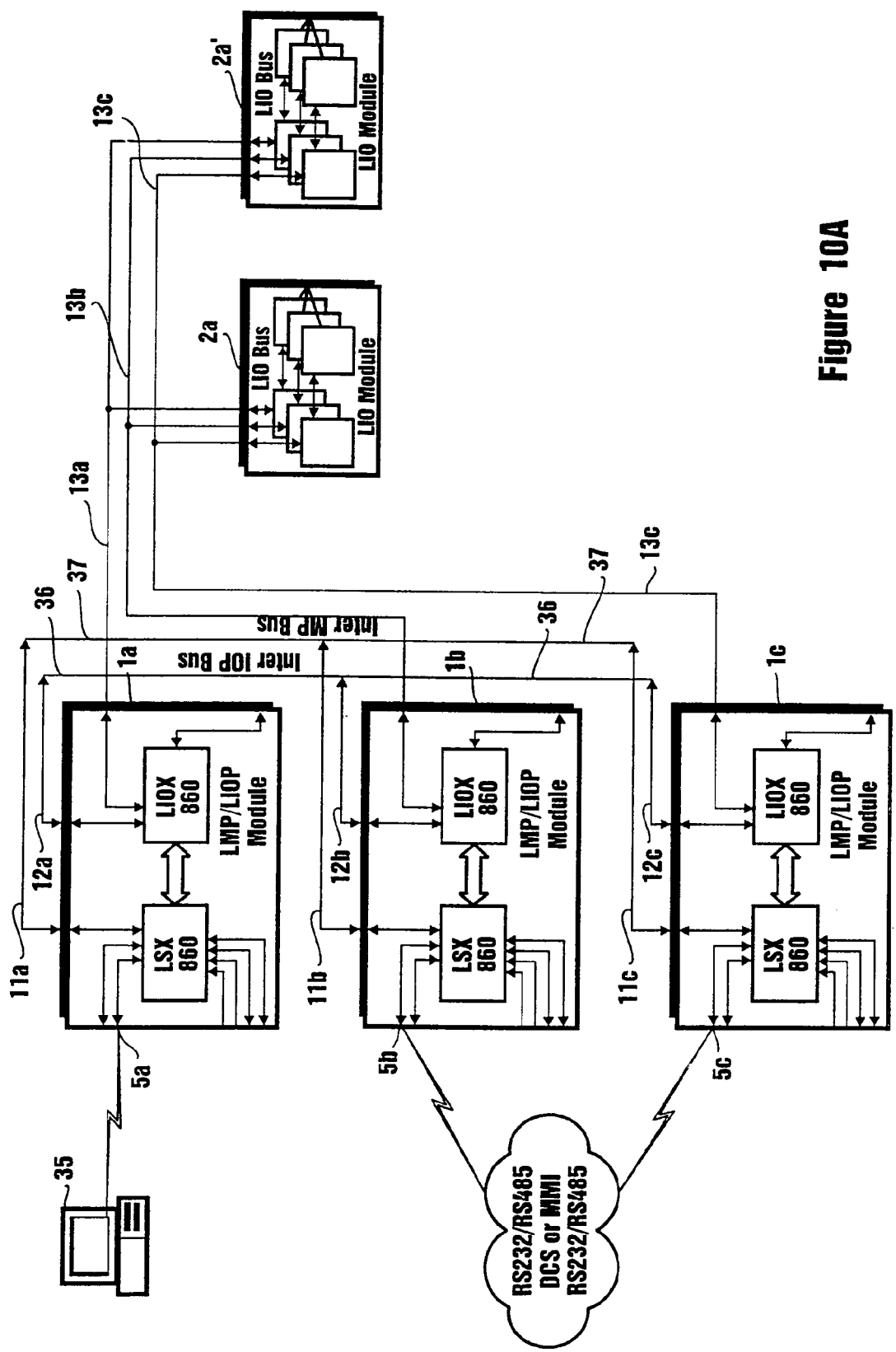

The SX 15' firmware executes the application program generated by the user and down loaded from a development PC 35 or other computer system as shown in FIG. 10A. The application program uses Digital and Analog IOP Inputs and sends outputs to the input/output and communication boards. SX 15' controls timing and synchronization between the three MPs 15, voting of input data and system data, detection and analysis of I/O faults and internal faults, and communication with the development system 35 and a diagnostic port.

The SX 15' runs in parallel on each of the three Main Processors 1a, 1b and 1c controls timing and synchronization between the three MP modules 15 and the voting of input data and system data. These Processors are kept in real time synchronization by a combination of the time specific hardware and software functions. SX 15' uses real time synchronization to rendezvous all of the Main Processors at a maximum scan rate. The scan rate is selectable by the user within the range of 10 ms to 450 ms. Once the rendezvous occurs, each SX 15' transfers information tables between the three Main Processors. SX 15' then determines what functions need to be done during the scan. These include updating memory, running an application program, and the like.

Referring again to FIG. 2 and FIG. 4, the IOX 17' firmware executes on a separate 50 MHz MPC860 CPU, located on the MP/IOP module 1. There are three identical copies of IOX 17 firmware, on each MP/IOP module 1. These copies are referred to as legs A, B and C based on the MP 15 they are running on. Each leg or channel (between MPs) has an upstream leg and a downstream leg, referred to as US and DS. The following table defines the Upstream, US, and Downstream, DS, mapping functions. The relationship is illustrated in FIG. 11 showing upstream and downstream paths. Where u=upstream, d=downstream, m=me, T=TTS pulse, L=Loopback capture, C=Capture.

Figure 10B:
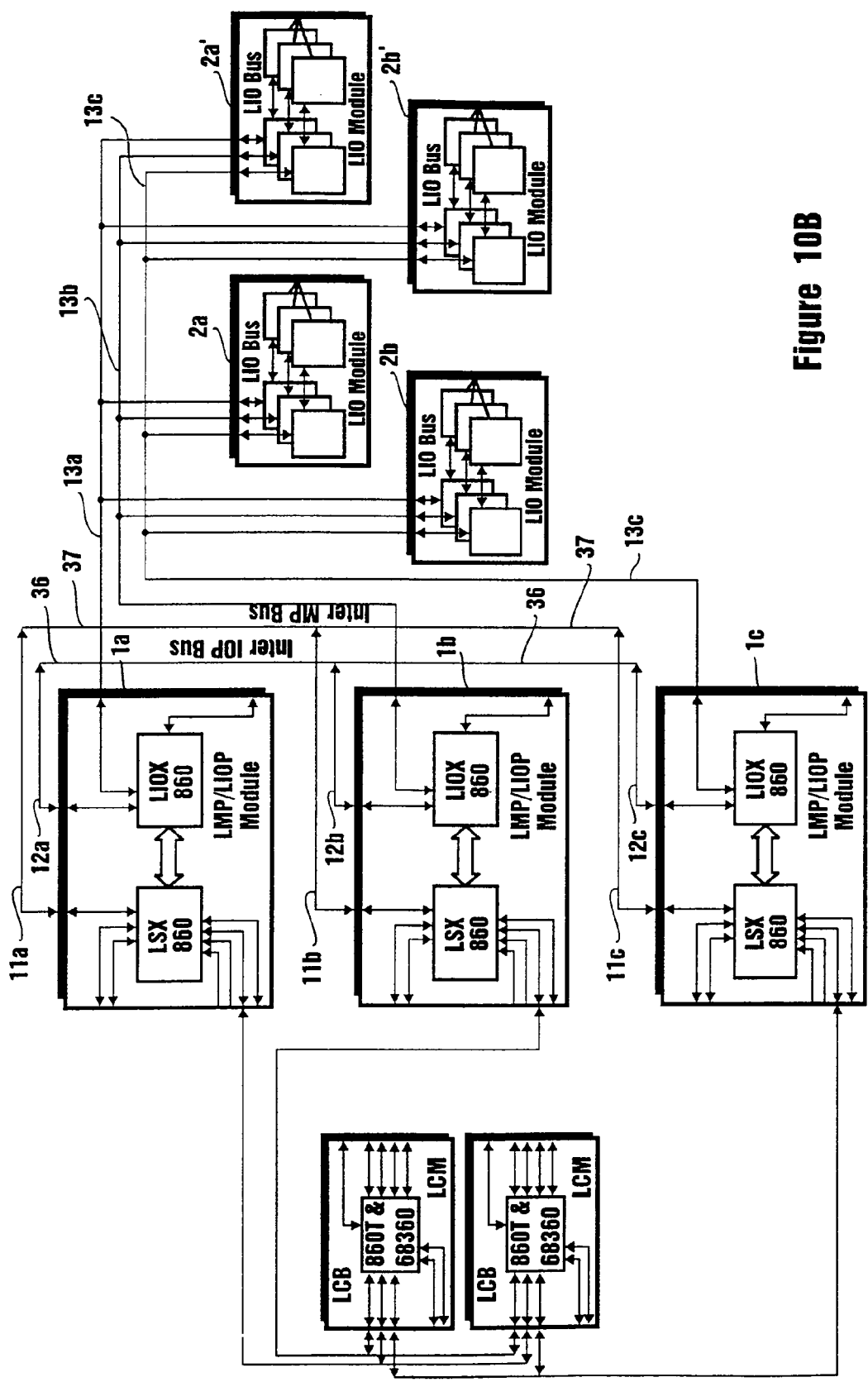

As shown in FIG. 10A, the typical minimum system of the present invention includes three MP/IOP modules; 1a, 1b and 1c. At least one of these modules, 1a, may be connected to a application program development computer 35 over a development connection 6 to the system executive, SX 15'. This connection permits a download of the application program developed on the development system 35 to at least one of the three processors 1a, 1b, 1c which loads the program to the other two. Additionally, an interface over the Modbus 5 for each of the processors permits distributed processor control system (DCS) and human machine interface (HMI) communications over RS232/RS485 bus ports, 5b and 5c. Each of the processors communicates over an LIO bus 13 on independent interconnection lines 13a, 13b and 13c as shown in FIGS. 10A and 10B. Each of the LIO bus connections interfaces with the LIO modules 2a and 2b, shown by way of example, each of which have triplicated FPGAs 30a, 30b, and 30c over bus 13a, 13b and 13c. Each FPGA is coupled to the field circuitry 32a, 32b and 32c respectively which receives field inputs 34 for the particular control system being monitored. The I/O modules may as noted above be configured for particular services, such as DI, DO, AI, AO, RO, RI and the like.

With reference to FIG. 10B, an alternate configuration of the triplicated main processors 1a, 1b and 1c is shown utilizing dual communication modules 3a and 3b which provide the Modbus and Development serial links, but in addition provide external communication links for external communications. In this configuration the Modbus 5 and Development 6 ports on the MP/IOP modules 1a, 1b, and 1c are disabled. Each of the LCM modules 3a and 3b communicates with each of the respective MP/IOP modules 1 over communication lines 9a, 9b and 9c which are coupled to the communication bus (LCB) of each of the main processors. FIG. 10B also shows additional LIO modules 2c and 2d attached to the LIO bus to illustrate that multiple LIO modules 2 may be connected on the same LIO bus 13.

Figure 12:
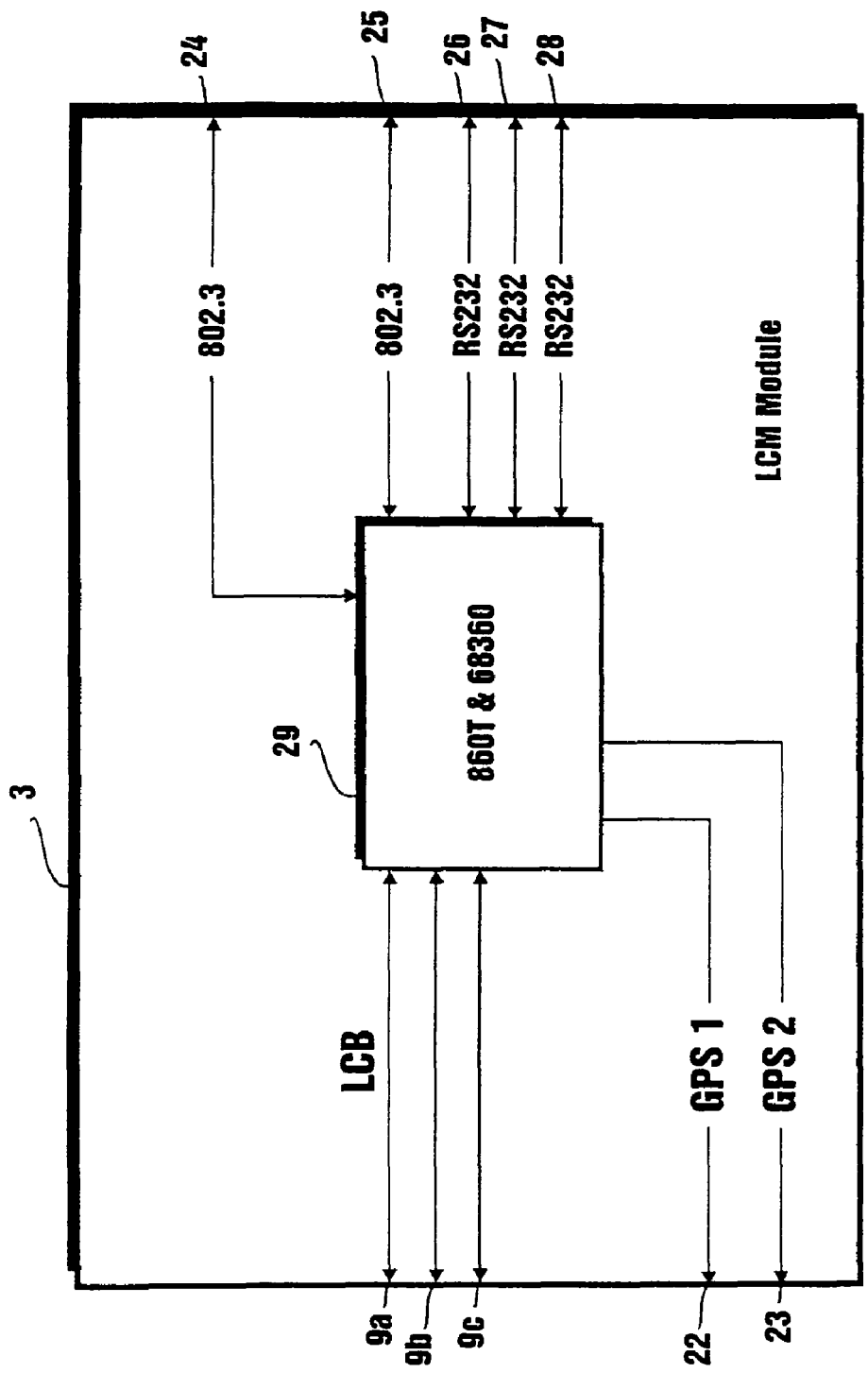

While the system of the present invention is shown as triplicated MP/IOP modules 1, multiple LIO modules 2 and optionally one or more LCM modules 3, other configurations are possible to provide more or less, redundancy. As shown in FIG. 12, the LCM module 3 provides two 802.3 TCP/IP networking connections 24 (for peer to peer linking) and 25 (for development system 35 or DCS hosts linking). The LCM also provides PS232/RS485 ports 26, 27, and 28 for supplemental bus and development system linking. The LCM is based on a Motorola MPC860T and MC68360 which is used as a communications co-processor.

The system may also run with only one each of the various modules or combinations of multiple MP/IOP modules 1, LCM modules 3 or LIO modules 2. The System Executive, SX 15' of each MP/IOP modules 1 is responsible for executing the application program downloaded from the Development PC 35. The System Input/Output Executive, IOX 17', communicates with the FPGAs 30 of the LIO modules 2 and the SX 15'. Both SX 15' and IOX 17' are resident on the MP/IOP module in the MP 15 section and the IOP 17 section respectively. The LIO modules convert physical inputs and outputs to communication messages.

Figure 9A:
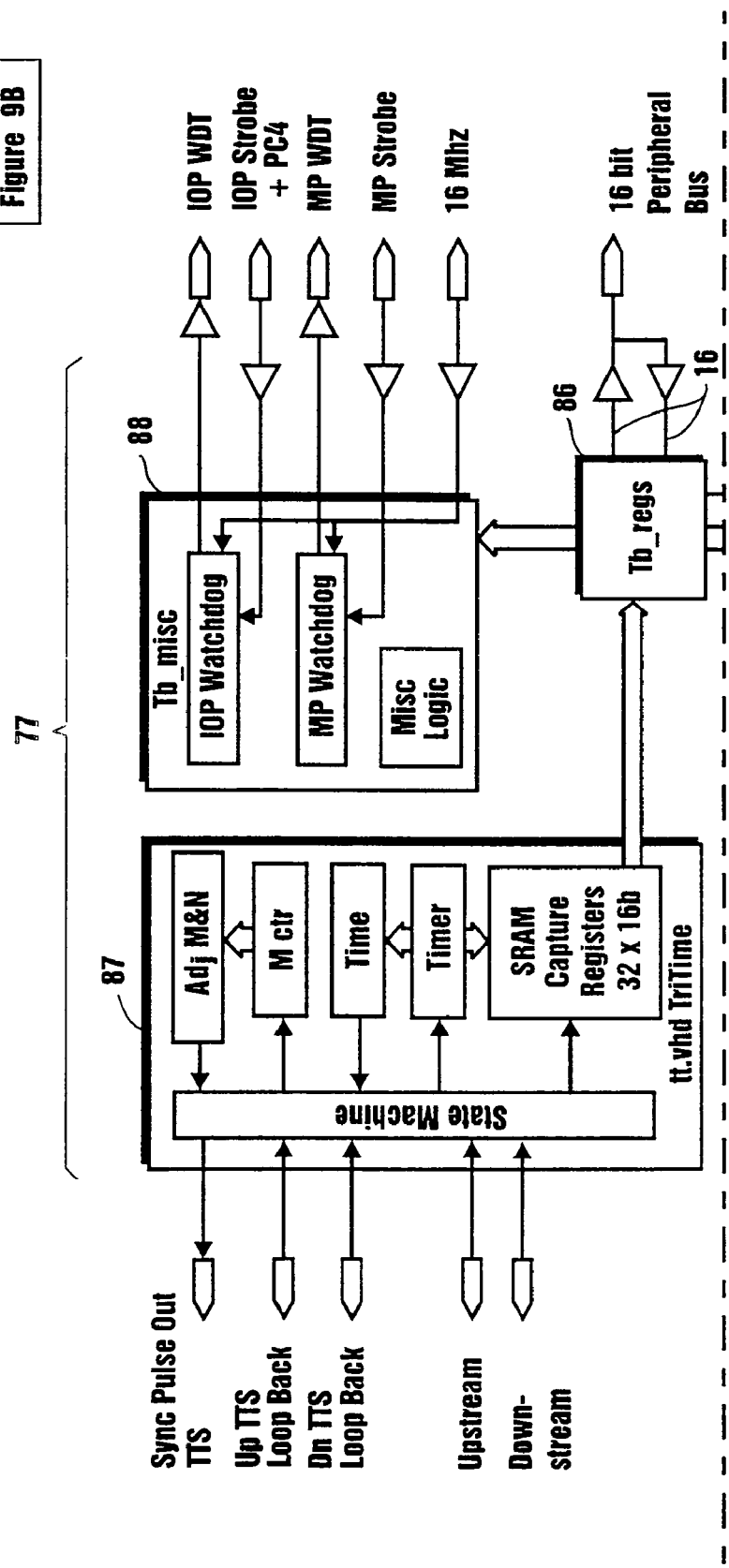
Figure 9B:
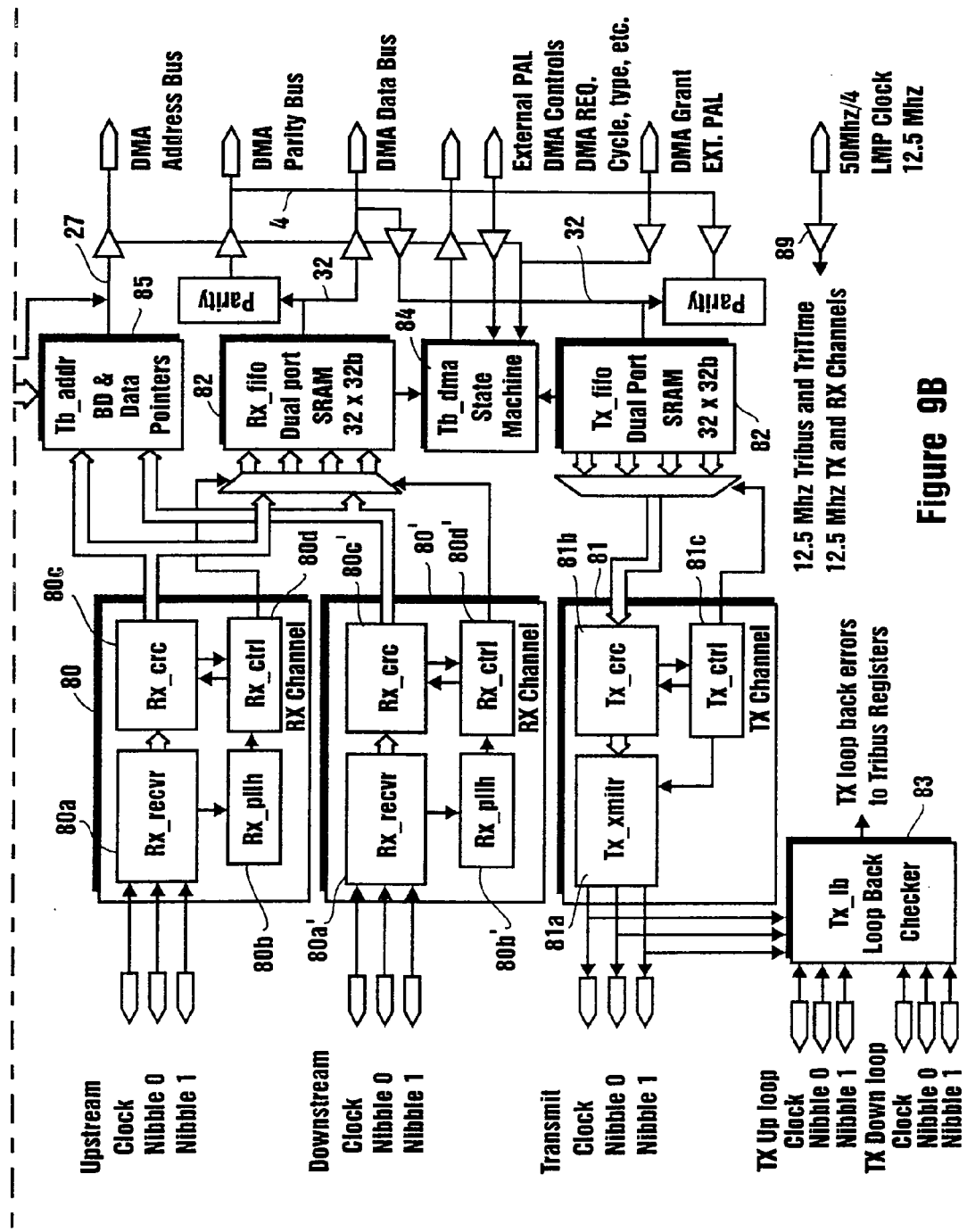

The MP 15 memory 16 includes an FPGA 77 as shown in block diagram form in FIGS. 9A and 9B which contains the following MP/IOP functions: Channel 11 management, synchronization system management, the MP watchdog, the MP Hard reset management, the IOP watchdog, the IOP Hard reset management, Expansion flash prom decode routine, Modbus/LCM channel MUX, Fault LED control, and Mode LED control. As shown in FIGS. 9A and 9B, the major block descriptions of the FPGA 77 software is as follows:

Rx_channel, 80 VHDL module containing: Rx_recvr, Rx_pith, Rx_crc and Rx_ctrl. This module is used twice, once for the upstream channel and once for the downstream channel.

Rx_recvr, 80a Dual 5 bit de-serializer, dual 5b4b decoder, symbol decoder and byte strobe generation. Operates from the received clock.

Rx_pllh, 80b Byte synchronization digital phase lock loop. Syntheses byte strobes from the received byte strobe. Operates from the NPC860 50 Mhz clock divided by 4.

Rx_crc, 80c Calculates and checks the received CRCs, based upon a nibble polynomial lookup table for CRC32. Operates from the MPC860 50 Mhz clock divided by 4.

Rx_ctrl, 80d Receive state machine. Decodes and sequences received bytes and request writes to the RX FIFO. Detects and handles receive channel errors. Operates from the MPC860 50 Mhz clock divided by 4.

Tx_channel, 81 VHDL module containing: Tx_xmitr, Tx_crc and Tx_ctrl

Tx_xmitr, 81a Dual 4b5b encoder, symbol encoder, dual 5 bit transmit shift register and byte strobe generator. Detects and handles Transmit channel errors. Operates from the MPC860 50 Mhz clock divided by 4.

Tx_crc, 81b Calculates and sends the transmit CRCs. Based upon a nibble polynomial lookup table for standard CRC32. Operates from the MPC860 50 Mhz clock divided by 4.

Tx_ctrl, 81c Receive state machine. Generates packet symbol sequences, header, header to data pad and data field sequence. Requests and reads bytes from the TX FIFO. Operates from the MPC860 50 Mhz clock divided by 4.

Rx_fifo, 82 Contains 4-32 by 8 dual port SRAMs organized as two 16 by 32 FIFOs. Also contains the receive channel byte to 32 bit word steering MUX.

Tx_fifo, 83 Transmit channel FIFO, contains 4-32 by 8 dual port SRAMs organized as one 16 by 32 FIFO and 1 by 32 bit word used for diagnostic CRC word storage. 15 by 32 locations spare.

Tb_dma, 84 DMA bus controller and channel arbiter. Handles requests from the Transmit and receive channels for FIFO bus read and writes. Controls the MPC860 side on the Rx_fifo, Tx_fifo and all DMA address pointers (Tb_addr). Communicates via signal pins with the external Bus PAL for DMA transfers. Operates from the MPC860 50 Mhz clock divided by 2.

Tb_addr, 85 All DMA pointers: Transmit buffer descriptor page register TXBDP, Transmit buffer descriptor index pointer TXBDI, Upstream buffer descriptor page register UPBDP, Upstream buffer descriptor index pointer UPBDL Downstream buffer descriptor page register DNBDP, Downstream buffer descriptor index pointer DNBDI, MPC860 Address bus MUX and peripheral bus read back MUX.

Tb_regs, 86 Holds the Miscellaneous control register, Transmit channel control register, Upstream and downstream control, Channel 11 interrupts and the peripheral bus interface.

Figure 11A:
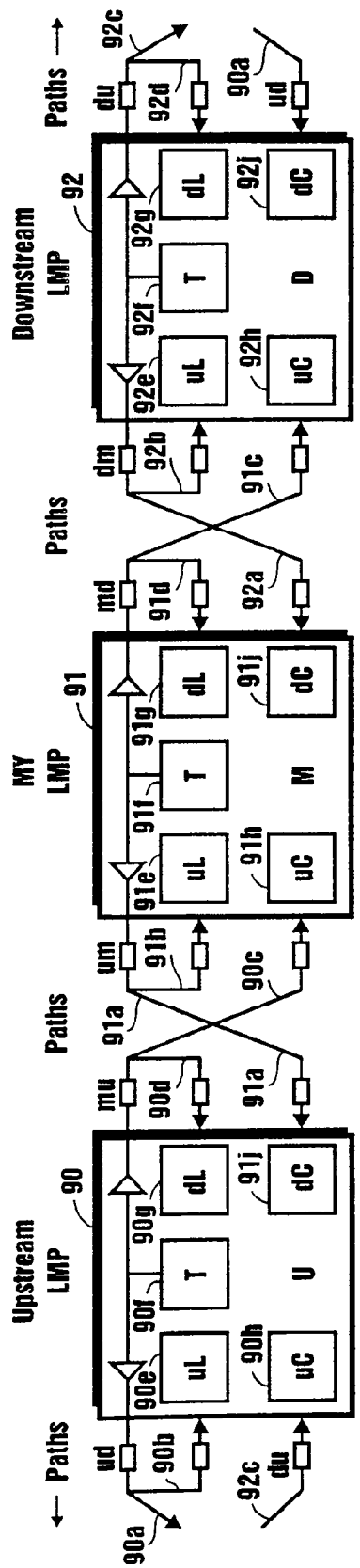
Figure 11B:
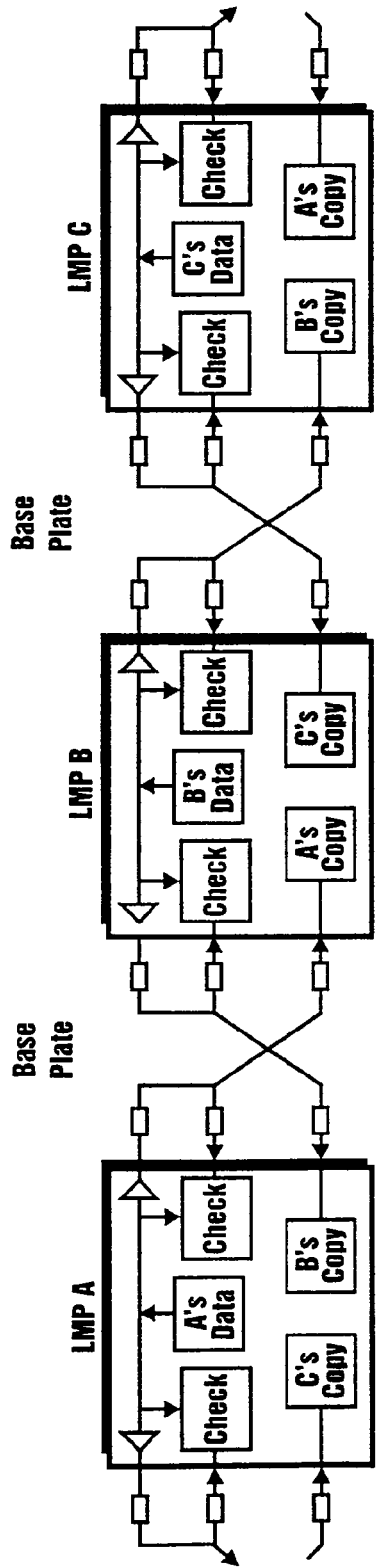

Tt, 87 synchronization system. Contains entire synchronization system functionality described hereafter plus 2 32 by 8 dual port SRAMs used for capture registers. Interfaces to and peripheral bus through Th_regs. Operates from the MPC860 50 Mhz clock divided by 2.

tb_misc, 88 Contains LED controls, expansion flash prom decode, MP 15 reset, IOP 17 reset, MP 11 watchdog timer and IOP 17 watchdog timer. Operates from the 16 mhz-baud clock.

tb_a4, 89 FPGA 77, also contains clock buffers, parity generator and I/O buffers FIGS. 11A and 11B shows the interconnection of the main processor modules MP/IOP module 1. FIGS. 11A and 11B illustrates an upstream MP 90 (U) transmitting a pulse 90f(T) over path 90a (ud) to the downstream processor 92 (D) where it is captured by downstream processor 92 at its downstream capture register 92j (dC); over path 90b to its upstream loop back capture register 90e (uL); along path 90j (mu) where it is captured by the My processor 91 (M) capture register 91h (uC) and over path 90d to its downstream loop back capture register 90g (dL).

Similarly, the My processor 91 (M) is shown transmitting a pulse 91f(T) over path 91 (um) a to the upstream processor 90 (U) where it is captured by downstream processor 90 at its downstream capture register 90j (dC); over path 91b to its upstream loop back capture register 91e (uL); along path 91c (md) to the downstream processor 92 (D) to capture register 92h (uC) and over path 91d to its downstream loop back capture register 91g (dL).

The downstream MP 92 (D) is shown transmitting a pulse 92f(T) over path 92a (dm) to the next downstream processor 91 (M) where it is captured by downstream processor 91 at its downstream capture register 91j (dC); over path 92b to its upstream loop back capture register 92c (uL); along path 92c (du) to the upstream processor 90 (U) to capture register 90h (uC) and over path 92d to its downstream loop back capture register 92g (dL).

TABLE I

Upstream and Downstream relation

| Leg | US (leg) | DS (leg) |
|---|---|---|
| A | C | B |
| B | A | C |
| C | B | A |

The IOP 17 which contains the IOX 17' provides the following serial communications interfaces: an LIO Bus, a Diagnostic Channel, an RS232 Debug port, a BDM port, a 802.3 10BaseT Ethernet expansion IOP 17 bus, RS485 expansion IOP 17 bus, an I²C channel for communications with the Temperature sensor.

Each IOX 17' implements the complete logic for one of the three legs (A, B or C). It communicates with the other IOX 17' legs through two mechanisms: a synchronization signal and data messages through a serial, HDLC diagnostic bus.

The IOX 17' internal execution architecture is based on deterministic, fixed duration "I/O scans". The IOX 17' design allows for any predefined scan duration, but is set to use a 1 millisecond scan time. During each I/O scan, execution proceeds in two modes: foreground and background.

The foreground mode is implemented as an interrupt service routine, which takes up most of the I/O scan durations. An internal MPC860 timer interrupt is used to switch the CPU to foreground mode. This I/O scan interrupt is synchronized by software with upstream and downstream IOX sections 17', ensuring that foreground execution on all three legs starts within a maximum of 2 μsec of each other.

Following these tasks, the CPU reverts to the background mode, which implements the synchronizing IOX 17' system time with the SX 15' system time informing SX 15' that IOX 17' is still operational processing control messages that SX 15' may have placed in the shared memory, and processing input from, and output to, the debug port.

A diagnostic channel provides a communications link between the IOP legs. The MP 15 and IOP's section 17 leg addresses are read through MPC860 parallel port pins.

TABLE II

Leg Address encoding:

| Leg number | MPC860 Port Pin | | |
|---|---|---|---|
| | PB14 | PB15 | PB16 |
| Leg A | 0 | 1 | 1 |
| Leg B | 1 | 0 | 1 |
| Leg C | 1 | 1 | 0 |
| Bad address | All other values | | |

The MP 15 and IOP 17 node addresses are read through MPC860 parallel port pins. Both the MP 15 and IOP 17 are connected to the same base-plate address plugs.

Each redundant leg or channel 13 of the system is mechanically and electrically isolated from adjacent legs in an acceptable mechanical isolation, which is defined as at least equivalent to the trace-to-trace spacing required to achieve 800 VDC electrical isolation. Other isolation techniques such as opt-isolation at all leg-to-leg interfaces may be used as an alternative provided the preferred VDC is achieved.

In the event of an MP/IOP module 1 failure, the triad, via software control, is dissolved dynamically and the remaining two re-configured into a dual-master configuration. A hot replacement MP/IOP module 1 is dynamically "re-educated" by transferring re-education data including application program and data over the Channel 11 on insertion.

Enclosure and Mounting

Figure 13:
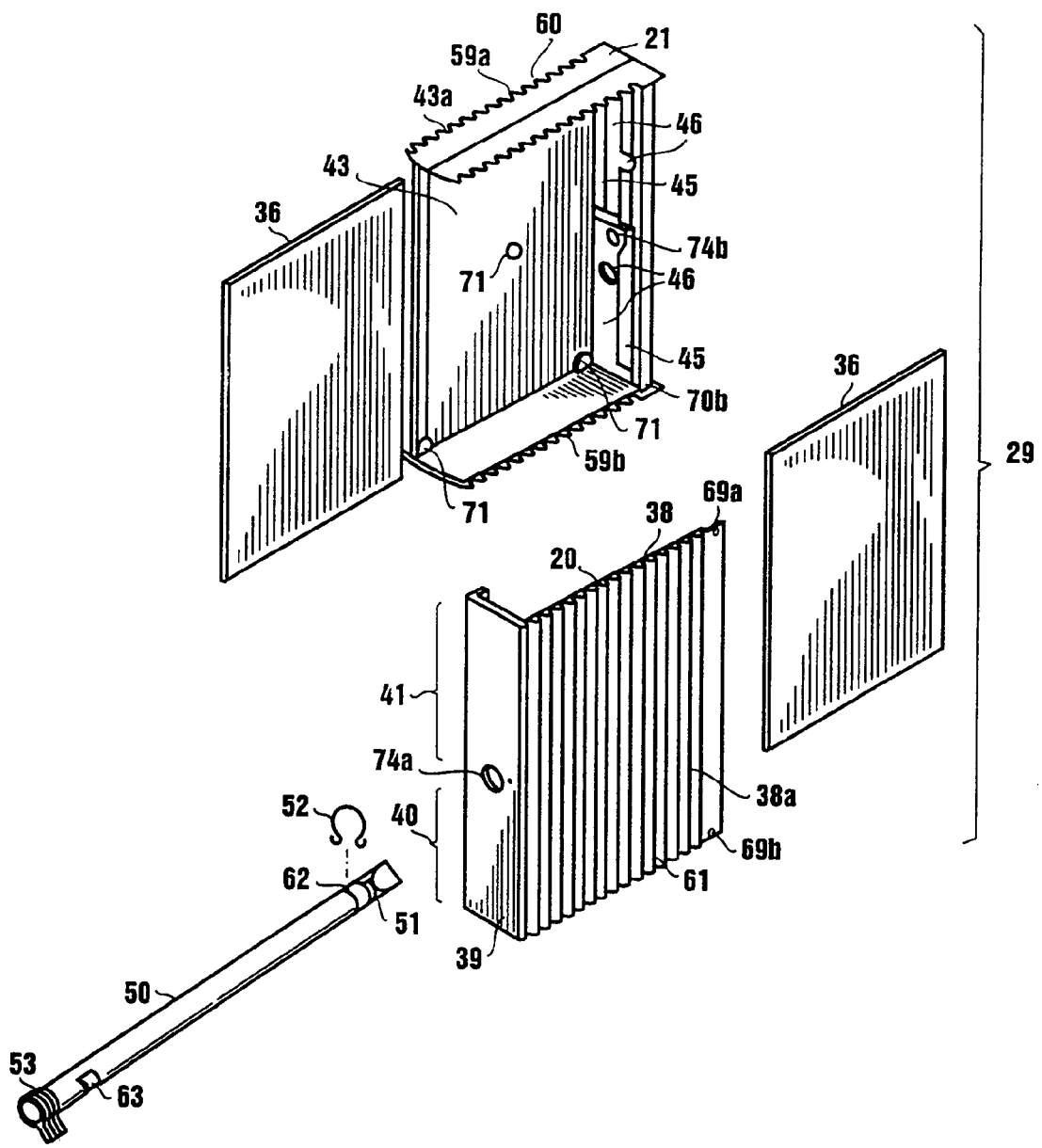

Referring to FIG. 13, the MP/IOP modules 1, LIO 2 modules, LCM 3 modules are each housed in a separate configurable enclosure or housing 29, which receives the circuit boards which comprise the different modules. The same form of housing 29 may be used for each modules by simply changing the face plate information for the particular module. The cover 20 and the base 21 of the housing 29 are shown in FIG. 13. Both the cover 20 and the base 21 are provided with a thermal conductive pad or medium 36 which is electrically non conductive. A suitable medium 36 used for this purpose is a GAP PAD™ 1500 which is a conformable thermally conductive material for filling air gaps. The GAP PAD™ 1500 medium 36 used in this invention is obtainable from the Bergquist Company at 5300 Eldina Industrial Boulevard, Minneapolis, N. Mex. 55439 and the Bergquist Company has been granted patents on such materials as is shown in U.S. Pat. No. 5,679,457 which is incorporated herein by reference.

Figure 15:
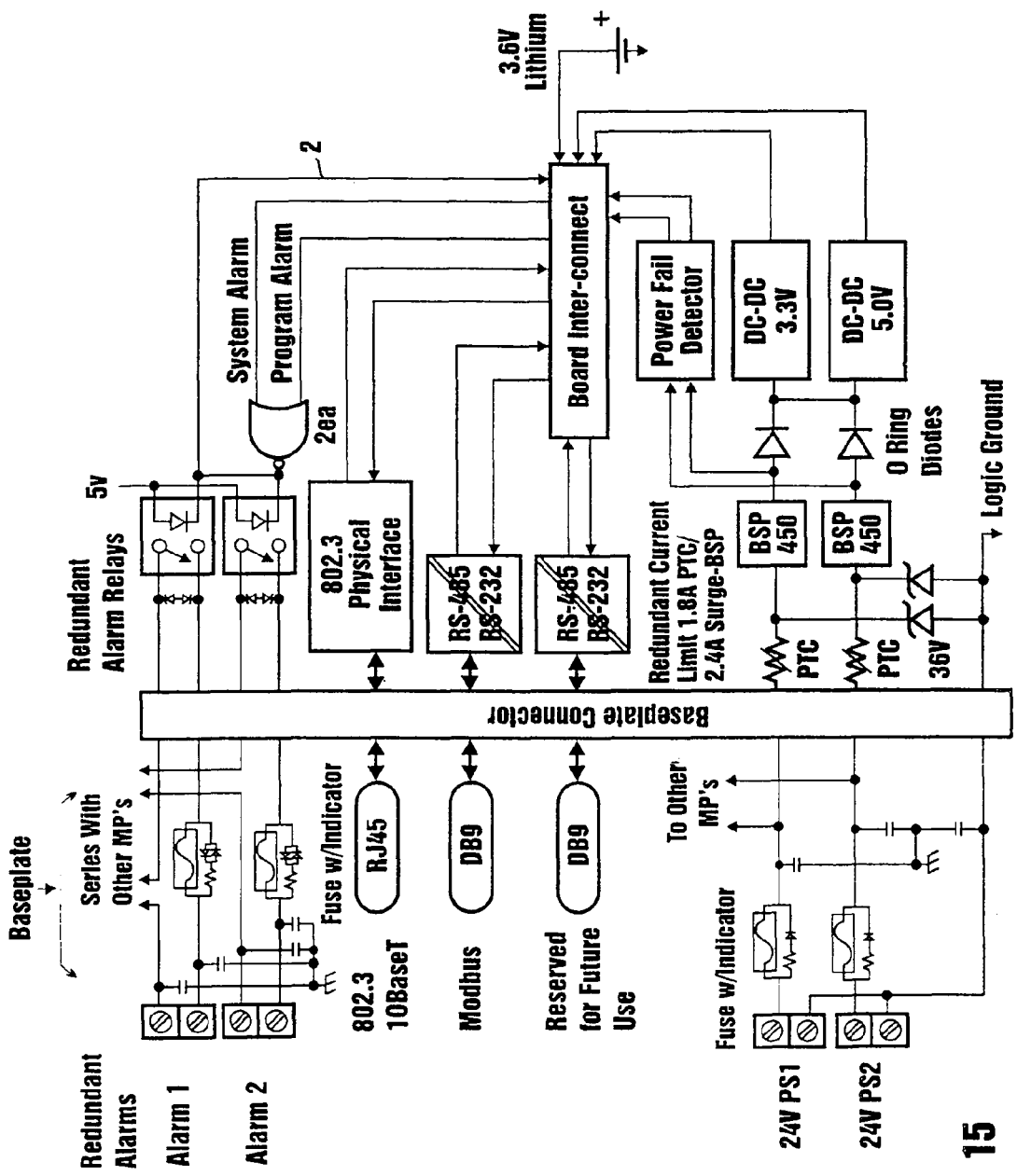

The thermally conductive medium 36 is applied to the inner surfaces of the housing 29, which preferably includes at least the two major surfaces. As illustrated, four surfaces are covered. Where increased thermal conductivity is desired all or any portion of the internal surfaces may be covered by medium 36. Each functionally-specific module uses the same general circuit board for providing redundant power. The character or the functionality of the particular module is determined by the module board for the various modules, as previously described, that is the electronic circuit board which implements the MPt/IOP module 1, LCM module 3 or the various types of LIO modules 2. FIG. 14 and FIG. 15 show the block diagram for the power board 4 and the MP/IOP module 1 for example.

Referring again to FIG. 13, the molded cover 20 of the housing 29 includes a planar cover mounting surface 38 for receiving the thermal conductive medium 36, and a face plate 39 mounted generally at right angles to the mounting surface 38. The face plate 39 is provided with a series of LED conduits 40 that may be filled with fiber optic tubes or plastic inserts, or other light transmissive medium or a cover for permitting light from LED's 41 which are mounted on the module circuit boards 54 to pass from the circuit board to the surface of the faceplate 39 for viewing. While holes may be left open in the cover 20 face plate 39, dust and debris from the industrial environment may contaminate the circuitry. Accordingly, these conduits are preferably filled to seal the housing 29. The extruded cover 20 of the housing 29 has a plurality of thermal dissipating fins 61 on an outer surface 38a. The face plate 39 also has a hole 74a for receiving a jack screw 50.

The base 21 of the housing 29 includes a planar base mounting surface 43 and a base 44 which has a plurality of connector holes 45 and grounding pin holes 46 for electrical connectors to a base plate 49. The grounding pins 47a and 47b are elongated as shown in FIG. 16 so that when the housing 29 is mounted to the base plate 49, the grounding pins 47 engage prior to engagement of the electrical connectors 48. This permits the housing 29 to be grounded before the power is applied to the module through engagement with the connectors 48. The base 21 further includes opposing sides 59a and 59b which enclose the housing 29 when the same is assembled with the cover 20. The base is also provided with thermal dissipating base fins 60 mounted on the outer surface 43a of the base mounting surface 43. In addition, grounding pin placement only permits one-way insertion.

To allow the MP/IOP module 1 hardware to fit into the system packaging, the MP/IOP module 1 design is separated into two printed circuit board assemblies as shown in FIG. 16. These are the functionality board 51 for the particular module being implemented and the power interface board 56 which are mounted in the system package in the form of a sandwich. A 50 pin connector connects the two PCBs at one end.

As shown in FIG. 16, the power board 56 and the functionality board 57 are each sized to fit into the housing 29 and are connected in the form of a circuit board sandwich 37 with all of the inter board connectors 94 at one end. Also shown in the schematic of the circuit board sandwich 37 the data signals 54 are input and output at one end and visual signals 55 generated by LED's 41 or any other source of light are output at the at the other. The power board 56 and the functionality board 57 are electrically connected at the end near the front of the housing 29 and all of the electrical connections are disposed at the rear of the housing 29 and are externally accessible. The board sandwich 37 may be mounted inside the housing in any conventional manner provided that heat generated by the circuit boards is transmitted out of the housing. The thermally conductive medium should therefore be in contact with the circuit board and the inner surfaces of the housing. As shown in FIG. 13, the base 21 includes mounting pads 71 for fastening the power circuit board 56 inside the housing which are disposed in the center at the four corners of the planar mounting surface. Only three of the mounting pads 71 are visible. It should be noted that other thermal control mechanisms such as coolant tubes and the like may also be used for heat dissipation within the housing 29.

Figure 17:
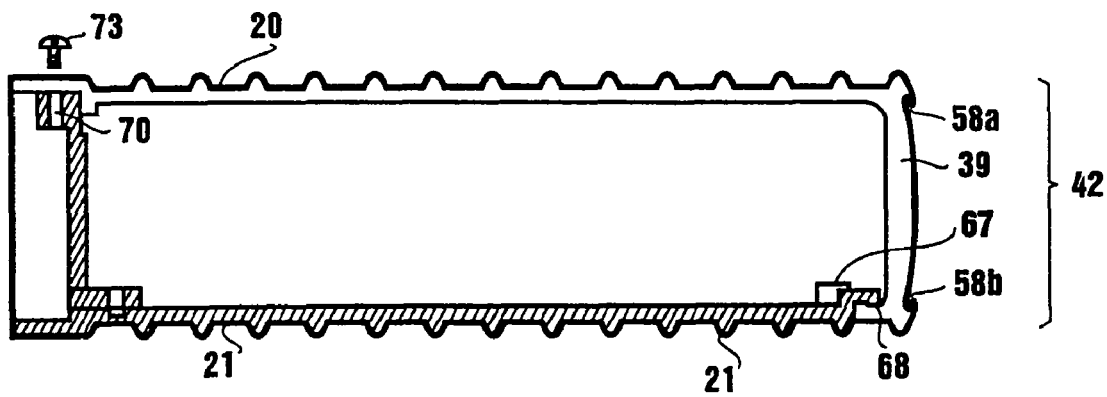

As shown in FIG. 17, the cover 20 face plate 39 is also provided with a flexible Mylar cover 42 which is retained in opposing slots 58a and 58b on the front of the base and are used to identify the type of module (i.e. its function). In this respect, the conduits 40 are made to accommodate all of the positions for the LED's 41 for all configurations of LED's for each type of module. The Mylar cover 42 covers those conduits 40 not used for the particular functionality intended.

The major elements of the control system include field replaceable modules housed in the protective metal housing 50. These modules include a Main Processor Module (MP 15), I/O Modules including a Digital Input Module (DI), a Digital Output Module (DO) a Relay Output Module (DI), an Analog Input Module (AI) an Analog Output Module and Extender Module (EM) and such other modules as may be necessary or appropriate.

Each of these modules is fully enclosed to ensure that no components or circuits are exposed even when the module is removed from the baseplate. Offset baseplate connectors make it impossible to plug a module in to the baseplate connectors in the incorrect position. In addition, keys on each module prevent the insertion of modules into the incorrect slots.

FIGS. 18A, 18B, 18C, 18D and 18F shows typical MYLAR cover 42 for the face plate for the housing 29 for each of the various modules with indicia for functions identification and openings 95 aligned with the LEDs 41 of the specific functionality board and with opaque areas covering unused channels 40. The specific indicators used for the MP/IOP module 1 are shown in the following Table III, although other indicators may be used as required. Many of these same indicators may be used in other modules.

TABLE III

MP/IOP indicators

| Front Panel Indicators Status Function | LED Indicator | Color | Power up state | Controlled By |
|---|---|---|---|---|
| Module Status | Pass | Green | Off | Not Fault |
| | Fault | Red | On | MP \| IOP |
| | Active | Green | Off | MP |
| Mode | Run Mode | Green | On | MP |
| | Remote Mode | Green | On | MP |
| | Program Mode | Yellow | On | MP |
| | Stop Mode | Yellow | On | MP |

TABLE III-continued

MP/IOP indicators

| Front Panel Indicators Status Function | LED Indicator | Color | Power up state | Controlled By |
|---|---|---|---|---|
| Alarms | Field Power | Red | On | MP |
| | System Power | Red | On | MP |
| | System Alarm | Red | On | MP |
| | Program Alarm | Blue | On | MP |
| | Over Temperature | Red | Off | MP |
| | Lock | Red | On/Off | MP |
| Communications Status | TX/RX Reserved | Green/Green | Off | Hw |
| | TX/RX IO bus | Green/Green | Off | Hw |
| | TX/RX COMM Bus | Green/Green | Off | Hw |
| | TX/RX Modbus | Green/Green | Off | Hw |
| | LINK/TX/RX Development Network | Green/Green/Green | Off | Hw |

Hw = Hardware circuit.

Note 1 MP or IOP, not both, under firmware control.

The module status indicators display the operational status on the MP/IOP 1 module. IOP 17 status is passed to the MP 15 via the shared memory interface.

Pass—Indicates that both MP 15 and IOP 17 sections have passes all diagnostics. PASS is the inverse of FAULT, and can be read on both MPC860s PA8. PASS is active low. No user action required.

Fault—Indicates a fault was detected on the MP 15 or IOP 17 sections. The user is expect to replace the module. The fault indicator is forced ON by a MP/IOP module 1 "hard" reset, or MP 15 or IOP 17 watchdog timer time-out or the FAULT port bit PA11 on the MP or IOP MPC860. The FAULT bit is active high. The FAULT bit is pulled up via a 10 k resistor, so that it defaults to the faulted state. Note: If the fault is detected in a non critical portion on the MP, such as the Debug port or Flash prom, or the MP has re-educated too many times due to transient faults, it is permitted for the MP 15 to continue running is the Fault—Active state. See SX fault handling.

Active—Indicates the MP 15 is running the application program. The MP 15 flashes Active LED once for each application program scan executed. SX firmware shall control the ON duty cycle to ensure the LED is visible, even for very fast application programs. The ACTIVE LED is driven from MPC860 port bit PA10, active high.

Mode Indicators

Run Mode—Indicates the System of the present invention is in "Run" mode. Run is driven from the Channel 11/synchronization system FPGA 77, see MCR register. The led defaults to ON during hardware reset.

Remote Mode—Indicates the System of the present invention is in "Remote" mode. Remote is driven from the Channel 11/synchronization system FPGA 77. The led defaults to ON during hardware reset.

Program Mode—Indicates the System of the present invention is in "Program" mode. Program is driven from the Channel 11/synchronization system FPGA 77. The led defaults to ON during hardware reset.

Stop Mode—Indicates the System of the present invention is in "Stop" mode. Stop is driven from the Channel 11/synchronization system FPGA 77. The led defaults to ON during hardware reset.

System Status Indicators

Field Power—Indicates that a 24 v field power input on one or more 110 module is missing. If the field power alarm is on, the system alarm is illuminated by SX 17'. Development or Trilog must be queried by the user to determine the actual module(s) reporting the alarm condition. FP_ALRM is active high on PB29.

System Power—Indicates that there is a 24V logic power input missing on one or more MP, I/O or CM module. Development or Trilog must be queried by the user to determine the actual module(s) reporting the alarm condition. If the logic power alarm is on, the system alarm is illuminated by SX 17'. SP_ALRM is active high on PB28.

System Alarm—Indicates that a fault or error condition is present in the System of the present invention. Development or Trilog must be queried by the user to determine the actual module(s) reporting the alarm condition. System alarm is driven by the MP port bit PA9. System alarm is active high and pulled up.

Development Link—Indicates the MPs 15 10BaseT twisted pair receiver has established a hardware connection over RX+ and RX− signals with the Ethernet hub. Note: The hub should also contain a Link LED to indicate a hardware connection has been established with the MPs TX+ and TX− twisted pair signals.

Development TX/RX—Flashes when the MP 15 is communicating on it's 802.3 10BaseT Development network. Flashes when the MP 15 is communicating on it's 802.3 TriLan port or when the LRXM or expansion IOP is communication over it's 802.3 fiber optic port.

Figure 18A:
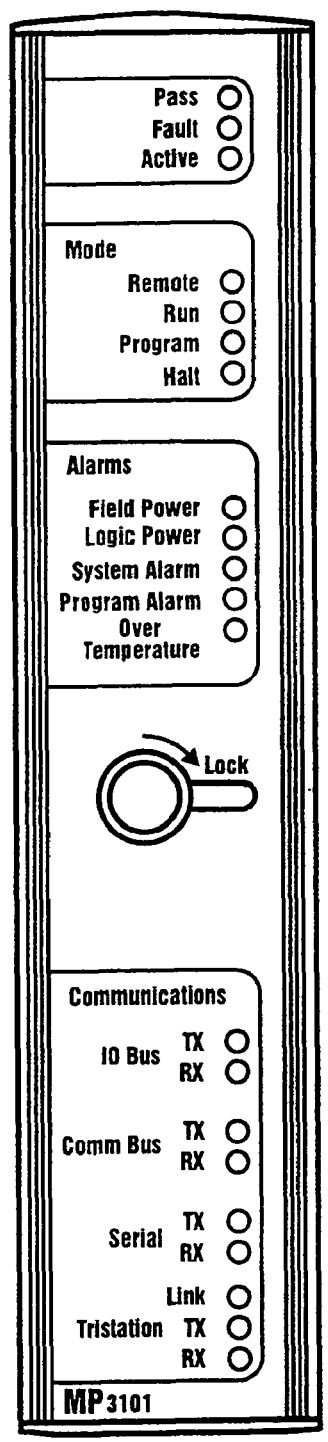
Figure 18B:
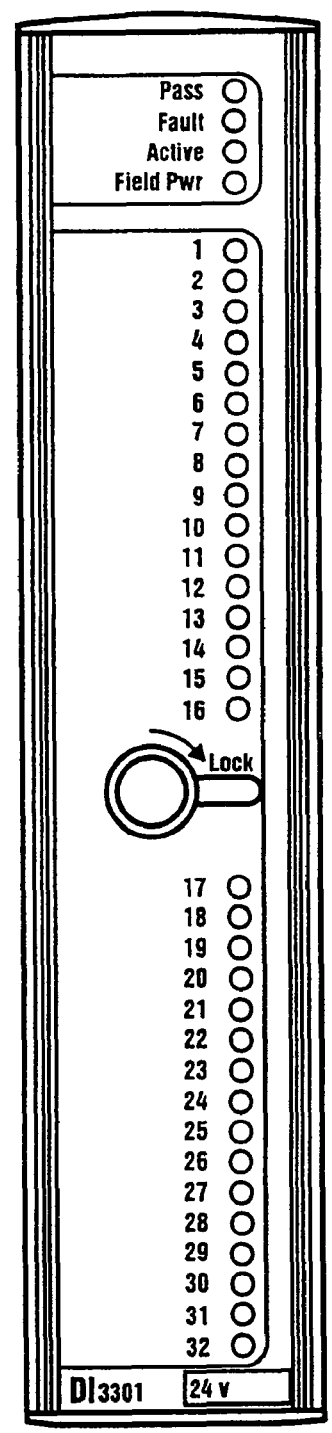
Figure 18C:
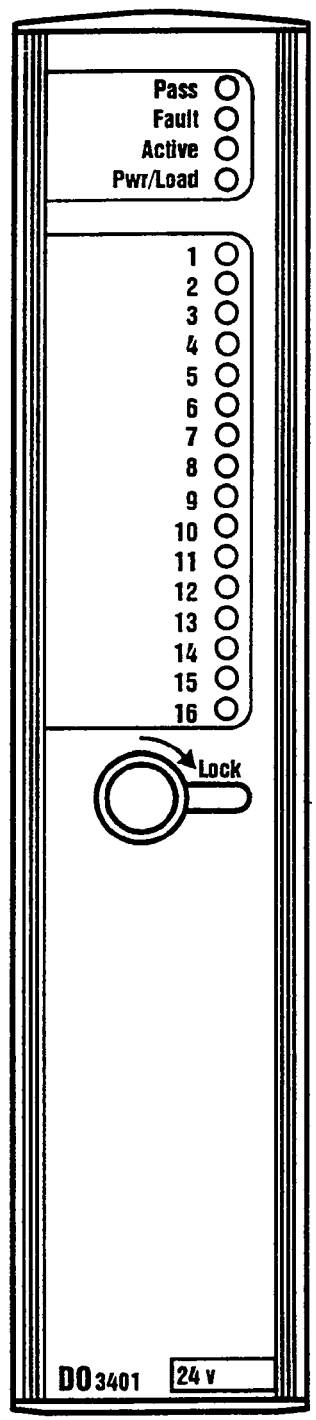
Figure 18D:
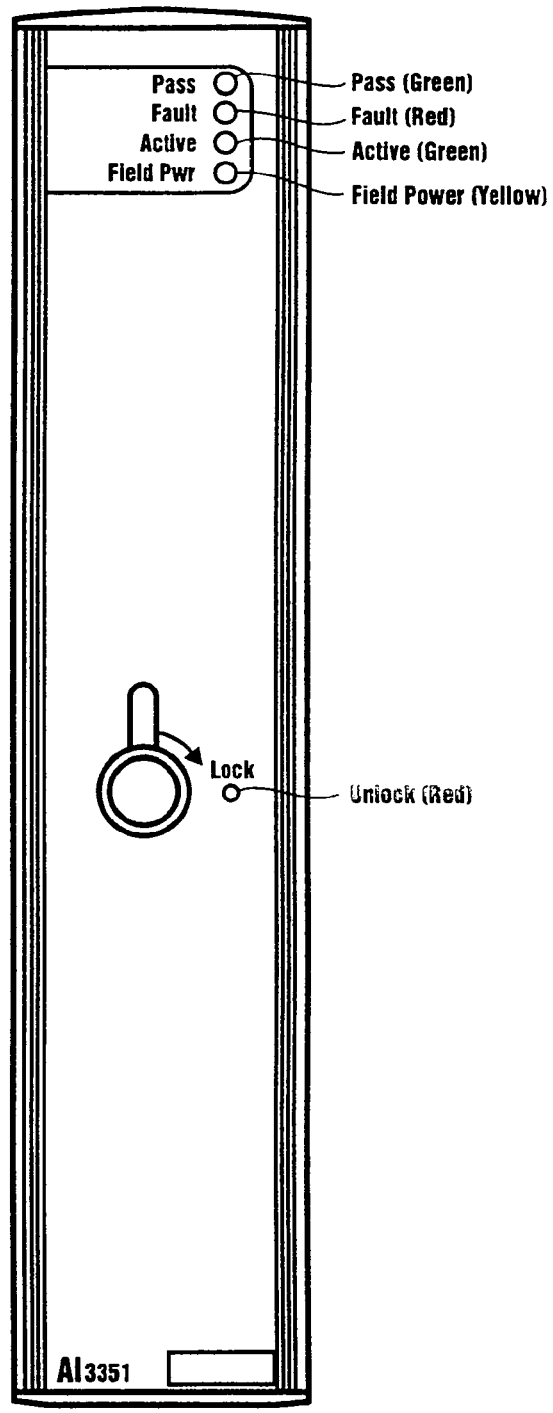
Figure 18E:
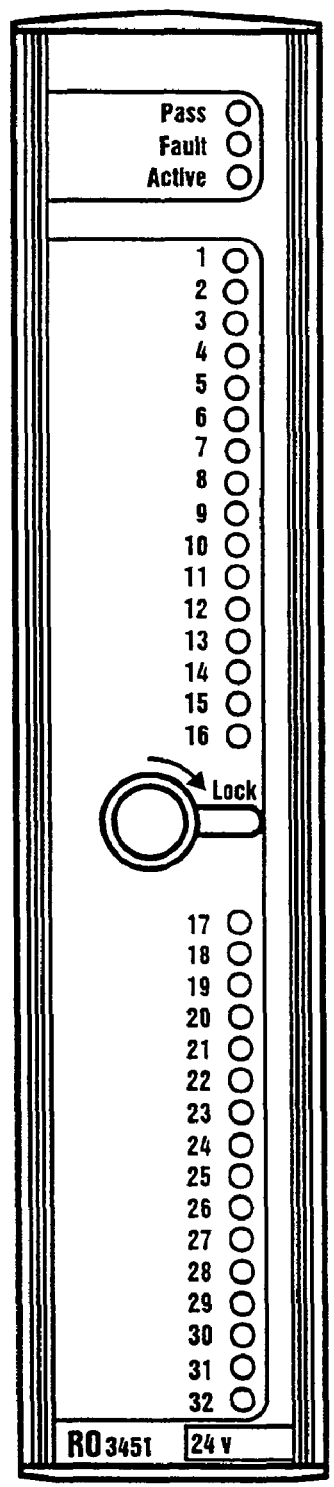

The table IV below lists the conditions represented by the top indicators on the DI front panel, FIG. 18B, and provides a description and a recommended action for each condition. An X represents a neutral indicator.

TABLE IV

Top Indicator Conditions

| Pass | Fault | Active | Lock | Description | Action |
|---|---|---|---|---|---|
| On | Off | On | Off | Module is operating normally. | No action is required. |
| On | Off | Off | Off | Possible conditions: | |
| | | | | Application program has not been loaded into the MP. | If module is the hot spare, no action is required. |
| | | | | Application program has been loaded into the MP, but has not been started up. | If module is active, replace module. |
| | | | | Module has just been installed and is currently running start-up diagnostics. | |
| | | | | The other module is active. | |
| Off | On | X | Off | Possible conditions: | |
| | | | | Module may have failed. | See mode indicator status for power-up states. |
| | | | | Module may be in the process of power-up self-test. | If module's PASS indicator does not go on within five minutes, replace module. |
| | | | | Module has detected a fault. | Module is operational, but should be replaced |
| X | X | X | On | Module is unlocked from the baseplate. | Lock module. |
| On | On | X | X | Indicators/signal circuitry on the module are malfunctioning | Replace module. |

Program Alarm—Is driven by the application program to indicate an alarm condition detected by the application program, typically bypassed points. Program alarm is driven by the MP 15 port bit PD5. System alarm is active high and pulled up.

Over Temp.—Indicates an MPC860 junction over temperature. Over temp is driven directly from the temperature monitor IC. SX 17' programs the trip temperature via the I²C channel.

Lock—Indicates the module is not locked into its base-plate. The unlock status bit is readable on both MPC860's port bit PC9. Unlock is active high and pulled up.

Module Communications Indicators

Communications indicators are provided to aide the user/installer in trouble shooting cable installation problems.

Reserved TX/RX—Flashes when an expansion IOP 17 is communicating, over the RS485 IOP bus.

Bus TX/RX—Flashes when the IOP 17 is communicating on the LIO bus.

COMM Bus TX/RX—Flashes when the MP 15 is communicating to either LCM.

Modbus TX/RX—Flashes when the MP 15 is communicating on it's local RS232/RS485 Modbus port.

The following table V lists the conditions that can be represented by the Field Power indicator.

TABLE V

Field Power Indicator Conditions

| Field Power | Description | Action |
|---|---|---|
| On | Field power from one or more of the redundant sources is missing. | To isolate the missing power source, use the Development System computer Diagnostic Panel. Correct the problem in the field circuit. If these steps do not solve the problem, replace module. |
| Off | Field power is operating normally. | No action is required. |

The following table VI lists the possible conditions that can be represented by a point indicator.

TABLE VI

| 32 Point Indicator Conditions | |
|---|---|
| Point (1-32) | Description |
| On | Field circuit is energized. |
| Off | Field circuit is not energized. |

The table VII below lists the conditions represented by the top indicators on the DO front panel (see FIG. 18C) and provides a description and a recommended action for each condition. An X represents a neutral indicator.

TABLE VII

DO Front Panel

| Pass | Fault | Active | Lock | Description | Action |
|---|---|---|---|---|---|
| ON | Off | On | Off | Module is operating normally. | No action is required. |
| On | Off | Off | Off | Possible conditions: Application program has not been loaded into the MP. Application program has been loaded into the MP, but has not been started up. Module has just been installed and is currently running start-up diagnostics. The other module is active. | If module is the hot spare, no action is required. If module is active, replace module. |
| Off | On | X | Off | Possible conditions: Module may have failed. Module may be in the process of power-up self-test. Module has detected a fault. | See mode indicator status for power-up states. If module's PASS indicator does not go on within five minutes, replace module. Module is operational, but should be replaced |
| X | X | X | On | Module is unlocked from the baseplate. | Lock module. |
| On | On | X | X | Indicators/signal circuitry on the module are malfunctioning | Replace module. |

The following table VIII lists the conditions that can be represented by the Power/Load indicator.

TABLE VIII

Power/Load Indicator. Conditions

| Field Power | Description | Action |
|---|---|---|
| On | For at least one point, the commanded state and the measured state do not agree. | To isolate the suspected point, use the Development System computer Diagnostic Panel. To determine the output point's commanded state, use the Development System computer Control Panel. To determine the output's actual state, use a Voltmeter, then correct the problem in the external circuit. If these steps do not solve the problem, replace module. |
| Off | All load connections are functioning properly. | No action is required. |

The following table IX lists the possible conditions that can be represented by a point indicator.

TABLE IX

| 16 Point Indicator Conditions | |
|---|---|
| Point (1-16) | Description |
| On | Field circuit is energized. |
| Off | Field circuit is not energized. |

The table X below lists the conditions represented by the top indicators on the AI front panel (see FIG. 18D) and provides a description and a recommended action for each condition. An X represents a neutral indicator.

TABLE X

AI Top Indicator Conditions

| Pass | Fault | Active | Lock | Description | Action |
|---|---|---|---|---|---|
| On | Off | On | Off | Module is operating normally. | No action is required. |
| On | Off | Off | Off | Possible conditions: Application program has not been loaded into the MP. Application program has been loaded into the MP, but has not been started up. Module has just been installed and is currently running start-up diagnostics. The other module is active. | If module is the hot spare, no action is required. If module is active, replace module. |
| Off | On | X | Off | Possible conditions: Module may have failed. Module may be in the process of power-up self-test. Module has detected a fault. | See mode indicator status for power-up states. If module's PASS indicator does not go on within five minutes, replace module. Module is operational, but should be replaced |
| X | X | X | On | Module is unlocked from the baseplate. | Lock module. |
| On | On | X | X | Indicators/signal circuitry on the module are malfunctioning | Replace module. |

The following table XI lists the conditions that can be represented by the Field Power indicator.

TABLE XI

Field Power Indicator Conditions

| Field Power | Description | Action |
|---|---|---|
| On | Field power from one or more of the redundant sources is missing. | To isolate the missing power source, use the Development System computer Diagnostic Panel. To determine the output's actual state, use a Voltmeter, then correct the problem in the external circuit. If these steps do not solve the problem, replace module |
| Off | Field power is operating normally. | No action is required. |

The table XII below lists the conditions represented by the top indicators on the Relay Output RO front panel (see Figure E) and provides a description and a recommended action for each condition. An X represents a neutral indicator.

TABLE XII

| Pass | Fault | Active | Lock | Description | Action |
|---|---|---|---|---|---|
| On | Off | On | Off | Module is operating normally. | No action is required. |
| On | Off | Off | Off | Possible conditions: Application program has not been loaded into the MP. Application program has been loaded into the MP, but has not been started up. Module has just been installed and is currently running start-up diagnostics. The other module is active. | If module is the hot spare, no action is required. If module is active, replace module. |
| Off | On | X | Off | Possible conditions: Module may have failed. Module may be in the process of power-up self-test. Module has detected a fault. | See mode indicator status for power-up states. If module's PASS indicator does not go on within five minutes, replace module. Module is operational, but should be replaced |
| X | X | X | On | Module is unlocked from the baseplate. | Lock module. |
| On | On | X | X | Indicators/signal circuitry on the module are malfunctioning | Replace module. |

The following table XIII lists the possible conditions that can be represented by a point indicator.

TABLE XIII

| Point (1-32) | Description |
|---|---|
| On | Field circuit is energized. |
| Off | Field circuit is not energized. |

Indicators for other input/output modules are similarly configured as necessary.

FIG. 17 shows the manner in which the cover 20 interconnects with the base. The cover 20 includes a cover interlock 67 which mates with a corresponding base 21 interlock 68. The cover and the base 21 are then screwed together after insertion of the circuit board sandwich 7 shown in FIG. 16 and the thermal conductive material inside the housing utilizing screws 73 in cover screw holes 69a and 69b and base screw holes 70a and 70b as shown in FIG. 13. Although any fastening method may be used.

Alignment of the housing 29 on insertion can be difficult. Accordingly the single jack screw 50 as shown in FIG. 13 is utilized which has a screw thread 51 at one end for engaging the base plate 49 for mounting. The single jack screw 50 is centered in the housing 29 and is mounted through the jack screw hole 74. The use of a single jack screw 50 seats the module upon entry and unseats the module on exit, that is, on engagement and disengagement from the connectors. A snap ring 52 is attached to one end of the jack screw 50 and engages an annular recess 62 on the jack screw 50 to hold the jack screw 50 in position within the housing at the base 44, a handle 53 holds the jack screw in place at the face plate 39. This permits the jack screw 50 to pull the module out of its connectors on unscrewing the jack screw 50 which remains mounted to the housing 29. The handle 53 of the jack screw 50 pulls the housing 29 into its seat on screwing in of the jack screw 50. This configuration allows ease of insertion and removal of the housing 29, and provides a safety factor in that the housing 29 is first grounded on mounting prior to power being applied.

The jack screw 50 has an LED detector notch 63 therein which allows the beam from a detector LED, which may be mounted on either circuit board in the housing, but preferably on the power board 56, such that the light beam from the LED is to be intercepted when the jack screw 50 is fully seated. If the jack screw 50 is not fully seated, the LED beam is interrupted and the system determines that the module is not fully or properly seated.

When "removed status" is detected, the SX 15' evaluates the application program and if the retentive data is invalid, re-education (reload) from another MP 15 with a valid application program occurs. If no other MP 15 has a valid application program, the SX 15' waits in the Stop mode for a new application program to be loaded, the MP 15 is commanded to the Program Run or Remote state, and commanded to download and run.

The "Module Lock Detector" indicates the MP/IOP module is seated and locked into its base-plate 65a as shown in FIGS. 5A and 5B. This status is readable by both MPC860s and reflected in the module status message. The Lock detector is implemented using a reflective type opto-interrupter now shown which detects the position of the slot on the jack screw 50. The locked state is indicated by the opto-interrupter in the ON (low-conducting) state, i.e. the opto-interrupter signal is blocked by the jack screw 50. The opto-interrupter is diagnosable under firmware control which allows at least 1 ms for the opto-interrupter to change state. The UNLOCK led is forced off in hardware by a lock detector diagnostic bit.

Hot-insertion of the MP/IOP 1 or any other modules into the base-plate is provided using the detectable keyed insertion jack screw 50 to insure proper installation orientation and correct module type.

Each housing 29 is mounted on a base-plate 65 as discussed before as shown in FIGS. 5A and 5B. Each base plate 65 may support more than one module. The base plates 65 are mounted to rails 66 and multiple base plates 65 may be mounted in a single system. FIGS. 5A and 5B show mounting for both a minimum system and a large system.

Figure 19A:
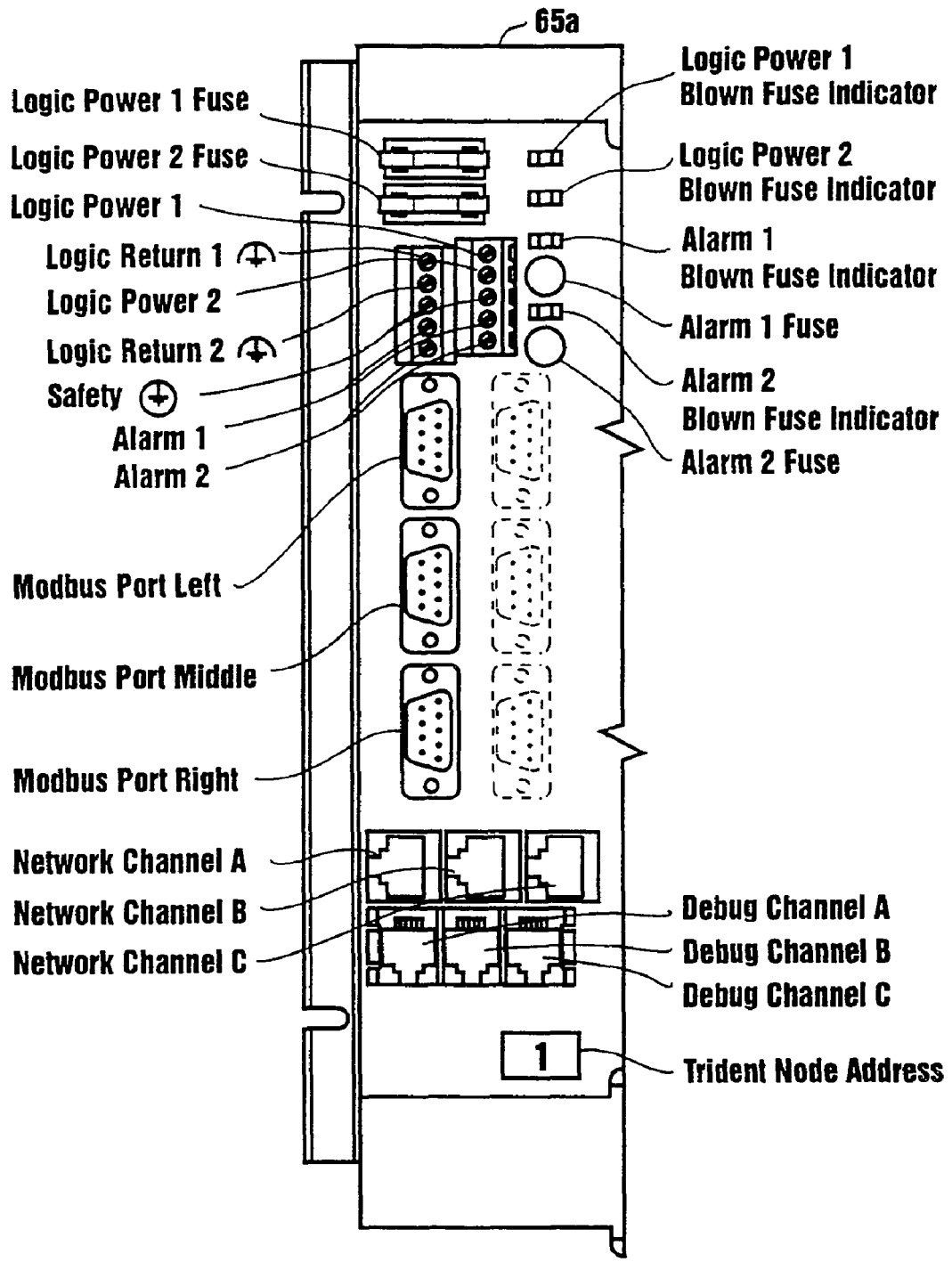
Figure 19B:
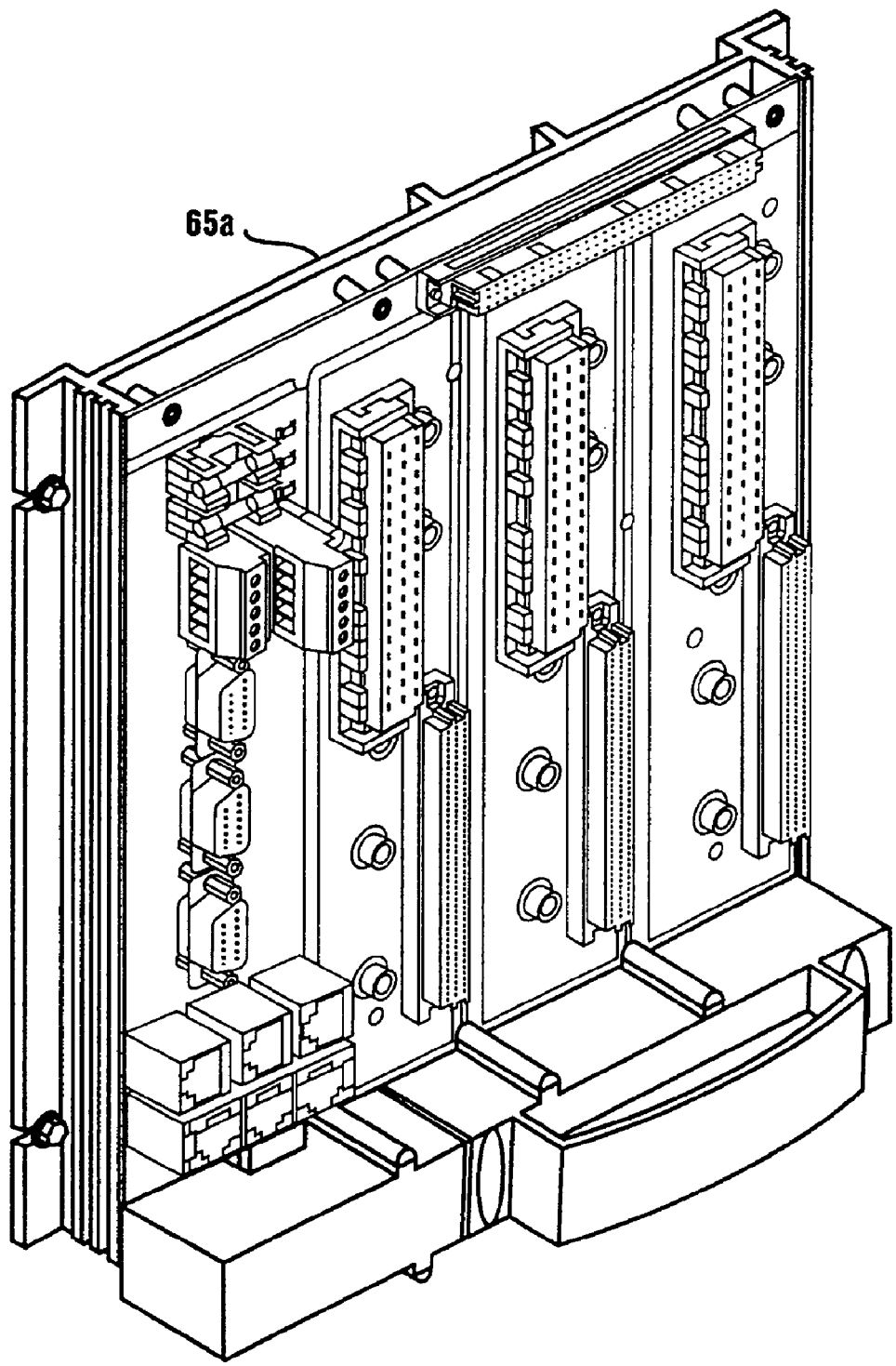
Figure 20A:
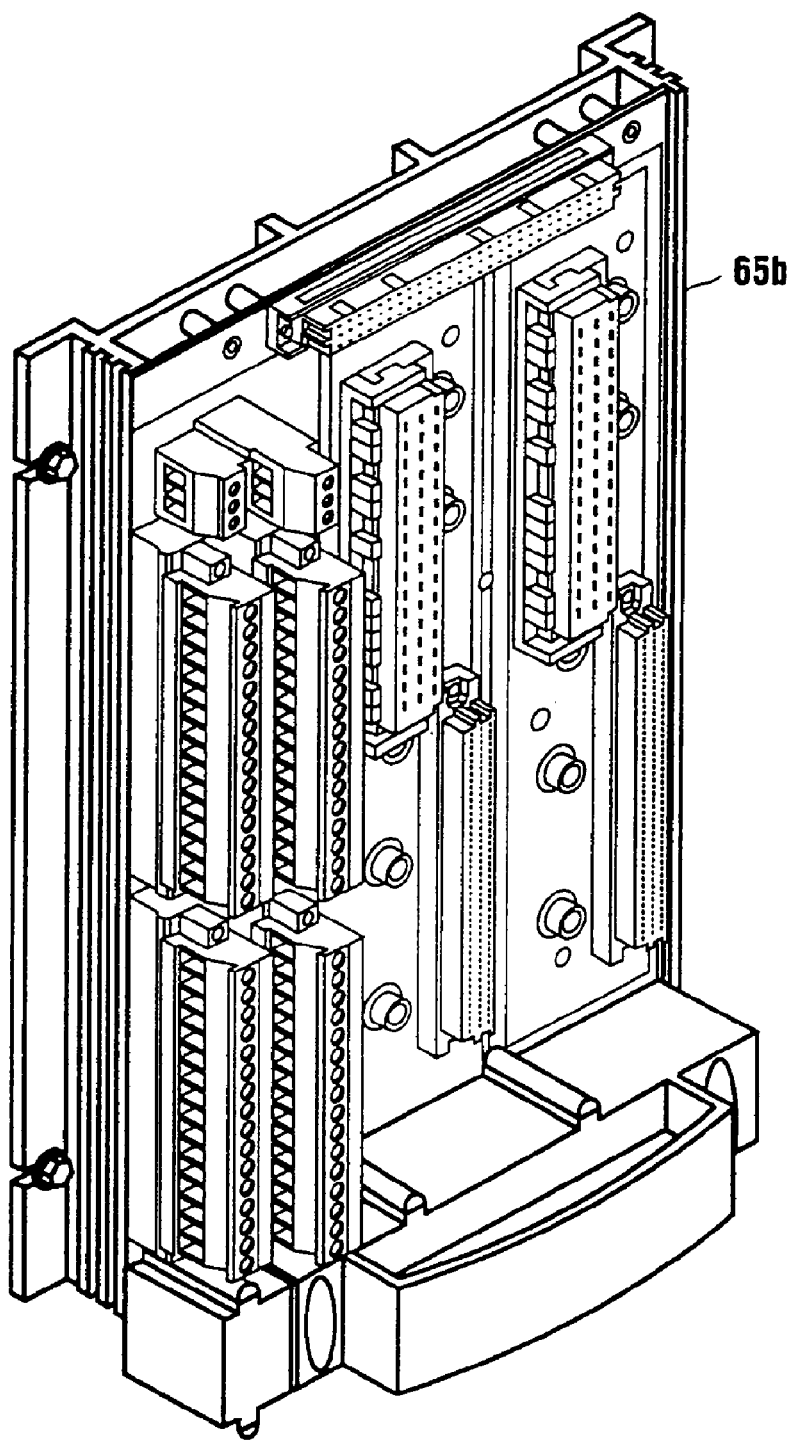
Figure 20B:
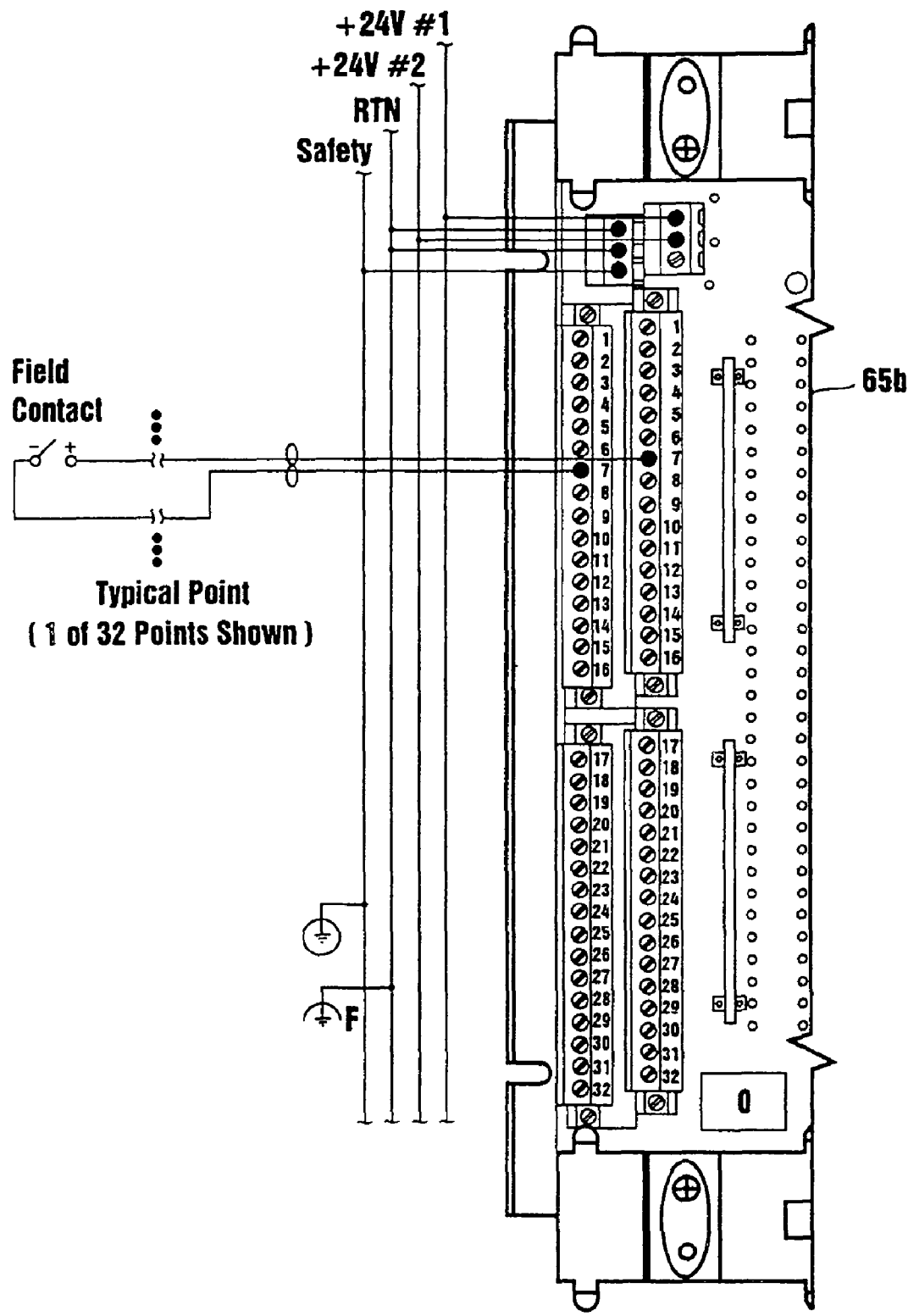
Figure 21A:
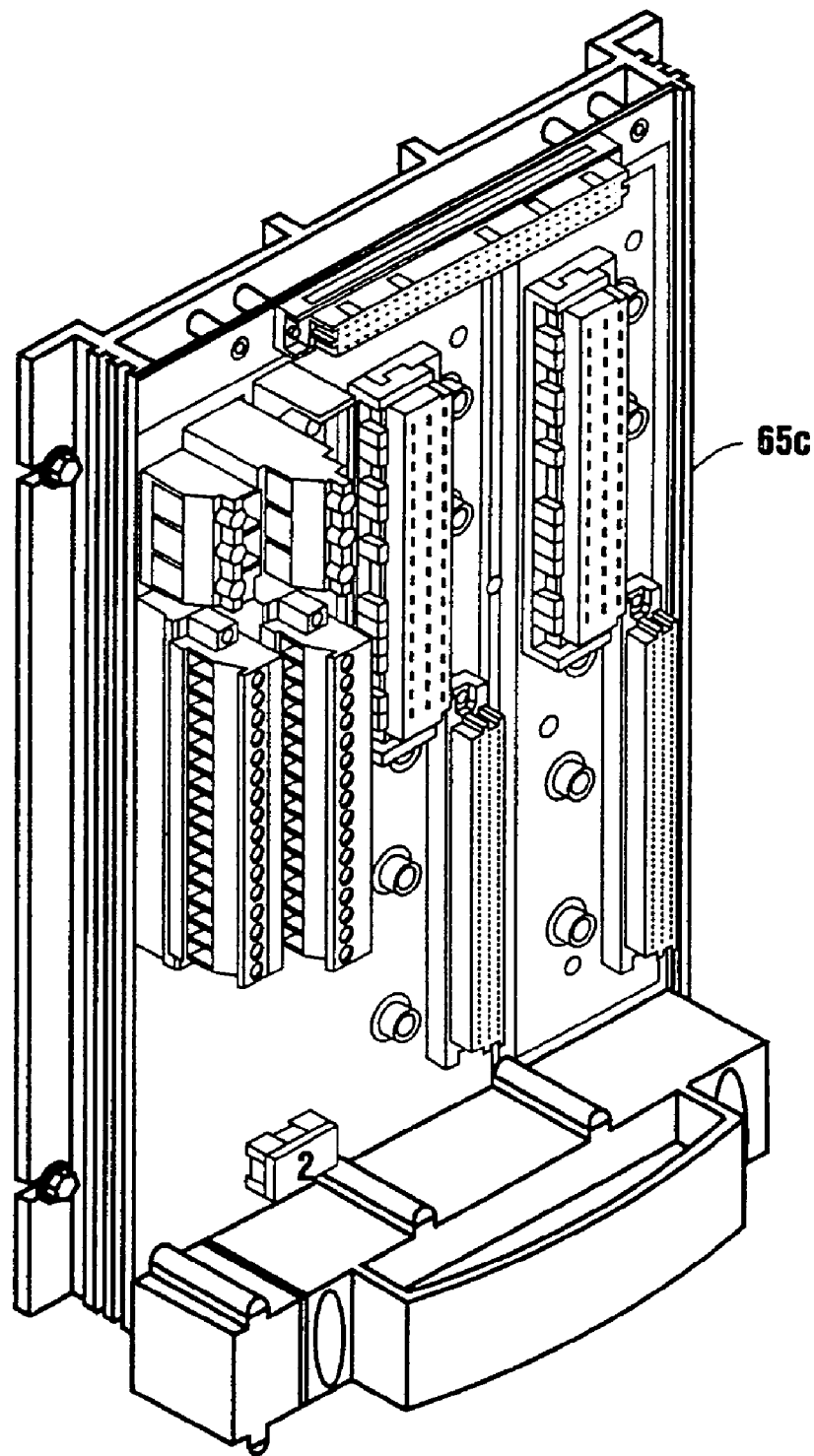
Figure 21B:
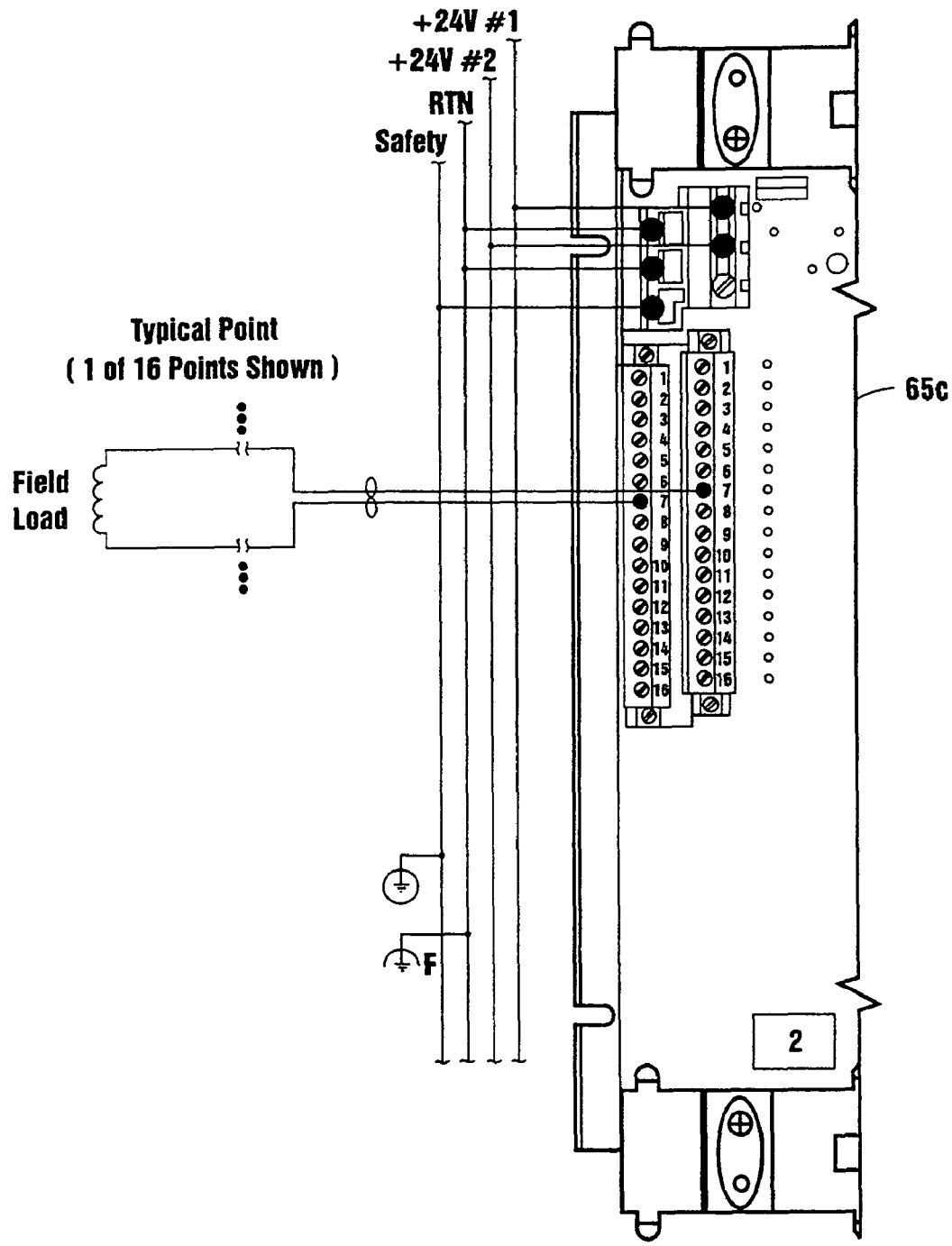
Figure 22A:
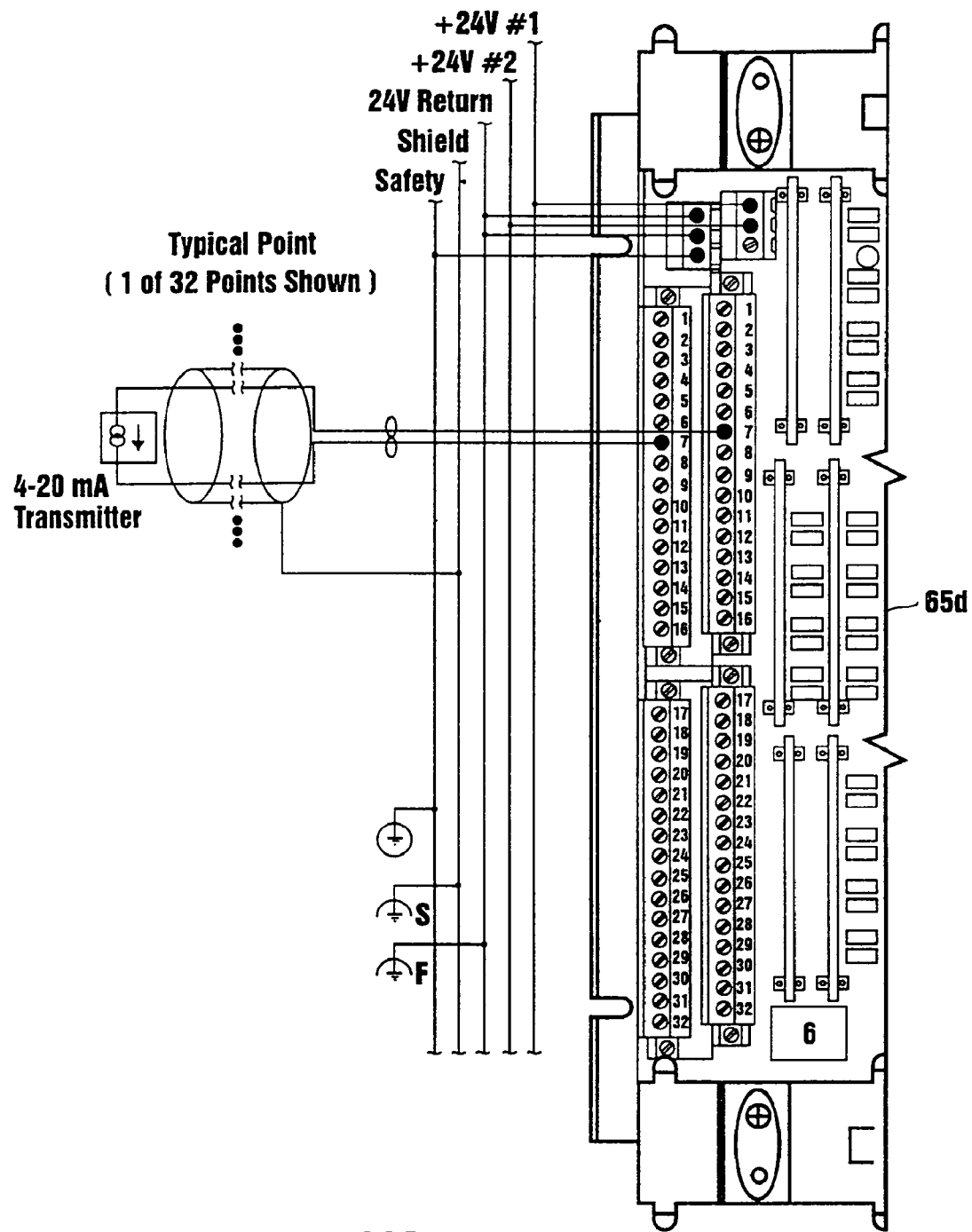
Figure 22B:
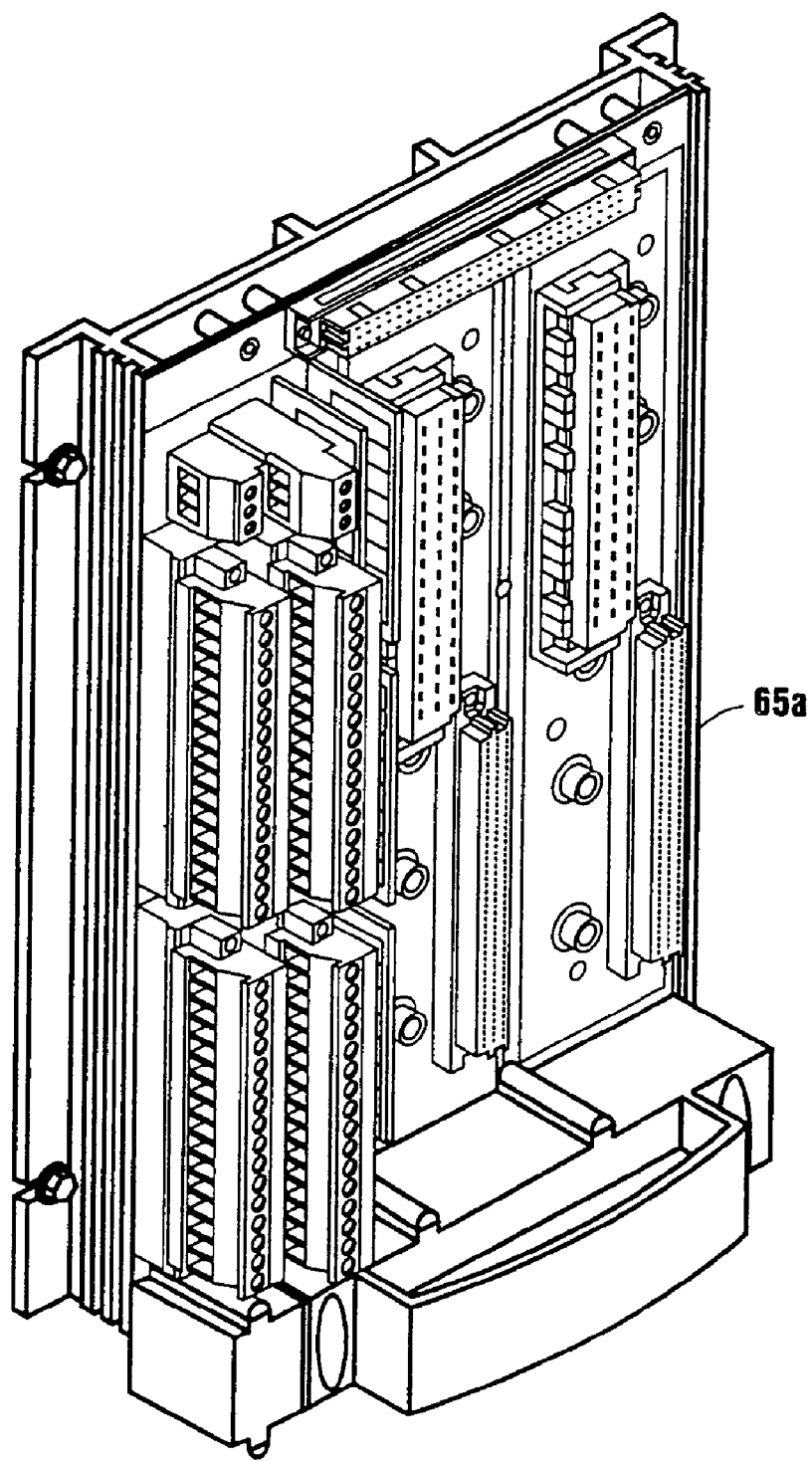
Figure 23A:
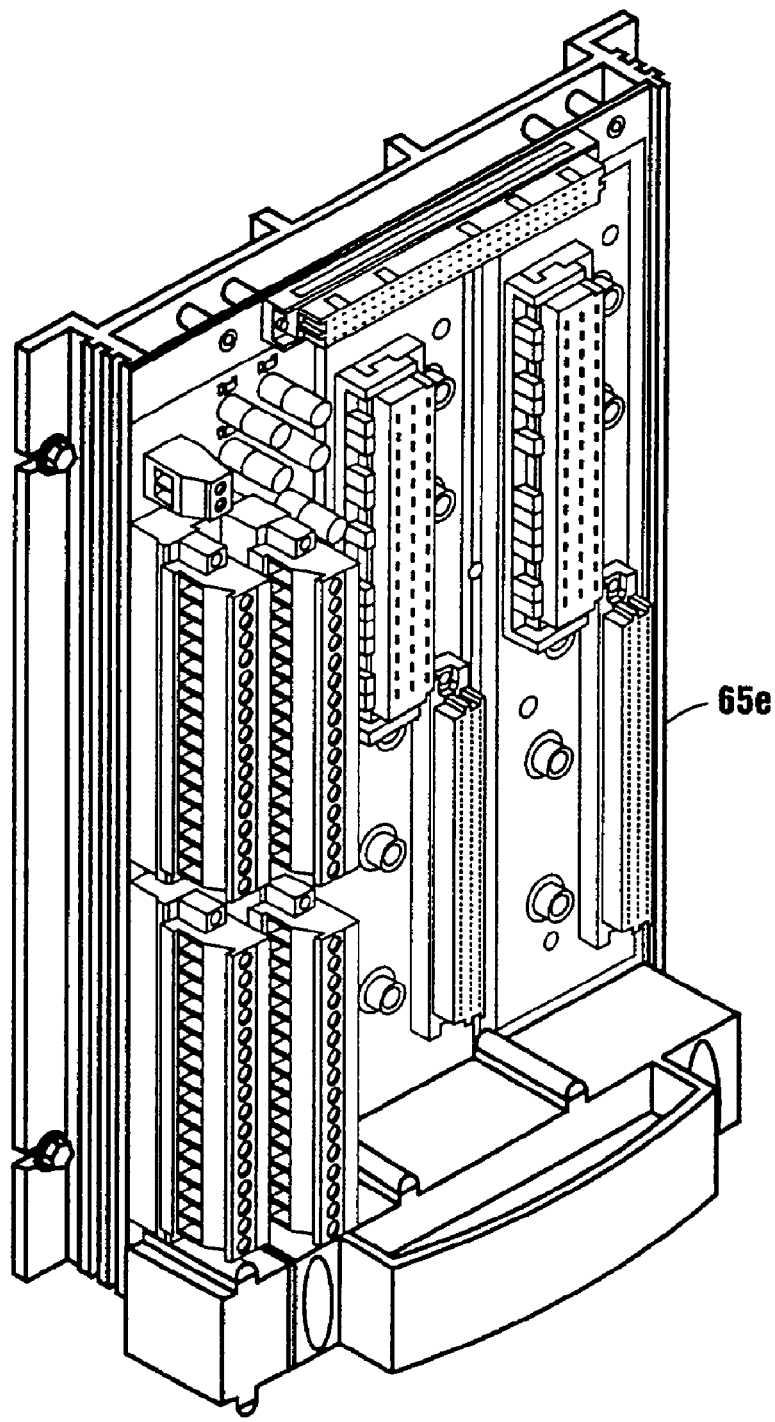
Figure 23B:
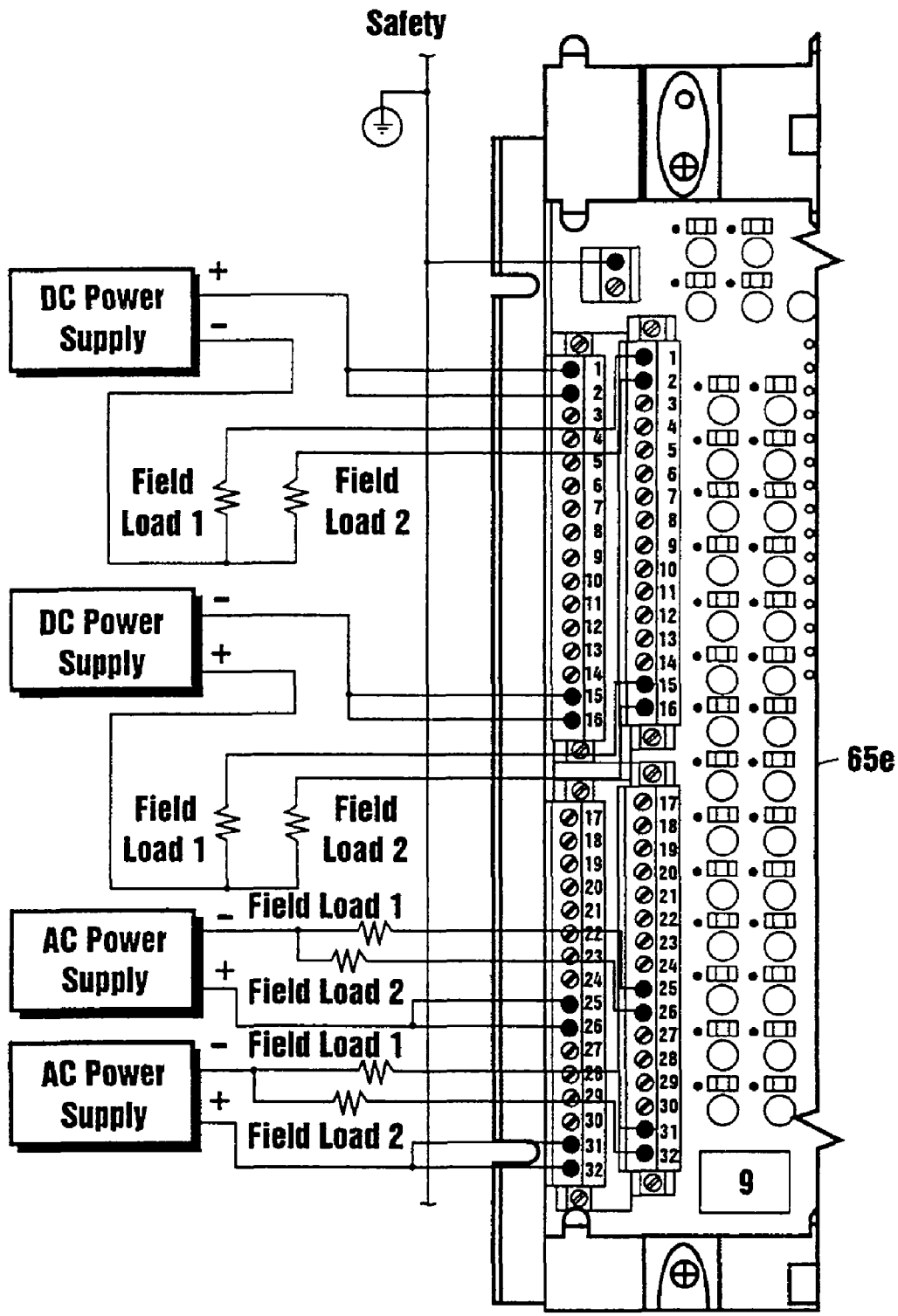

FIGS. 19A and 19B illustrate the mounting of the baseplate for the main processor module MP/IOP module 1 showing its baseplate 65a mounted to the rail and its interconnections. FIGS. 20A and 20B illustrate the mounting of the Digital In module showing its baseplate 65b mounted to the rail and its interconnections. FIGS. 21A and 21B illustrate the mounting for the Digital Out module showing its baseplate 65c mounted to the rail and its interconnections. FIGS. 22A and 22B illustrate the mounting for the Analog In showing its baseplate 65d mounted to the rail and its interconnections. FIGS. 23A and 23B illustrate the mounting for the Relay module showing its baseplate 65e mounted to the rail and its interconnections.

Rail 64 mounted base-plate assemblies permit stacking of several modules as shown in FIGS. 5A and 5B. Each module is housed in a unique housing 29 as described above which provides extended make-first/break-last safety and signal ground pins 47. Also, a safety ground connection to the rail is supplied by the base-plate assembly.

Redundant 24 VDC power supplies are provided to provide a back up in the case of power supply failure. In the preferred embodiment, the MP/IOP 1 is based on the Motorola QUICC microprocessor, the MPC860, as noted above, and includes support for at least 32M bytes of application memory (DRAM). Error detection via parity, background diagnostic, and voting, correction via leg re-education are also provided as is hereinafter described.

TABLE XIV

MP/IOP Base-Plate Requirements Connector Requirements

| Qty | Connector | Function |
|---|---|---|
| 1 | 6 pin Terminal block | VSP1, VSP2 24 v logic power and PE |
| 1 | 4 pin Terminal block | Redundant Alarms |
| 4 | Fuse holders | VSP1, VSP2 and Redundant Alarms |
| 3 | Address Plug | Node Address |
| 3 | DB9p | RS232/RS485 Modbus |
| 3 | DB9p | Reserved - not installed |
| 2 | 96 pin DIN | IO/LCM Module power and LIO bus |
| 2 | 96 pin DIN | LCM Left & Right |
| 3 | Shielded RJ45 | 802.3 10BaseT connector |
| 3 | RJ12 | Debug - Diag Read port |
| 3 | 96 pin DIN | Controller board |
| 3 | 48 pin DIN - E | Power Interface board |
| 12 | Extended Pin | FE and PE. (Logic and Chassis ground) |

The base-plate contains 3 address plugs (one multi-part address plug connector), one per leg. Base-plate Address plugs are visible with modules and cables installed. The Node set via the Address plugs on the MP/IOP base-plate. MP/LIOC address plugs are readable by both MP 15 and IOP 17 CPUs. The same Address plugs are used by the expansion IOP 17 to define the "String number" to support multiple IOP s+I/O module strings from a TMR MP/LIOC.

Synchronization System Synchronized Timing Adjustment

A synchronization system subsystem (TMR Time) is the basis for MP 15 scan synchronization and rendezvous. The subsystem consists of integrated hardware and firmware components, which allows the MPs 15 to be loosely coupled in hardware, i.e. run independent of scan, and still maintain very tight leg-to-leg synchronization, i.e., from scan to scan +/−50 us. Tight synchronization is required to minimize the amount of time that the MP/IOP modules 1 wait to synchronize a Channel 11 rendezvous. Leg-to-leg (channel to channel) isolation is designed to protection against ground shorts or neighboring legs at 36 volts without causing permanent damage or effecting the operation of the leg.

Figure 24:
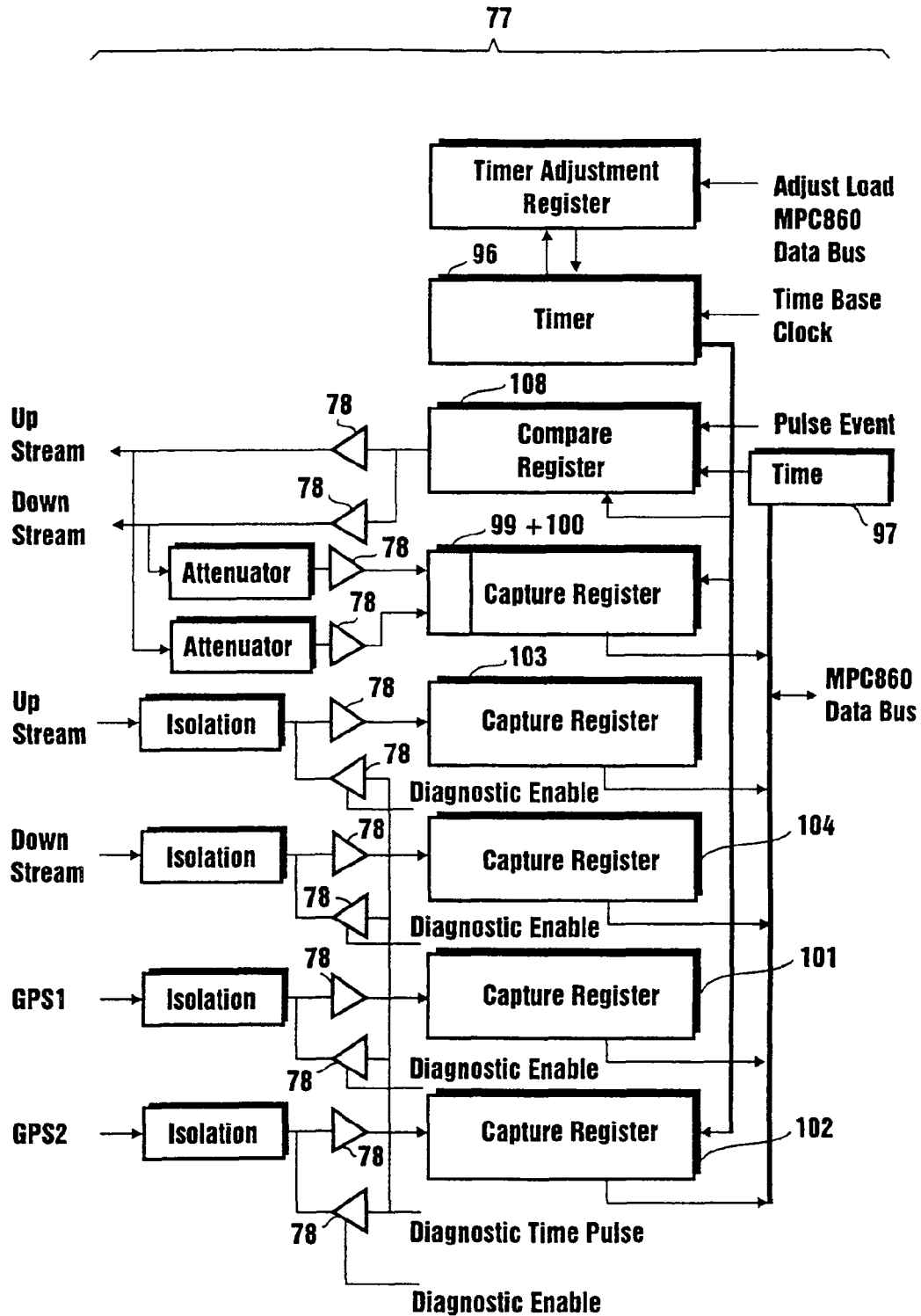

Each MP/IOP module 1 rendezvous using synchronization system based upon each MPs 15 own internal time base, not a common external event or clock. synchronization system is used to implement Channel 11 Synchronization Rendezvous, Leg time synchronization With reference to FIG. 24 registers are used for time synchronization in an FPGA 77. A 24 bit Timer register 96 counts 1μ ticks based the MPC860 50 MHz 25 ppm clock 51. The SX 15' may read the Timer register 96 at any time to obtain relative time. The SX 15' uses relative time of the midpoint processor to determine when to perform its next Channel 11 rendezvous for voting based on a programmed delta time parameter. For MP-to-MP time synchronization, a Time compare register 98 generates a synchronization pulse which is applied to the up and downstream MP 15 sections through amplifiers 54 and 55 respectively when the Timer register 96 matches the Time register 97 in the FPGA. The SX 15' calculates and loads the Time register 97. Four capture registers, two registers 99 and 100 for upstream and downstream captured the timer register, and two registers 103 and 104 for attenuated loop-back capture are readable by SX 15'. The capture registers capture the value of the Timer register when a synchronization pulse is received. The SX 15' uses the delta between the capture registers and its own time to make small adjustments to its Timer register 96 time base and to detect faults.

The synchronization system hardware is optimized to minimize the real time (instantaneous) work required by SX 15'. Synchronization system servicing does not require MPC860 interrupts. Synchronization system is implemented in a FPGA 77 which is accessible by the SX 15'.

An adjustment trim register 99 is provide to compensate for time base crystal oscillator drift. The adjustment trim register 99 adjusts the time base by dropping or adding 40 Ns to the time base clock, 1 us clock every M us based on adjustment counter 63, where M is programmable from 40.96 us to 0.66666496 seconds in 40.96 us increments.

The synchronization system architecture is scaleable to include at least one additional register not shown, to provide for a Hot spared MP/IOP module 1

The synchronization system time synchronization accuracy is selected to minimize Channel 11 rendezvous window to provide synchronization resolution required for 1 ms sequence of events timing, and to provide time base fault detection and isolation between MP-15 legs.

The synchronization system does not drift more that +/−50 us over a, 1 second period. To provide a 10× margin, the minimum synchronization system accuracy is +/−50 us/10 s or +/−5 ppm. The synchronization system timer base is accurate to +/−25 ppm (drift +/−25 us per second), therefore the SX 15' trims (adjust) this time base 105 to provide the required accuracy between MPs 15.

The synchronization system and the SX 15' synchronizes the MP 15 to an accuracy of +/−50 us. This sets the normal Channel 11 rendezvous window to 100 us. The time base 105 is derived from the MP 15 MPC860 50 Mhz 25 ppm crystal oscillator, divided by 4 for time base adjustments, and divided by 12.5 (12 then 13 then 12 . . . ) for the Timer register 97. Given an accuracy of +/−50 us, the time resolution of the synchronization system timer and capture registers is approximately an order of magnitude better, or: +/−5 u. Assuming the longest System scan is 500 ms, the timer should roll twice per scan so that SX can detect register roll-over and maintain the high order timer bits in system memory, therefor the timer must not roll twice per scan. 500 ms/1 us<$2^{19}$ or 19-bits. In addition, to permit the timer to be diagnosed, the timer should roll over at least once per 10 minutes (diagnose time requirement). 600 s/1 us>$2^{29}$ or 29 bits. A timer length of 24 bits satisfies both requirements and minimizes FPGA 77 hardware. Roll over occurs every 16.77721594 seconds. Capture registers and Time registers are 24 bits and the timer roll flag sets when the timer rolls over to zero.

Figure 25:
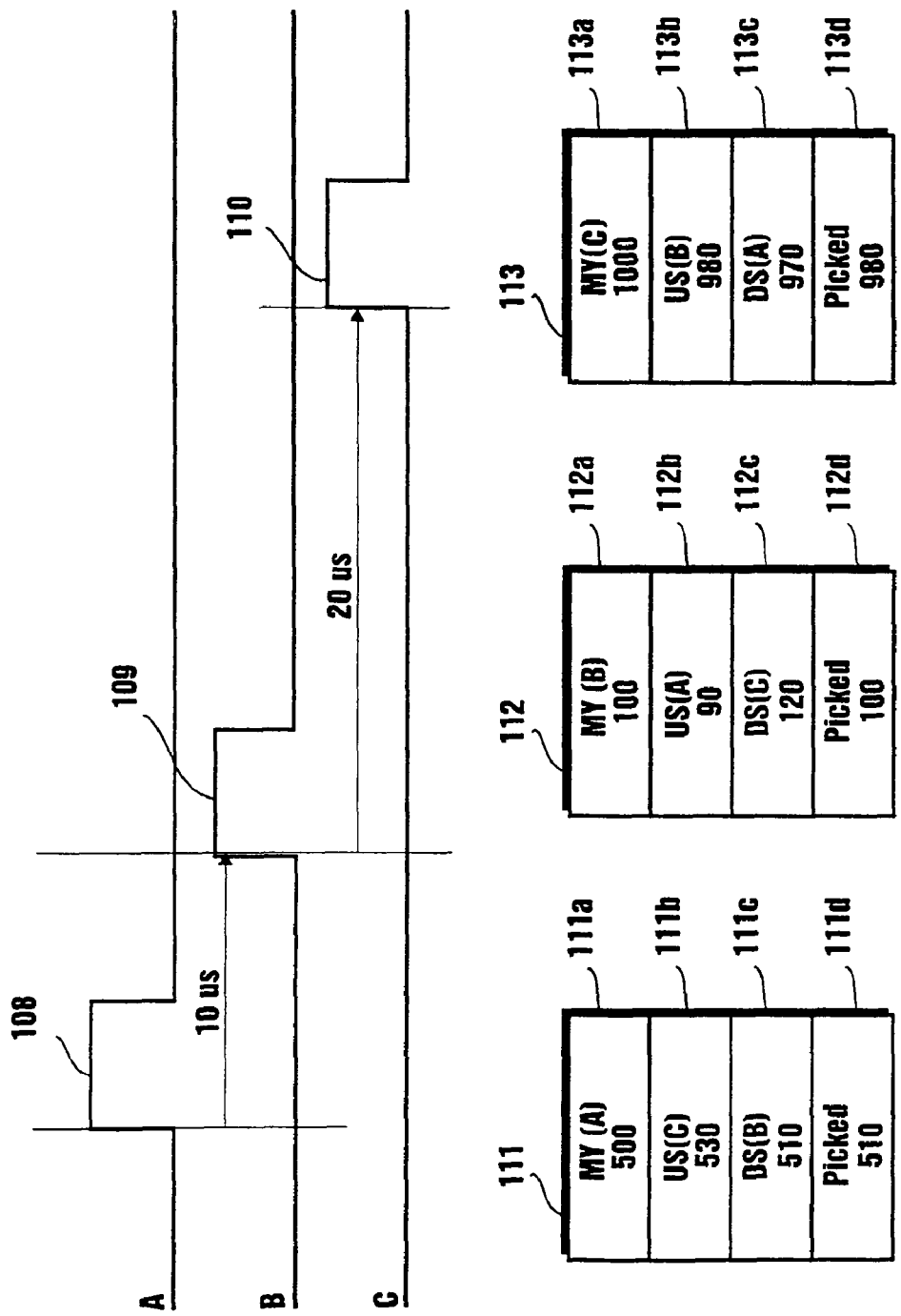

Referring to FIG. 24 the synchronization system FPGA 77 includes all of the synchronization system registers which are memory mapped and includes a method illustrated in FIG. 25 for adjustment of each MP's synchronization system timer time base. This is important since the MP 15 time synchronization pulses may arrive at any time relative to an MP's timer's value. The timer FPGA 77 method generates a pulse when the Timer register 96 matches the Time register 97. The capture registers latch the contents of the Timer (double synchronized to the time base clock/2 and latched on the next microsecond) on the rising edge of each synchronization pulse. The Synchronization pulses are at least 3 us wide to allow the MP-MPC860 time to poll for the presence of the pulses during power up diagnostics and SX 15' startup.

Referring to FIG. 25, the operation of the time synchronization is shown by way of example. Processor A initiates a synchronization pulse 108, processor B initiates a synchronization pulse 109 ten microseconds from the leading edge of the A pulse 108. Processor C initiates a synchronization pulse 110 twenty microseconds from the leading edge of the B 109 pulse. Assuming, the clocks of each processor are running at a different count, e.g. A at 500, B at 100, C at 1000, the each processor would synchronize the clocks as follows:

MY (A) captures its clock 111*a* at 500 on generation of its synchronization pulse. On receipt of the downstream MY (B) synchronization pulse, MY (A) captures its clock 111*c* at 510 On receipt of the upstream MY (C) synchronization pulse, MY (A) captures its clock 111*b* at 530.

On receipt of the upstream MY (A) synchronization pulse, MY (B) captures its clock 112*b* at 90. MY (B) captures its clock 112*a* at 100 on generation of its synchronization pulse. On receipt of the downstream MY (C) synchronization pulse, MY (B) captures its clock at 112*c* at 120

On receipt of the upstream MY (B) synchronization pulse, MY (C) captures its clock 113*b* at 970. MY (C) captures its clock 113*a* at 1000 on generation of its synchronization pulse. On receipt of the downstream MY (A) synchronization pulse, MY (C) captures its clock 113*c* at 970.

By examining the capture times each processor determines which processor was midpoint. That is in between the pulses of the other processors. Accordingly, (A) picks a count of 510 which adds 10 us to its clock and (C) picks a count of 980 which subtracts 20 us from its clock thereby synchronizing the processors.

The synchronization system Timer register 96 includes STOP and CLEAR controls. SX 15' polls for synchronization pulses from the other MP modules 1 (if any) before generating an external synchronization pulse (T). Alternatively, the SX 15' may clear and stop the Timer register 96 and wait for a synchronization pulse. On receipt of the synchronization pulse, the SX 15' uses the adjust registers to acquire synchronization. The following steps occur in each scan time sequence;

t0, step 601
1) SX 15' reads the synchronization system capture registers and loop-back status.
2) SX 15' checks for roll over and increment, the high order time bits kept in memory.
3) SX 15' selects an MP leg (mid-point) to be used for trim calculations.
4) SX calculates a real time value for the next synchronization pulse and load time into synchronization system Time register.

t1-t3, step 602
The synchronization system capture registers 99, 100, 101, 102, 103 and 104 capture the synchronization system timer register 96 value to the nearest 1 us when an external synchronization pulse is received. Previous values are over-written.

t2, step 603
synchronization system generates a synchronization pulse when the Timer register 96 matches the Timer 97.

t4, step 604
Returns to t0, for next scan.

Note: t0-t4 are arbitrary time markers use to illustrate the synchronization system sequence.

The FPGA 77 contains and decodes the following registers set forth in Table XV.

TABLE XV

Address CS6 + 80 Hex Register Format

| Addr | MSB | | Register | LSB |
|---|---|---|---|---|
| 0x80 | Roll | Stop | TT_INT | T register (Time) 24 b - r/w |
| 0x84 | Roll | Stop | TT_INT | T counter (Timer) - Free running 24 b - r/o |
| 0x88 | Roll | Stop | TT_COF | Upstream loop-back capture 24 b - r/o |
| 0x8C | Roll | Stop | TT_COF | Downstream loop-back capture 24 b - r/o |
| 0x90 | Roll | Stop | UP_COF | Upstream capture 24 b - r/o |
| 0x94 | Roll | Stop | DN_COF | Downstream capture 24 b - r/o |
| 0x98 | Roll | Stop | 0 | not used |
| 0x9C | Roll | Stop | 0 | not used |
| 0xA0 | Adj Enable | N Reg | M Reg | Control register - 16 b -r/w |
| 0xA4 | | 0 | | Status clear bits - 16 b -w/o |

The T register (Time register) determines when the synchronization system Synchronization Pulse output signal (TTS is generated. The TTS pulse is generated for 3 us when the T register=T counter evaluates true.

The T counter (Timer register) counts 1 us time base clocks. The T counter is free running. The Roll bit indicates when the T counter has rolled past the 24 bit Capture and Time register boundary and the software of the MP 15 accounts for this when capturing time.

Referring again to FIG. 24 and Table XV, the upstream attenuated loop-back capture register 99 latches the value of the T counter 96 when the Upstream attenuated loop-back detects a output synchronization pulse (TTS). The T counter Roll and Stop bits are also captured. This register detects faults in the "MY to Upstream" Synchronization pulse driver and backplane pins. The upstream loop-back capture register 99 is unknown until the first TTS pulse is detected. Roll and Stop indicate the state of the ROLL and stop flags when the capture occurred. TT_COF (capture overflow) indicates that TT_INT was already set when the capture occurred. The TT_COF bit will not clear until the TT_INT bit is cleared and the next TSO capture occurs.

A Downstream attenuated loop-back capture register 100 latches the value of the T counter 96 when the Downstream attenuated loop-back detects a output synchronization pulse (TTS). The T counter 87 Roll and Stop bits are also captured. This register detects faults in the "MY to Downstream" Synchronization pulse driver and backplane pins.

This Downstream Loop-back register 100 is unknown until the first TTS pulse is detected. Roll and stop indicate the state of the ROLL and stop flags when the capture occurred. TT_COF (capture overflow) indicates that TT_INT was already set when the capture occurred. The TT_COF bit will not clear until the TT_INT bit is cleared and the next TSO capture occurs.

An Upstream capture register 103 latches the value of the T counter 96 when the Upstream Synchronization pulse is detected. The T counter Roll and Stop bits are also captured. The Upstream Capture register 103 is unknown until the first Upstream Synchronization pulse (T) is detected or until the UP_LBEN (Upstream loop-back enable) bit is set in the control register and a synchronization system Synchronization Pulse (TTS) is generated. Roll and stop indicate the state of the ROLL and stop flags when the capture occurred. UP_COF (capture overflow) indicates that UP_CF was already set when the capture occurred. The UP_COF bit will not clear until the UP_CF bit is cleared and the next UP_S capture occurs. (See TT control register)

The Downstream capture register 104 latches the value of the T counter when the Downstream Synchronization pulse is detected. The T counter 96 Roll and Stop bits are also captured. The Downstream Capture register 104 is unknown until the first Downstream Synchronization pulse is detected or until the DN_LBEN (downstream loop-back enable) bit is set in the control register and a synchronization system Synchronization Pulse is generated. Roll and stop indicate the state of the ROLL and stop flags when the capture occurred. DN_COF (capture overflow) indicates that DN_CF was already set when the capture occurred. The DN_COF bit will not clear until the DN_CF bit is cleared and the next DN_S capture occurs.

The control register 97 provides miscellaneous functional and diagnostic control of the synchronization system subsystem.

Channel Data Transfer and Voting

There are three MP/IOP modules 1 in a preferred system of the present invention as noted above. As shown in FIGS. 10A and 10B the three MP/IOP modules communicate with each other via an inter-MP bus or channel. 11. The Channel 11 is a three channel parallel to serial/serial to parallel communications interface with a DMA controller, hardware loop-back fault detection, CRC checking and MP to MP electrical isolation is a high speed communication path between the three MPs 15 primarily used for voting. The three MPs 15a, 15b and 15c are time synchronized with each other by a synchronization system.

In operation as shown in FIG. 2 each leg (Channel A, B, C) of the system controller is controlled by a separate MP/IOP module 1. Each MP/IOP module 1 operates in parallel with the other two MP/IOP modules 1, as a member of a triad. Each IOP 17 scans each LIO module 2 installed in the system of the present invention via the RS485 2 Mb LIO bus 13 at a predetermined time interval (set by the initial programming). As each module is scanned, new input data is transmitted by the IOP 17 to MP 15 via the shared memory module 16 located on the MP/IOP printed circuit board. The SX 15' assembles the input data and stores the input data in an input table in its memory 16 for application program evaluation.

Channel Voting

Prior to application program evaluation, the input table in memory 16 is compared with the input tables in memory 16 on the other MPs 15 via the channel. 11.

The input data in each MP 15 is transferred to the other MP 15 modules in the system and "voted" by the SX 15' firmware. If a disagreement is discovered, the value found in two out of three tables prevails, and the third table is corrected accordingly. Each MP 15 maintains history data for corrections and faults. Any continuing disparity with the same leg, register or the like is recorded for future handling at a predetermined occasion by the SX 15' Fault Analyzer routines.

The SX votes inputs before passing them to the application program to insure that the inputs are correct. Voting will be based on a majority vote on comparison and the defaulting MP/IOP module 1 data will be corrected. The SX 15' votes the inputs in accordance with the following Table XVI dependent on the number of MP/IOP module 1 processors in the system and whether the data is analog (a number) or discrete (on or off).

TABLE XVI

Voting Mode Comparison

| Operating Mode | Number of Legs Enabled | Discrete Voting | Analog Input Voting |
|---|---|---|---|
| TMR | 3 | 2-out-of-3 | Mid Value |
| Duplex | 2 | 2-out-of-2 | Average |
| Single | 1 | 1-out-of-1 | 1-out-of-1 |
| Safe | 0 | De-energized | NA |

Accordingly, when in TMR mode, i.e. three processors enabled, Digital or Discrete voting is conducted on 2 out of 3 matching. For Analog voting the Midpoint value is selected.

When in Duplex Mode, i.e. two processors enabled, Digital or Discrete voting is concluded on a 2 out of 2 matching. For Analog voting the Average value is selected. For single processor voting the value presented is the value selected for either Discrete or Analog voting.

After such comparison is made the selected value is restored to any table having different values.

In addition to Input comparisons, the SX 15' will also compare the outputs every scan. It will be considered a safety fault, if a MP 15 output data does not compare with the other MP's output data in accordance with Table XVI. Internal variables will also be compared on a periodic basis as is predetermined by the SX 15' code which can test every scan. The application program code will also be compared on a periodic basis as is predetermined by the SX 15' code which can also be every scan. Any comparison failure is considered a safety fault.

After the channel 11 transfer and input data voting has corrected the input values, the values are evaluated by the application program. The Development developed application program is executed by the SX 15' in parallel on each MP 15 using an MPC860 microprocessor which is a suitable CPU for the MP 15. The application program generates a set of control system output values based upon the control system input values, according to the rules built in to the program by a Control Engineer for a particular installation. The MP 15 transmits the output values to the IOP 17 via shared memory 16 over interface 18. The MP 15 also votes the control system output values via channel. 11 to detect faults. The IOP 17 separates the output data corresponding to individual LIO Modules 2 in the system. Output data for each LIO module 2 is transmitted via the LIO bus 13 to the output modules.

Channel Data Transfer

At predetermined times each MP 15 rendezvous with the other active members of the triad via the synchronization system and compares and votes all application program input data. During this comparison the actual data is voted a using a majority override mechanism as noted above and all discrepancies corrected where appropriate. Each MP 15 is transferred a copy of the other's data to compare against and correct it's own copy as required over the channel 11. Along with the input data, portions of the MP 15 memory and hardware status shall transferred to the other MPs 15 via Channel 11 and compared by firmware. Discrepancies constitute a fault.

Voting is performed by SX instructions. The Channel 11 is similar to a generic multi-channel communications controller using buffer descriptors except that Channel 11 is optimized for TMR SX 15' operation and includes, real time fault detection and fault location of most faults via attenuated transmit loop-backs, no single Channel 11 failure disables more than one MP 15, no physical Channel 11 interface signal interfaces with more than one other MN 15. (Physical interfaces are point-to-point).

A typical channel 11 transfer used for voting purposes consists of the following steps:

Rendezvous (synchronization system) step 701
Transferring of data to be voted (Channel 11) step 702
Analyzing transfer results (SX), CRC, status, and the like, step 703
Transferring 1st results data resulting from analyzing transfer results to other MW Modules 1 (Channel 11) step 704
Accumulating transfer results (SX), received from other MP Modules, step 705
Transferring 2nd results data indicating voting mode to be taken (Channel 11) step 706
Analyzing and Voting the data, step 707

Voting Mode Selection

A combination of firmware algorithms (lookup table) and Channel 11 attenuated loop-back information permits the MPs 15 in the triad to detect, locate and contain any single leg Channel 11 faults to the faulted leg. In addition, the fault status information also allows the non-faulted MPs 15 in the triad to unanimously agree on the voting mechanism (TMR, Dual or Single). It is important that all MPs 15 vote using the same voting mode, since voting TMR will result in different (although correct) analog values V/S voting in Dual mode. To insure that all MPs participating in the vote arrive at the same voting mode in the presence of a Channel 11 fault, the following Channel 11 result accumulation tables is used.

TABLE XVII

Channel 11 transfer accumulated results table

| Channel 11 Transfer | Path fault information accumulated per MP leg (True/False Boolean data) | | | | | | | |
|---|---|---|---|---|---|---|---|---|
| After Channel 11 data transfer | Mum | Mdm | Mlmu | Mlmd | | | | |
| After 1st result transfer | Umu | Udu | Ulum | Ulud | Dmd | Dud | Dldm | Dlum |
| After 2nd -result transfer | Dumu | DUdu | DUlum | Dulud | UDmd | UDud | UDldm | UDldu |

In order for voting to accurately determine a result the following rules are set regarding the Channel 11 results:

True=Data Transfer Worked, good CRC and good sequence number.

False=Data Transfer failed/missing or bad CRC or bad sequence number.

All transfers are "written". I.E. One leg can not pretend to be another.

Only one leg faulted at a time.

TABLE XVIII

Path Faults
Paths and possible Single faults locations

| Path | Transmit Fault at: | Receive Fault at: |
|---|---|---|
| mu | M | U |
| md | M | D |
| um | U | M |
| ud | U | D |
| dm | D | M |
| du | D | U |

TABLE XIX

Vote selection mode truth table

| TMRvote | RMum & RMdm & (Rumu | RDUmu) & (RUdu | RDUdu) & (RDmd | UDmd) (RDud | RUDud) |
|---|---|

| Path Fault | Fault At: | Voter Solution | Boolean Equation |
|---|---|---|---|
| Single leg faults resulting in Dual voting: DUALvote | | | |
| MvUD_fMmu | M | UD <= | !MRUmu & !MDRUmu & (RMRUdu|MDRUdu) & (MRDud|MURDud) & !Tmmu |
| MvMD_fUmu | U | MD <= | RMdm & !MRUmu & !MDRUmu & (MRDmd|MURDmd) & TMmu |
| MvUD_fMmd | M | UD <= | !MRDmd & !MURDmd & (MRUdu|MDRUdu) & (MRDud|MURDud) & !TMmd |
| MvMU_fRDmd | D | MU <= | RMum & !MRDmd & !MURDmd & (MRUmu|MDRUmu) & TMmd |
| MvMD_fUum | U | MD <= | !RMum & RMdm & (MRDmd|MURDmd) & !MTUum & !MDTUum |
| MvUD_fMum | M | UD <= | !RMum & (MRUdu|MDRUdu) & (MRDud|RMURDud) & (RMTUum|MDTUum) |
| MvMD_fUud | U | MD <= | RMdm & (MRDmd|MURDmd) & !MRDud & !RMURDud & !RMTUud & !MDTUud |
| MvMU_fDud | D | MU <= | RMum & (MRUmu|MDRUmu) & !MRDud & !MURDud & (MTUud|MDTUud) |
| MvMU_fDdm | D | MU <= | RMum & !RMdm & (MRUmu|MDRUmu) & !MTDdm & !MUTDdm |
| MvUD_fMdm | M | UD <= | !RMdm & (MRUdu|MDRUdu) & (MRDud|MURDud) & (MTDdm|MUTDdm) |
| MvMU_fDdu | D | MU <= | RMum & (MRUmu|MDRUmu) & !MRUdu & !MDRUdu & !MTDdu & !MUTDdu |
| MvMD_fUdu | U | MD <= | RMdm & (MRDmd|MURDmd) & !MRUdu & !MDRUdu & (MTDdu|MUTDdu) |
| Multiple faults resulting in Single mode voting: SINGLEvote | | | |

End of scan copy: TMRmode <= TMRvote, DUALmode <= DUALvote

A false value can not be made true by passing it through the bad leg. False values stay false.

A true value may be made false (or stay true) by passing it through the bad leg. I.E. True values may go false when passed through the bad leg.

A true value passed through a good leg stays true.

Loop-back status always correctly detects the fault location.

Example line 2 of Path fault: MvMD_fUmu

My vote is MY and Downstream, fault located at Upstreams MY to Upstream interface: I.E., Upstream Receiver is bad.

The equation reads:

RMdm->I received good data from downstream.

!MRUmu->Upstream reports he did not receive my data.

!MDRUmu->Downstream reports that Upstream reports he did not receive my data.
MRDmd->Downstream reports he did receive-my data.
MURDmd->Upstream reports that Downstream he did receive my data.
TMmu->My upstream Transmit is good.
Note: Voting UD cases are for fault diagnosis only, M fails in this case and does not actually vote.
Redundant written terms has not been reduced out.

Abbreviations

Note: These terms are concatenated to form first and second hand status information used to determine the voting mode.
M=my view
U=Up's view
D=Down's view
v=vote is . . .
f=fault located at . . .
Operators: !=not, |=logical "OR", & =Logical "AND"
RM=my view of another legs data packet status through My receiver
RU=Ups view of another legs data packet status through UPs receiver
RD=Downs view of another legs data packet status through DNs receiver
TM=my view of my loop-back status
TU Ups view of Ups loop-back status
TD=Downs view of Downs loop-back status
um=result of transfer from path Up to MY
dm=result of transfer from path Dn to MY
lmu=result of my hardware loop-back from Up to MY path
lmd=result of my hardware loop-back from Dn to MY path
mu=result of transfer from path MY to Up
du=result of transfer from path Dn to Up
lum=result of Up hardware loop-back from Up to MY path
lud=result of Up hardware loop-back from Up to Dn path
ud=result of transfer from path Up to Dn
md=result of transfer from path MY to Dn
Idm=result of Dn hardware loop-back from Dn to MY path
Idu=result of Dn hardware loop-back from Dn to Up path
Skip_OK=Ok to skip a scan. This term prevents the MP from skipping consecutive scans or too many scans per TBD time period.
TMRmode=Last vote was TMRvote. Used to determine.
DUALmode=Last vote was DUALvote. Used to determine.
SINGLEmode=Last vote was Single vote.
TMRvote=Voting TMR this scan.
DUALvote=Voting DUAL this scan.
SINGLEvote=Voting Single this scan.

The method of voting mode selection includes the following steps. The SX system checks the lookup truth table, and the capture register values, step 801. The system then checks for any faults or any processor leg, step 802. If no faults are detected, then the system enters TMR voting mode. If a fault is discovered, step 802, the system determines if more than one processor is faulted, step 803. If so, the system continues in single processor voting mode, step 804. If all of the processors are faulted, the system halts.

A hardware clock calendar circuit is used to maintain the time and date during the MP power-off state and for OSE. The synchronization system FPGA firmware based clock calendar routines are used to maintain the time and date during the MP power-on state. This time is voted between the MPs.

Attenuated Hardware Communication Interface Loop-Back

TriBus channel transmit data loop-back receiver-checkers independently check the upstream and downstream transmit data drivers. As shown in FIG. 24 Loop-back registers 99 and 100 are connected through the base-plate so that the transmit data driver base-plate connectors pins will also be diagnosed. The loop-back receivers are slightly attenuated with respect the MPs upstream and downstream receivers so that a weak transmitter will be detected by the loop-back receiver before it is detected by the up or downstream receiver. This feature provides extremely accurate fault identification and location.

When data signals are transmitted to adjacent processors on the various processor legs as shown in FIGS. 11A and 11B, each processor 90, 91 and 92 has an upstream and downstream loop back path, 90b, 90d, 91b, 91d, 92b and 92d, respectively. The loop back capture registers capture the level of the signal. The signals are attenuated to switch the signal value received by the other upstream and downstream processors. Since the loop-back signal is first received by the transmitting processor, the expected return value can be evaluated.

Terms and Acronyms Used in this Specification

Channel (Also know as Leg) An independent I/O Input->MP->I/O Output path
LCM Local Communication Module
LCM Bus Bus between MP and Local Communication module
LIO or IO BusInterface between IOP s and IO modules
IOP System Input Output Processor
IOP Bus Bus between MP/IOP and expansion IOP s
LIOX or IOX System Input/Output Executive firmware
MP System Main Processor
LRXM or RXM System Remote Extender Module
LSX or SX Executive firmware System of the present invention
MAU Media Adapter Unit—for 803.2 networks
TMR Triple Modular Redundant
TRICON TRICONEX Fault Tolerant PLC
channel. MP inter-processor communications bus
TriLan Triplicated Peer to Peer Bus
Trinode A System MP on TriLan.
synchronization system MP Time synchronization subsystem
DMA Direct memory access
TCP/IP Transmission Control Protocol/Internet Protocol
PC Personal computer
DCS Host Distributed processor control systems host LAN Local area network
Legs Channel
LMP/LIOP or MN/IOP Main processor/input output module
Modbus A Modicon protocol bus
LCB Local communications bus
Control Program Program developed by user for control of industrial environment
FRS Field replaceable subsystem While specific embodiments of this invention has been described above, those skilled in the art will readily appreciate that many modifications are possible in the specific embodiment, without materially departing from the novel teachings and advantages of this invention. Accordingly, all such modifications are intended to be included within the scope of this invention.

Having thus described the invention what is claimed is:
1. A system for validating communications between a plurality of processors comprising:
a plurality of loop back paths, wherein each of the loop back paths is coupled to a corresponding one of the plurality of processors, wherein each loop back path includes an attenuation element of a predetermined value, said attenuation elements configured to attenuate a one of a plurality of signals transmitted from each of the corresponding one of the plurality of processors by a predetermined amount so as to generate a plurality of attenuated loop back signals;

a plurality of signal transmission paths, wherein each of the signal transmission paths is configured to carry a corresponding one of the plurality of signals from one of the plurality of processors to another of the plurality of processors;

a plurality of data checkers, wherein each of the data checkers is configured to compare one of the plurality of attenuated loop back signals to a corresponding one of the plurality of transmission signals so as to enable the validity of each of the plurality of signals to be assessed; and a synchronization subsystem configured to time synchronize the data checkers so as to facilitate the comparing of the attenuated loop back signals and corresponding one of the plurality of transmission signals; wherein the predetermined value of the attenuation elements are selected so as to provide an attenuation with respect to the attenuation in the signal transmission paths from the ones of a plurality of processors to another of the plurality of processors so as to facilitate detection of a weak transmitter.

2. The control system of claim 1, including:
at least one input/output module configures to send control system information to each of the plurality of processors.

3. The control system of claim 1, including:
a plurality of memory modules, wherein each of the plurality of memory modules is coupled to a corresponding one of the plurality of loop back paths, wherein each of the memory modules is configured to store information relative to a corresponding one of the plurality of loop back signals.

4. The control system of claim 3 wherein one of the plurality of memory modules and one of the plurality of data checkers is integrated with a corresponding one of the plurality of processors.

5. The control system of claim 1 wherein said attenuation element comprises a resistive element selected to provide a predefined signal level margin between said signal transmission path and said loop back signal path.

6. The control system of claim 5 wherein said margin is 30 millivolts.

7. The control system of claim 5 wherein said resistive elements has a value of 255 ohms.

8. The system of claim 1 wherein the data checkers compare ones of the plurality of loop back signals to a corresponding one of the plurality of transmission signals during receipt of data.

9. the system of claim 1 further including a voting subsystem, wherein the voting subsystem is configured to vote input data received at the plurality of processors based at least in part on validity data generated by the plurality of data checkers.

10. A control system for executing a common application program comprising:
three processor modules, each of the three processor modules configured to execute the common application program in a substantially simultaneous fashion;
at least one field input/output module disposed to communicate with the three processor modules;
wherein each of the three processor modules includes a transmitter, a loopback receiver coupled to the transmitter, and an upstream or downstream receiver coupled to a transmitter of each of the other two processor modules, and wherein the loopback receiver is configured to have an attenuation relative to the upstream or downstream receivers so as to facilitate detection of a fault in a link between the processor module and one of the other two processor modules; and
a synchronization subsystem configured to time synchronize the three processor modules so as to facilitate synchronous fault detection.

11. The control system of claim 10, wherein a first of the three processor modules is configured to transmit a signal to a second of the three processor modules, and wherein the attenuated feed back system includes a loop back path coupled to the first of the three processor modules, wherein the loop back path includes a first attenuation element having a predefined attenuation value, said first attenuation element configured to attenuate the signal by a predefined amount so as to generate a first attenuated signal, wherein the first of the three processor modules is configured to compare information in the first attenuated signal and information in the signal so as to determine whether there is a fault in communications between the first and the second of the three processor modules.

12. The control system of claim 11, wherein the first of the three processors is configured to transmit the signal to a third of the three processor modules, and wherein the attenuated feed back system includes a second loop back path coupled to the first of the three processor modules, wherein the second loop back path includes a second attenuation element having a predefined attenuation value, said second attenuation element configured to attenuate the signal by a predefined amount so as to generate a second attenuated signal, wherein the first of the three processor modules is configured to compare information in the second attenuated signal and information in the signal so as to determine whether there is a fault in communications between the first and the third of the three processor modules.

13. The control system of claim 12, wherein the second attenuation element is a resistive element, the resistive value of said element selected to provide a predetermined signal level threshold between said signal level and said second attenuation signal level.

14. The control system of claim 11, wherein the loop back path is coupled to a connector pin external to the first processor module so as to enable the connector pin to be diagnosed.

15. the control system of claim 11, wherein the first of the three processor modules includes: a capture register configured to capture the attenuated signal and a data checker configured to compare information in the signal with information in the attenuated signal.

16. the control system of claim 11, wherein the first attenuation element is a resistive element, the resistive value of said element selected to provide a predetermined signal level threshold between said signal level and said attenuated signal level.

17. A method for determining the validity of transmitted information in a multiple processor system comprising:
time synchronizing a first processor and a second processor;
transmitting first information from the first processor to the second processor;
looping back the transmitted first information to the first processor through an attenuated loop back path, said attenuated loop back path including an attenuation element having a predefined attenuation value, so as to generate first attenuated loop-back information;

capturing the first attenuated loop-back information in a first capture register as first capture register data;

transmitting second information from the first processor to a third processor;

looping back the transmitted second information to the first processor through a second attenuated loop back path, said second attenuated loop back path including a second attenuation element having a predefined attenuation value, so as to generate second attenuated loop-back information;

capturing the second attenuated loop-back information in a second capture register as second capture register data; and voting input data received at the first processor and the second processor using at least the first capture register data and the second capture register data.

18. The method of claim 17 including:
capturing the loop-back information; and
storing at least one measured aspect of the loop-back information.

19. The method of claim 17 including storing a result of the comparing in a memory of the first processor.

20. The method of claim 19 including:
identifying a fault with the first processor when the result indicates a difference in the transmitted information and the loop-back information.

* * * * *